Dec. 10, 1946.  E. O. ROGGENSTEIN  2,412,537
RECORDING AND COMPUTING MACHINE
Filed Dec. 10, 1940   28 Sheets-Sheet 1

INVENTOR
E. O. ROGGENSTEIN
BY John L. Sterling
ATTORNEY

Dec. 10, 1946.   E. O. ROGGENSTEIN   2,412,537
RECORDING AND COMPUTING MACHINE
Filed Dec. 10, 1940   28 Sheets-Sheet 4

INVENTOR
E. O. ROGGENSTEIN
BY John L. Sterling
ATTORNEY

Dec. 10, 1946.  E. O. ROGGENSTEIN  2,412,537
RECORDING AND COMPUTING MACHINE
Filed Dec. 10, 1940  28 Sheets-Sheet 5

INVENTOR
E. O. ROGGENSTEIN
BY John L Sterling
ATTORNEY

Dec. 10, 1946.  E. O. ROGGENSTEIN  2,412,537
RECORDING AND COMPUTING MACHINE
Filed Dec. 10, 1940  28 Sheets-Sheet 6
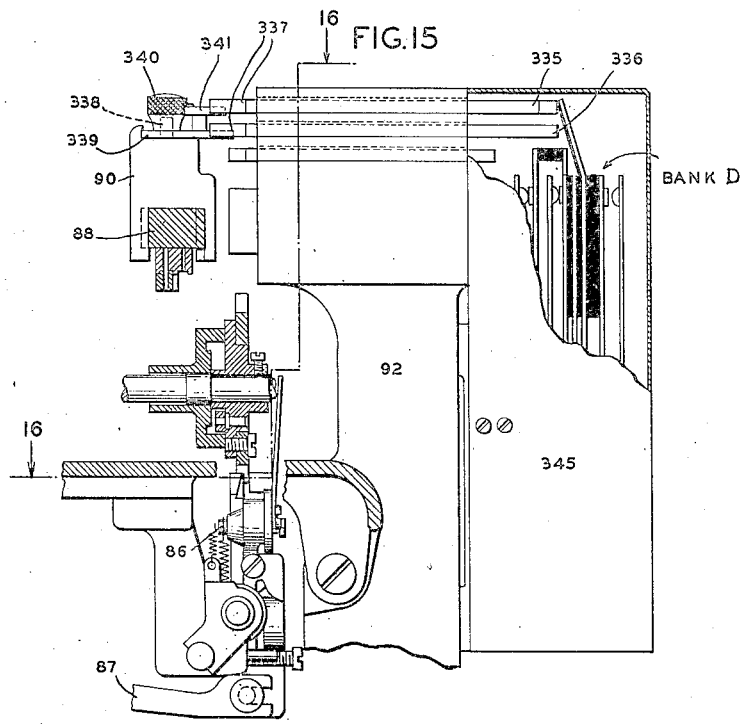
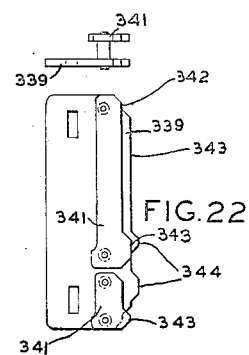
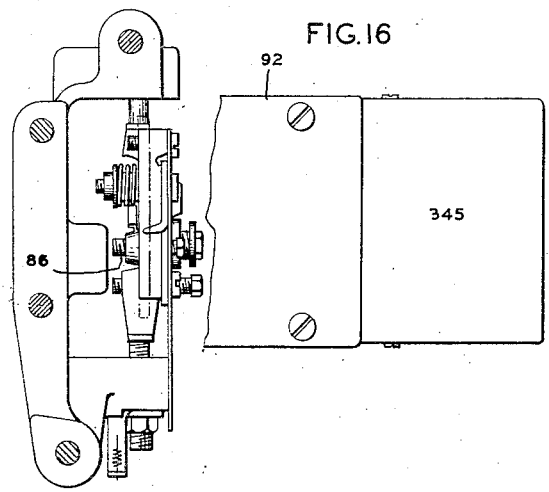
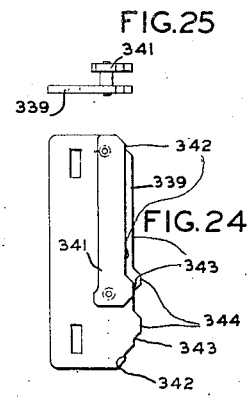
INVENTOR
E. O. ROGGENSTEIN
BY John L Sterling
ATTORNEY

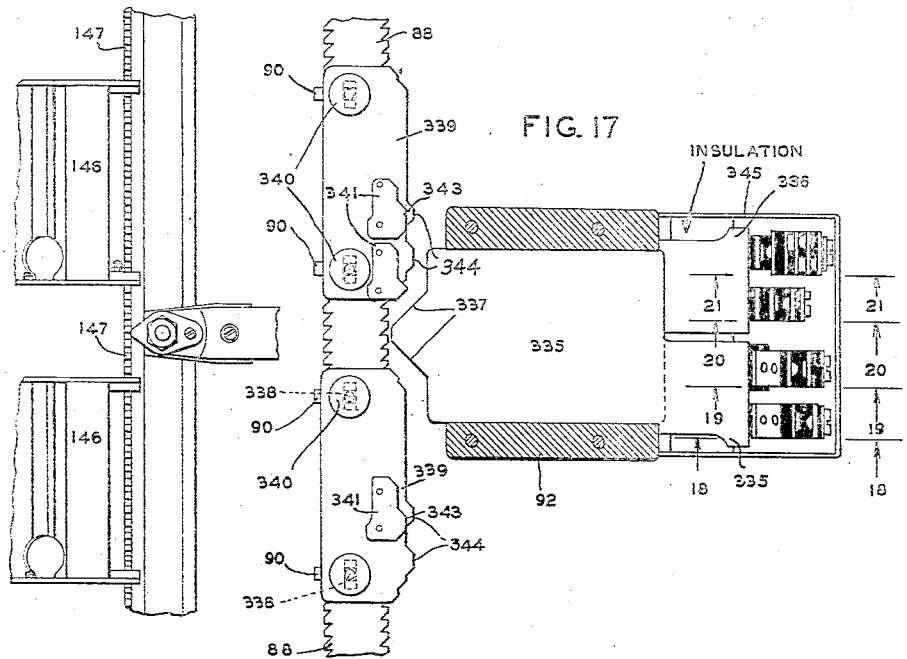
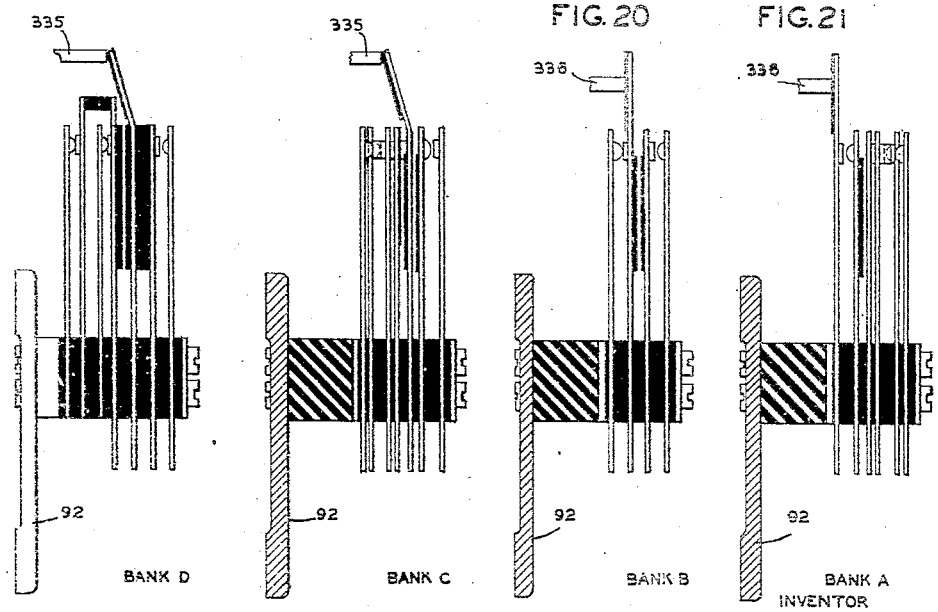

Dec. 10, 1946.  E. O. ROGGENSTEIN  2,412,537
RECORDING AND COMPUTING MACHINE
Filed Dec. 10, 1940  28 Sheets-Sheet 8
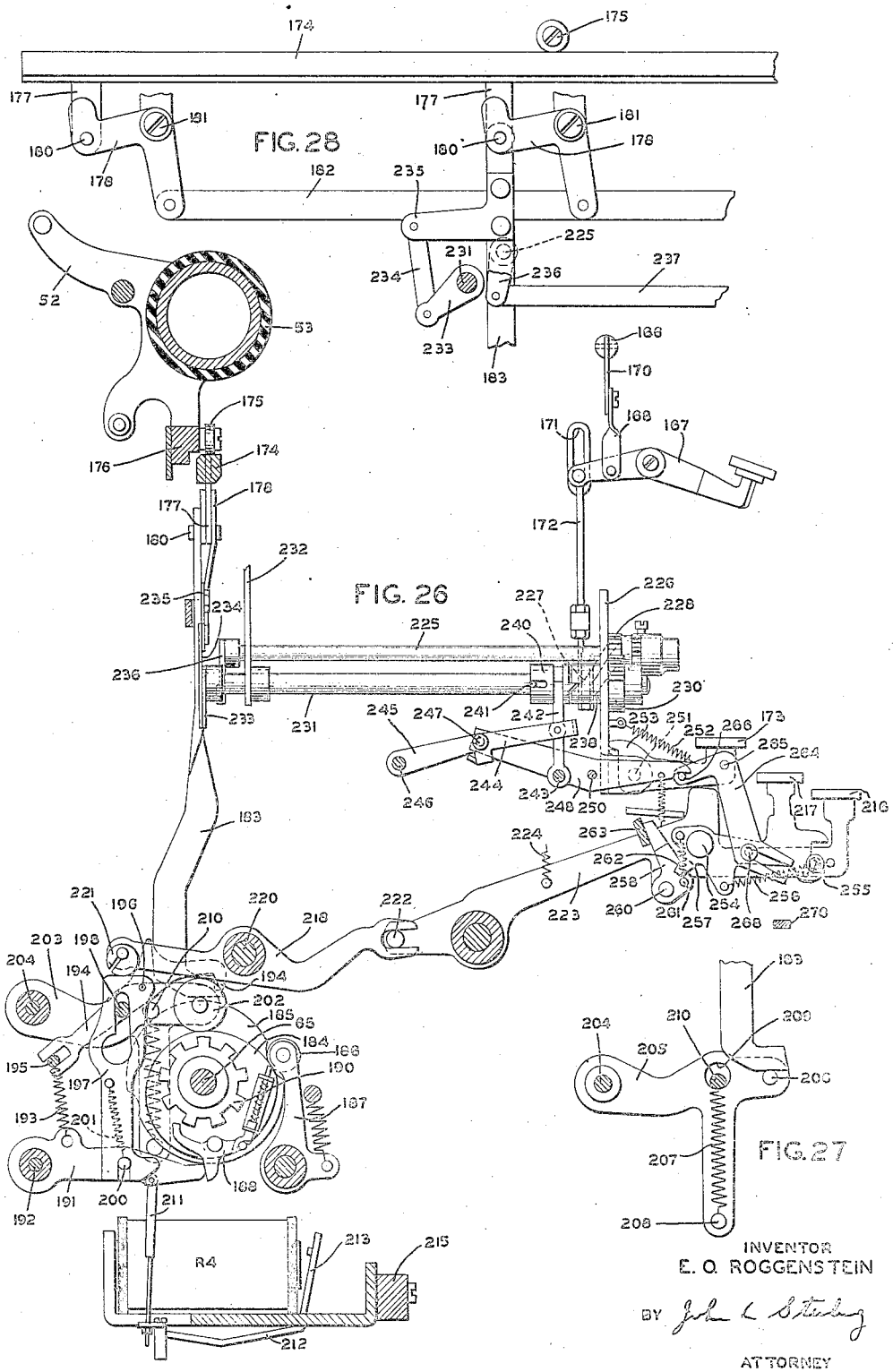
INVENTOR
E. O. ROGGENSTEIN
BY John L. Sterling
ATTORNEY

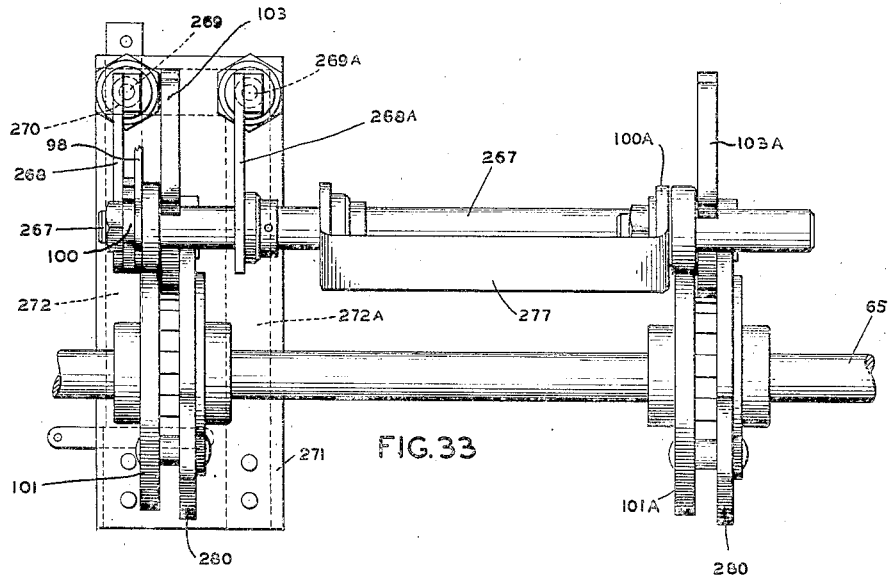
FIG. 33
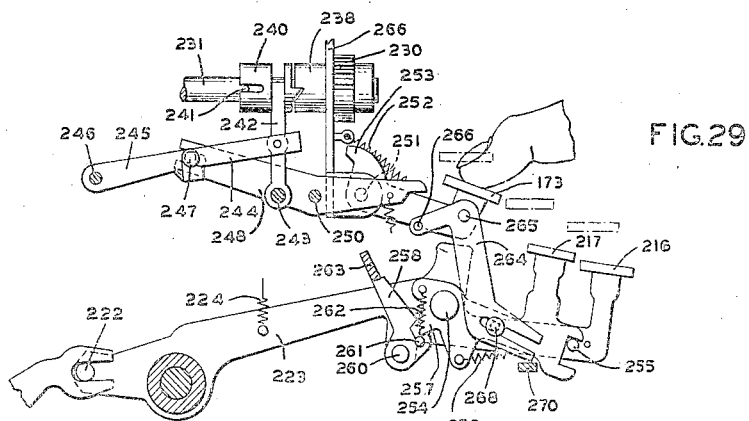
FIG. 29
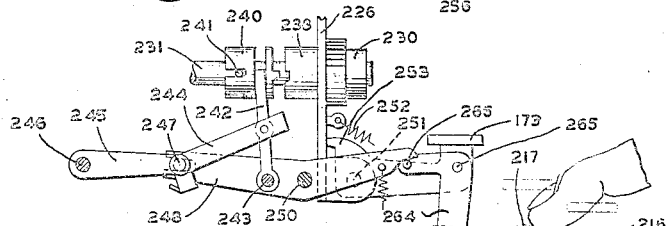
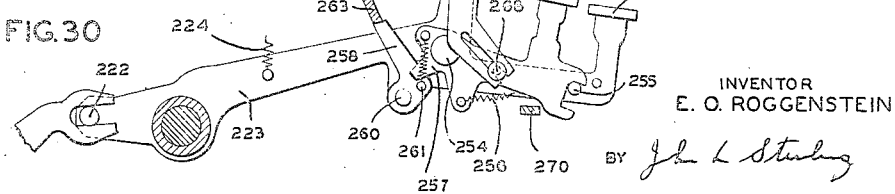
FIG. 30

INVENTOR
E. O. ROGGENSTEIN
BY John L Sterling
ATTORNEY

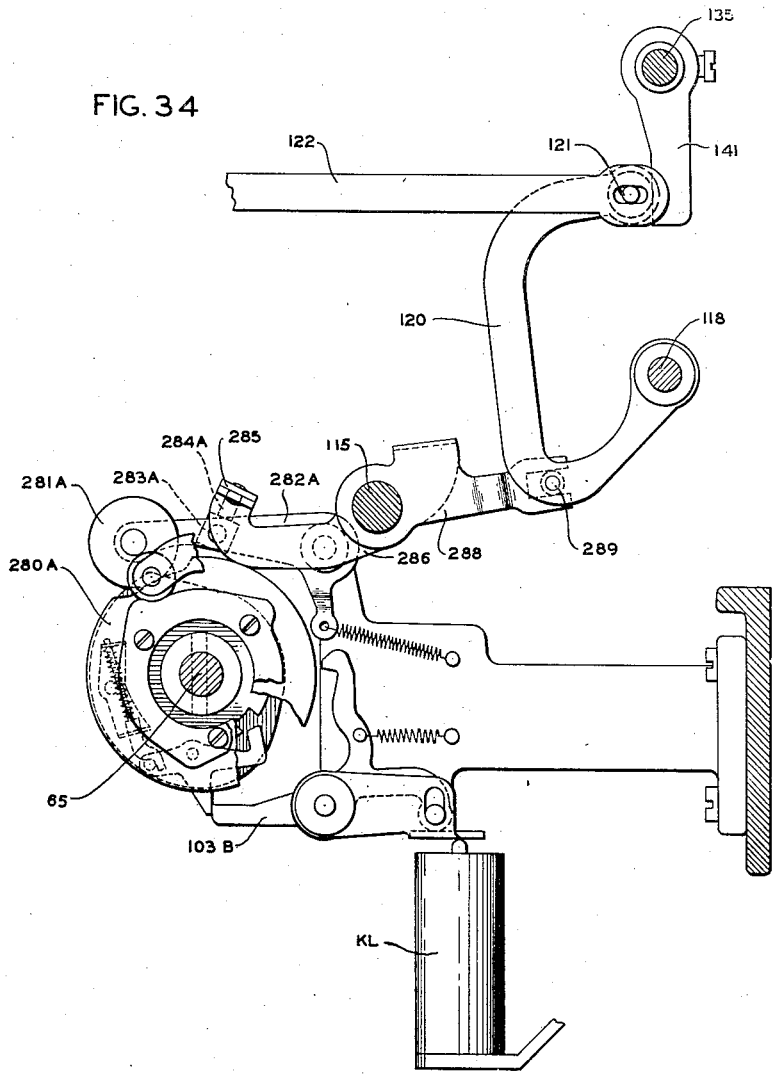

Dec. 10, 1946.    E. O. ROGGENSTEIN    2,412,537
RECORDING AND COMPUTING MACHINE
Filed Dec. 10, 1940    28 Sheets-Sheet 12

INVENTOR
E. O. ROGGENSTEIN
BY John L. Sterling
ATTORNEY

Dec. 10, 1946.  E. O. ROGGENSTEIN  2,412,537
RECORDING AND COMPUTING MACHINE
Filed Dec. 10, 1940   28 Sheets-Sheet 13

INVENTOR
E. O. ROGGENSTEIN
BY John L Sterling
ATTORNEY

INVENTOR
E. O. ROGGENSTEIN

ATTORNEY

Dec. 10, 1946.  E. O. ROGGENSTEIN  2,412,537
RECORDING AND COMPUTING MACHINE
Filed Dec. 10, 1940   28 Sheets-Sheet 16

INVENTOR
E. O. ROGGENSTEIN
BY John L. Sterling
ATTORNEY

Dec. 10, 1946.     E. O. ROGGENSTEIN     2,412,537
RECORDING AND COMPUTING MACHINE
Filed Dec. 10, 1940     28 Sheets-Sheet 19

INVENTOR
E. O. ROGGENSTEIN
BY John L. Sterling
ATTORNEY

Dec. 10, 1946.   E. O. ROGGENSTEIN   2,412,537
RECORDING AND COMPUTING MACHINE
Filed Dec. 10, 1940   28 Sheets-Sheet 21

INVENTOR
E. O. ROGGENSTEIN
BY John L Sterling
ATTORNEY

Dec. 10, 1946.  E. O. ROGGENSTEIN  2,412,537
RECORDING AND COMPUTING MACHINE
Filed Dec. 10, 1940  28 Sheets-Sheet 24

INVENTOR
E. O. ROGGENSTEIN
BY John L. Sterling
ATTORNEY

Dec. 10, 1946.    E. O. ROGGENSTEIN    2,412,537
RECORDING AND COMPUTING MACHINE
Filed Dec. 10, 1940    28 Sheets-Sheet 26

INVENTOR
E. O. ROGGENSTEIN
BY John L. Sterling
ATTORNEY

Dec. 10, 1946.   E. O. ROGGENSTEIN   2,412,537
RECORDING AND COMPUTING MACHINE
Filed Dec. 10, 1940    28 Sheets-Sheet 27

INVENTOR
E. O. ROGGENSTEIN
BY John L. Sterling
ATTORNEY

Dec. 10, 1946.   E. O. ROGGENSTEIN   2,412,537
RECORDING AND COMPUTING MACHINE
Filed Dec. 10, 1940   28 Sheets-Sheet 28

INVENTOR
E. O. ROGGENSTEIN
BY John L. Sterling
ATTORNEY

Patented Dec. 10, 1946

2,412,537

UNITED STATES PATENT OFFICE 2,412,537

RECORDING AND COMPUTING MACHINE

Edwin O. Roggenstein, Utica, N. Y., assignor to Remington Rand Inc., Buffalo, N. Y., a corporation of Delaware Application December 10, 1940, Serial No. 369,399

46 Claims. (Cl. 235—59)

This invention relates to recording and computing machines, and particularly to a machine for automatically recording one digit at a time, typewriter fashion, the totals registered on one or more totalizers.

More particularly, the invention relates to new and useful improvements in the operation of an ordinary power-operated combined typewriting and computing machine, such, for example, as the electrified Remington bookkeeping machine, to enable it to print its own totals automatically by the usual typewriting mechanism, with little or no intervention by the operator of the machine.

The present invention is an improvement over those shown in the following previously filed inventions:

(1) Patent No. 2,172,749, issued September 12, 1939, to G. O. Going, filed August 23, 1934, entitled "Computing and like machine";

(2) Frederick W. Schremp, Patent No. 2,288,846, issued July 7, 1942, and entitled "Combined typewriter and computing machine"; and (3) Edwin O. Roggenstein, Patent No. 2,364,758, issued December 12, 1944, and entitled "Recording and computing machines." These cases describe and claim certain improvements in automatic total writing apparatus including electrical circuits and are shown applied to the Remington bookkeeping machine, and said cases may contain claims reading upon some features of the herein described constructions. The present invention is more nearly related to the above named Roggenstein application.

Machines of the type of the Remington bookkeeping machine are frequently hooked up to a punch to punch records in statistical cards as described in numerous patents, such, for example, as that to Weiland and Russell No. 1,682,451, dated August 28, 1928, and that to Lasker No. 2,124,178, dated July 19, 1938. Obviously, such a punch could be connected with the machine herein described, in which event the totals would be automatically recorded, not only by printing them on the typewriter, but also by punching them on cards or tapes. The Powers punch described in said patents itself includes digital solenoids to control the punches, a carriage and means for spacing the latter. The present electrical system is, as to many of its features, applicable directly to such a punch. The invention is, therefore, not limited to printing as a recording means.

The invention herein presented has several objects as follows:

1. To achieve a more perfect timing especially in the operation of the relays and magnets so that a minimum of these will be drawing current from the line in any one operation.

2. To provide a mechanism and circuit equipment of greater flexibility as to the capacity of the machine to encompass a wider scope of functions and operations.

3. To provide a circuit and associated mechanism which, with a very few changes, can easily be adapted for operations in connection with the English or American monetary system.

4. To eliminate sparking at the cross totalizer senser fingers.

5. To provide means whereby the parts of the machine which move during any one operation are brought to rest positively before a new operation thereof takes place.

6. To enable the printing of a symbol such as a star before the printing of the first significant digit when writing checks.

7. To provide certain circuit relays and switches cooperatively related to prevent automatic total writing unless the operator has properly manipulated the mechanism to a selected position.

8. To provide certain circuit relays and switches which will insure definite circuit connections being made in exact sequential relation.

In considering the invention broadly it is to be remembered that the improvements constituting this invention are embodied in a total writing typewriter of the general structure set forth in the previously mentioned patents and applications, especially the above mentioned Roggenstein application, which is, in operation and structure, more nearly like the present machine.

This Roggenstein machine includes a power driven mechanism, a movable carriage provided with vertical totalizers, one or more cross totalizers moved by the carriage, and sensing means associated with the cross totalizers to sense their set-ups and automatically effect the operations of the machine in writing totals.

An important feature of the present invention concerns means operated by the carriage during tabulation to a total column position to open the return circuits of the printing magnets and to hold this circuit open an appreciable interval after tabulation movement has ceased. Generally speaking this is for the purpose of preventing premature operation of the printing magnets and also to allow time for certain preliminary operations such as the operation of the shift and transfer mechanism later set forth in detail. As particularly disclosed this means includes the tabulator switch, the control switches and the relays R1 and R9.

A further important feature of this invention concerns the provision of means whereby during total printing the operation of the printing magnets will open momentarily the magnet return circuit to prevent sparking at the sensing fingers and discs as the totalizer wheels are cleared, as well as means operated by the action of the printing magnets and, in some cases, other magnets, to hold the return circuit open long enough to allow moving parts to come to rest before the printing of the next symbol or numeral. As particularly shown, this mechanism broadly includes the actuator switch, the timing switch and associated parts.

Another feature of the invention concerns means whereby when certain columns of the totalizer are being sensed, some of the sensing fingers are cut out and the others are made to do double duty, whereby printing of numbers above 9 may be achieved. This is broadly new and applies particularly to the printing of pence in the English money system. As particularly shown, this feature concerns the operation and interaction of relays R10, R11, and the sensing unit.

A still further feature of the invention has to do with the means for printing complements on negative totals for a totalizer when the different groups of wheels have different maximum values as in an English totalizer. In this form the pounds on any wheel has a maximum of nine, the tens of shillings is either zero or 1, the units of shillings has a nine maximum, and the pence wheel has a maximum of eleven. This invention provides one add-1 mechanism operated by the totalizer to print complements for the pounds and units of shillings position, another add-1 mechanism to operate in conjunction with the control switches to print complements in the tens of shillings position, and still another add-1 mechanism which cooperates with the shift relay and the sensing unit to print complements for the pence position.

Further detailed features will be apparent from the following description and claims and are all directed to the achievement of a simplified, accurate operation of the related parts which enable a minimum number of magnets, switches, and relays to achieve the maximum of sequential cooperative actions in any desired timed relation.

A more clear conception of the operation, construction and further objects of the invention will be had from the following specification when read in conjunction with the accompanying drawings, in which Fig. 1 is a general front-to-rear vertical sectional view of said machine having the invention embodied therein, the view being on an irregular section with some parts broken away or shown fragmentarily and many parts omitted;

Fig. 15 is a fragmentary right-hand side elevation partly in section and showing the carriage escapement mechanism, certain circuit controllers and associated devices;

Fig. 16 is a top plan view with parts in section of the mechanism taken on the line 16—16 shown in Fig. 15;

Fig. 17 is a somewhat schematic partial plan view, with parts broken away, showing the relation between the front totalizers, the control cams, and the rear control switches for an operation involving taking a sub-total followed by a total;

Figure 31:
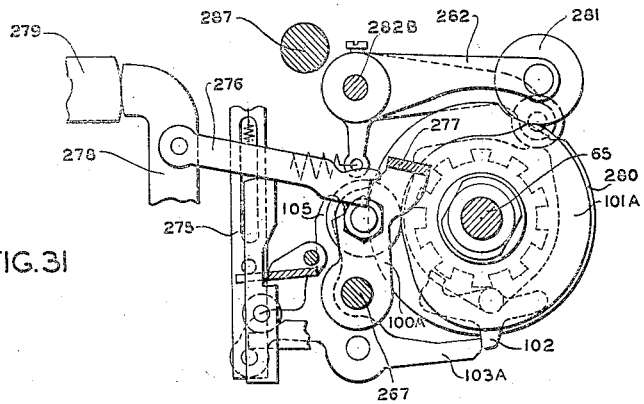
Figure 32:
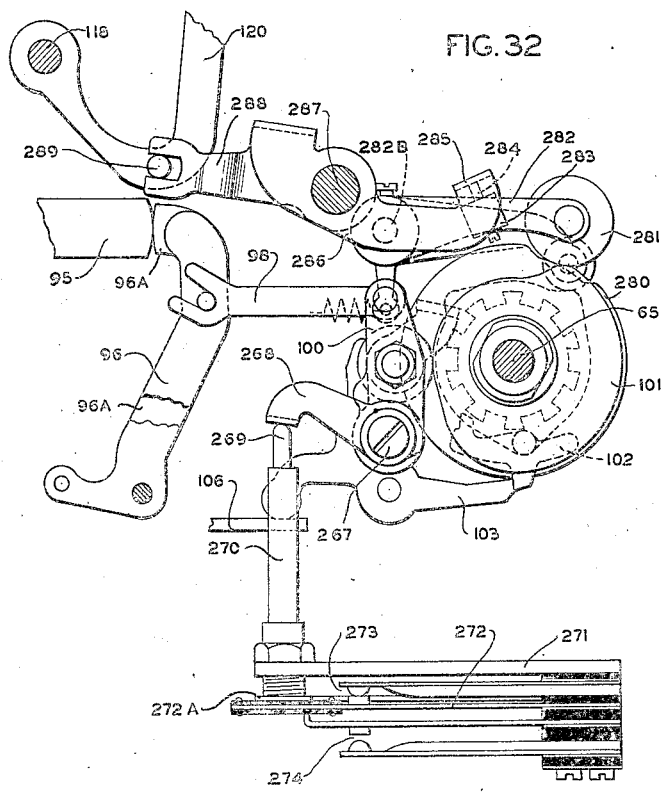
Figure 35:
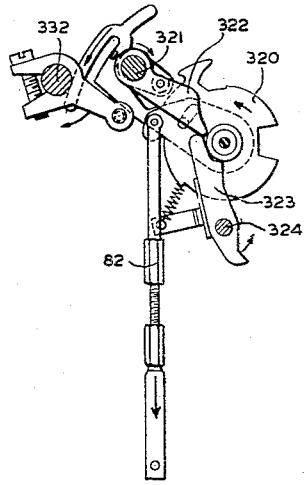
Figure 36:
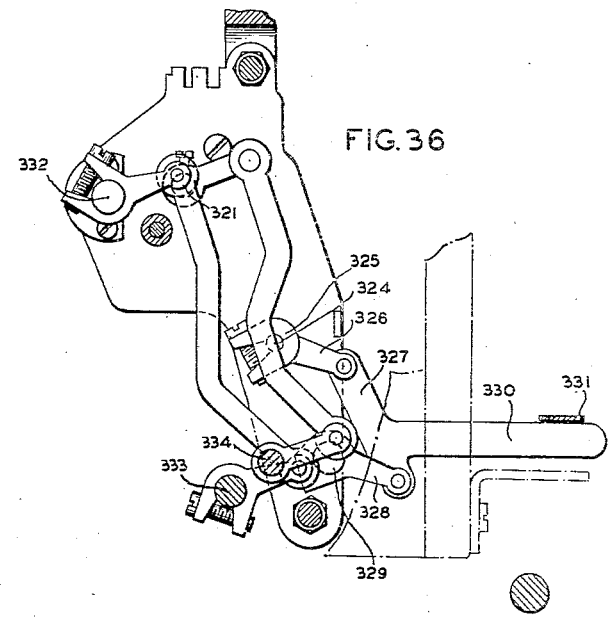
Figure 37:
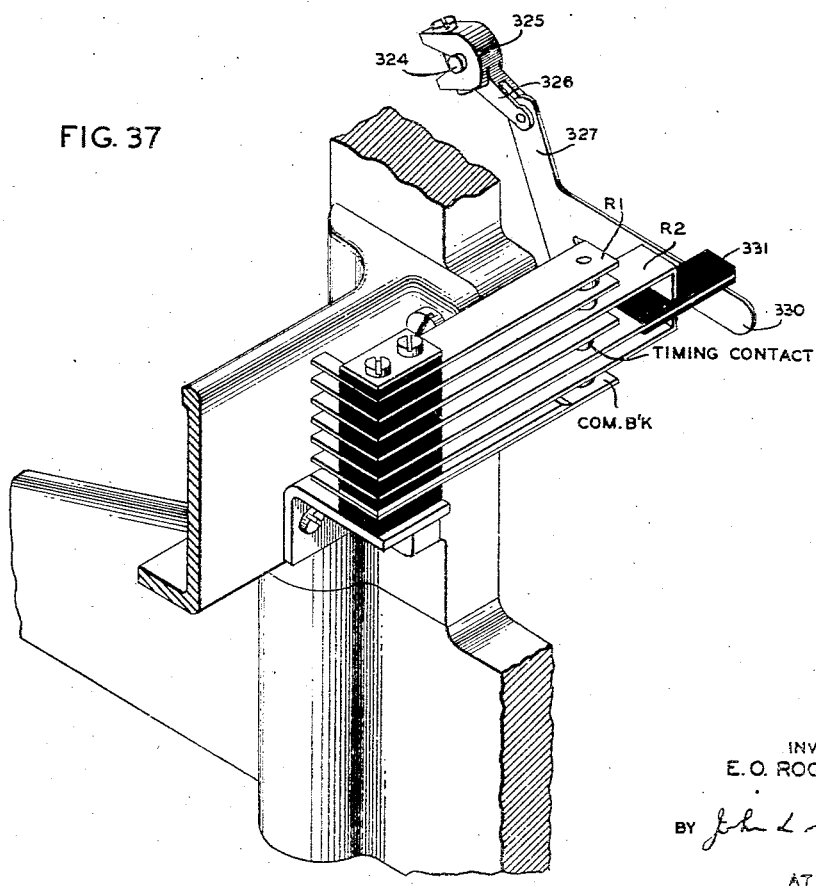
Figure 38:
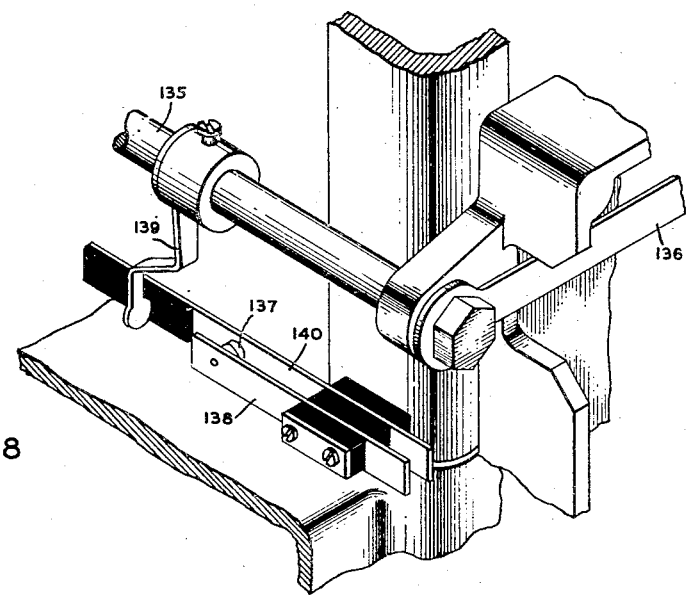
Figure 40:
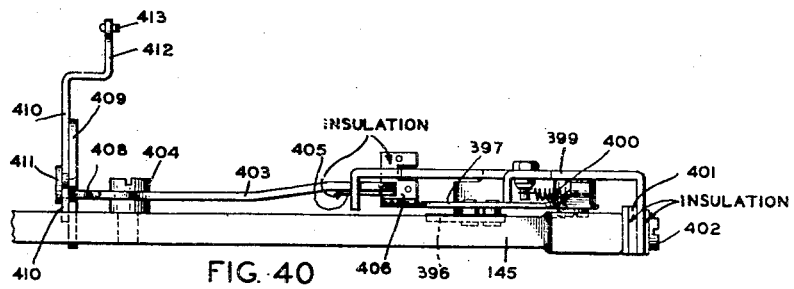
Figure 39:
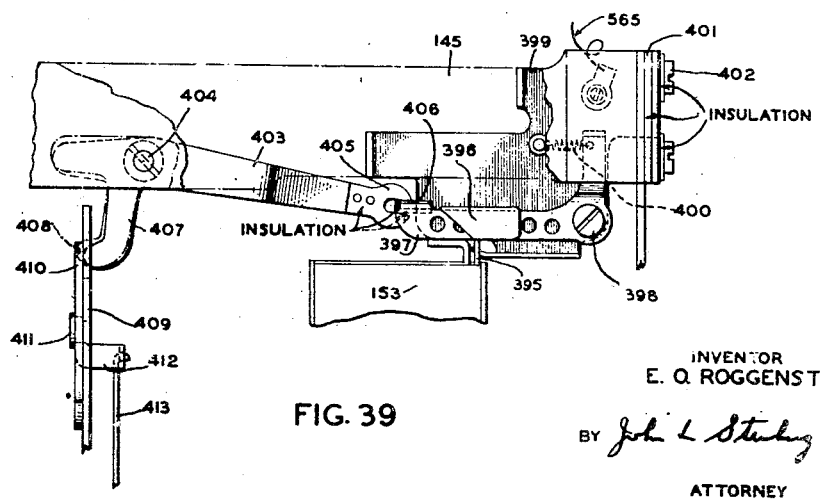
Figure 41:
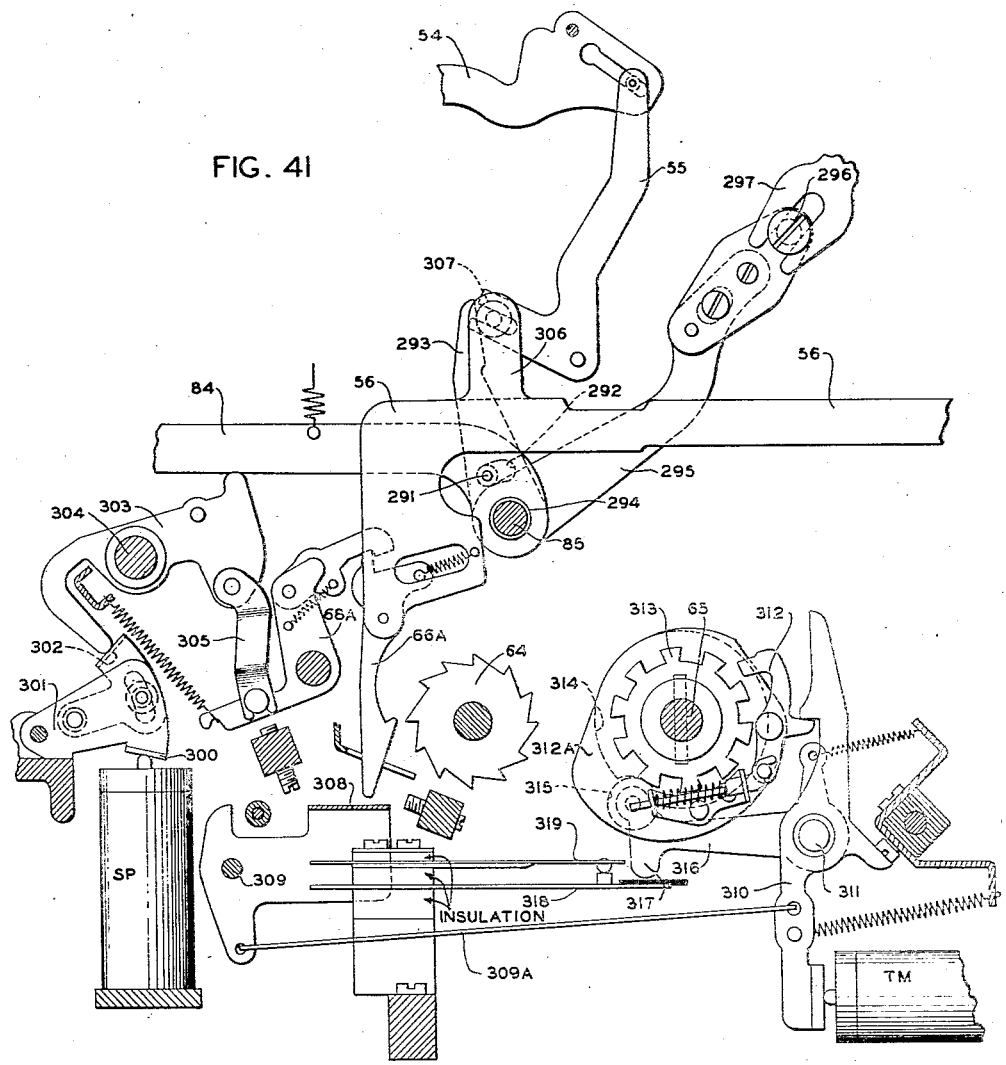
Figure 57:
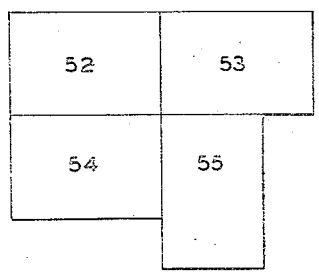
Figure 56:
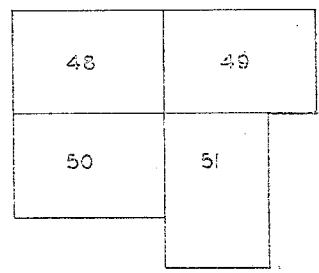
Figure 42:
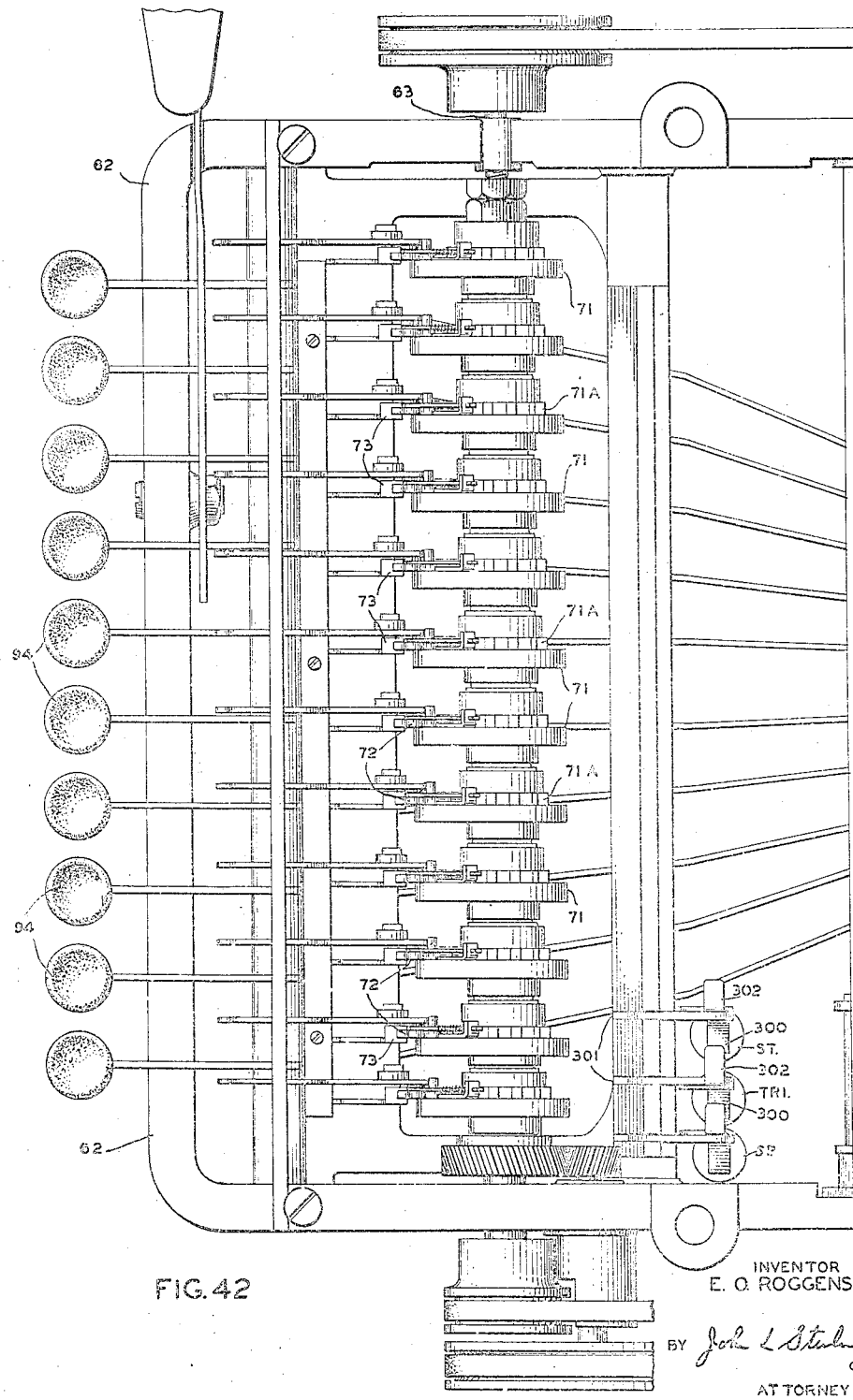
Figure 43:
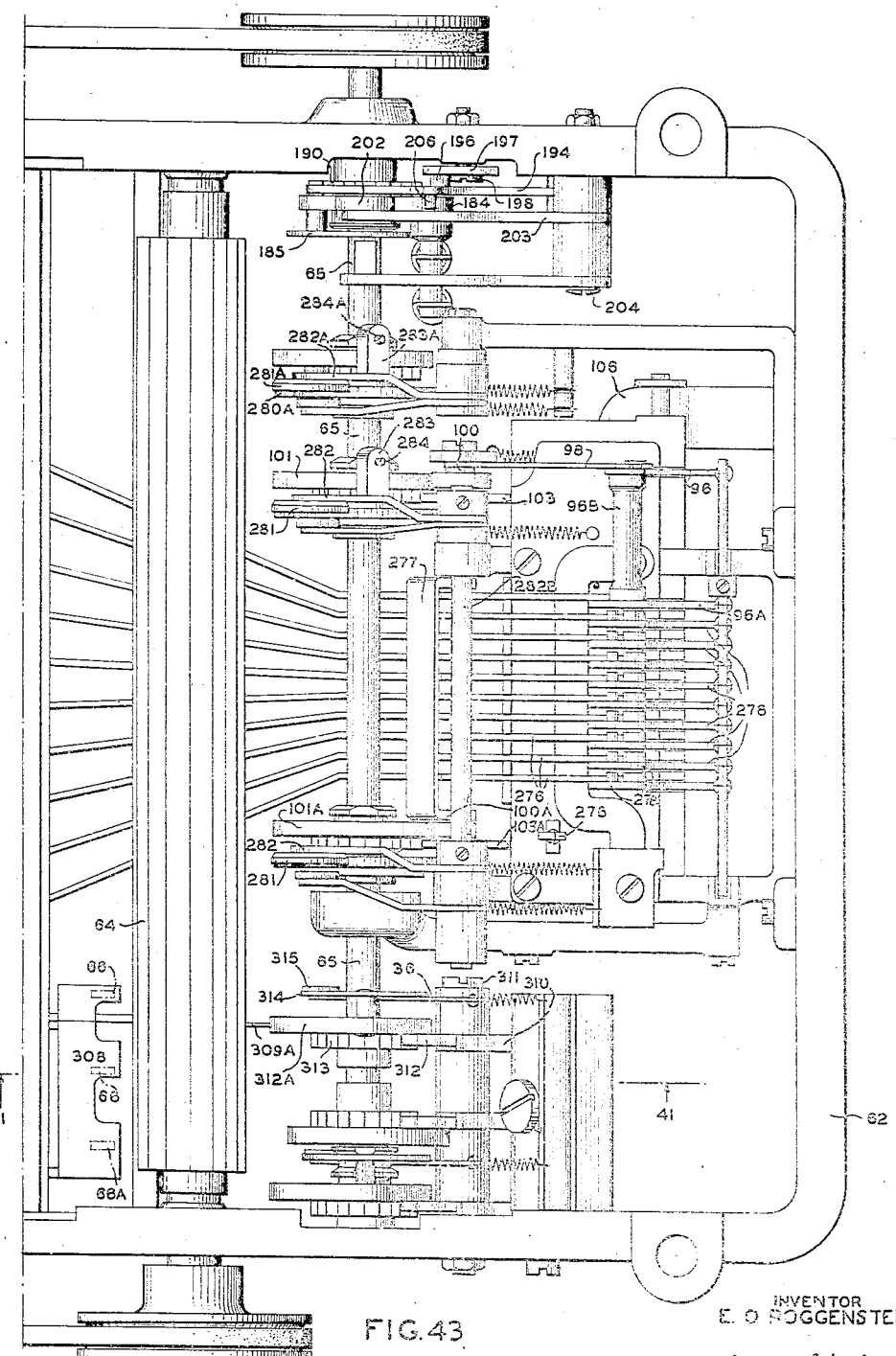
Figure 44:
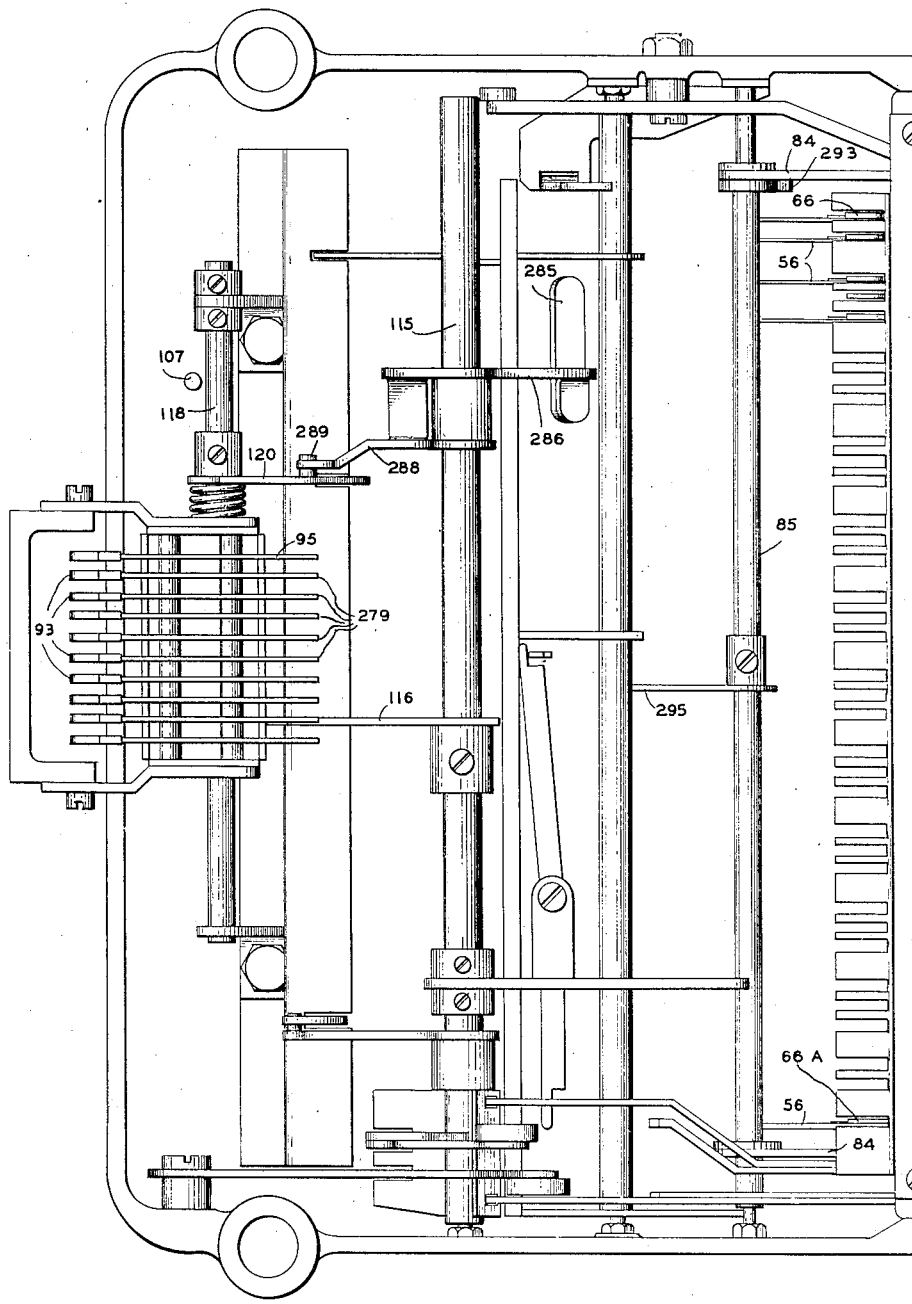
Figure 45:
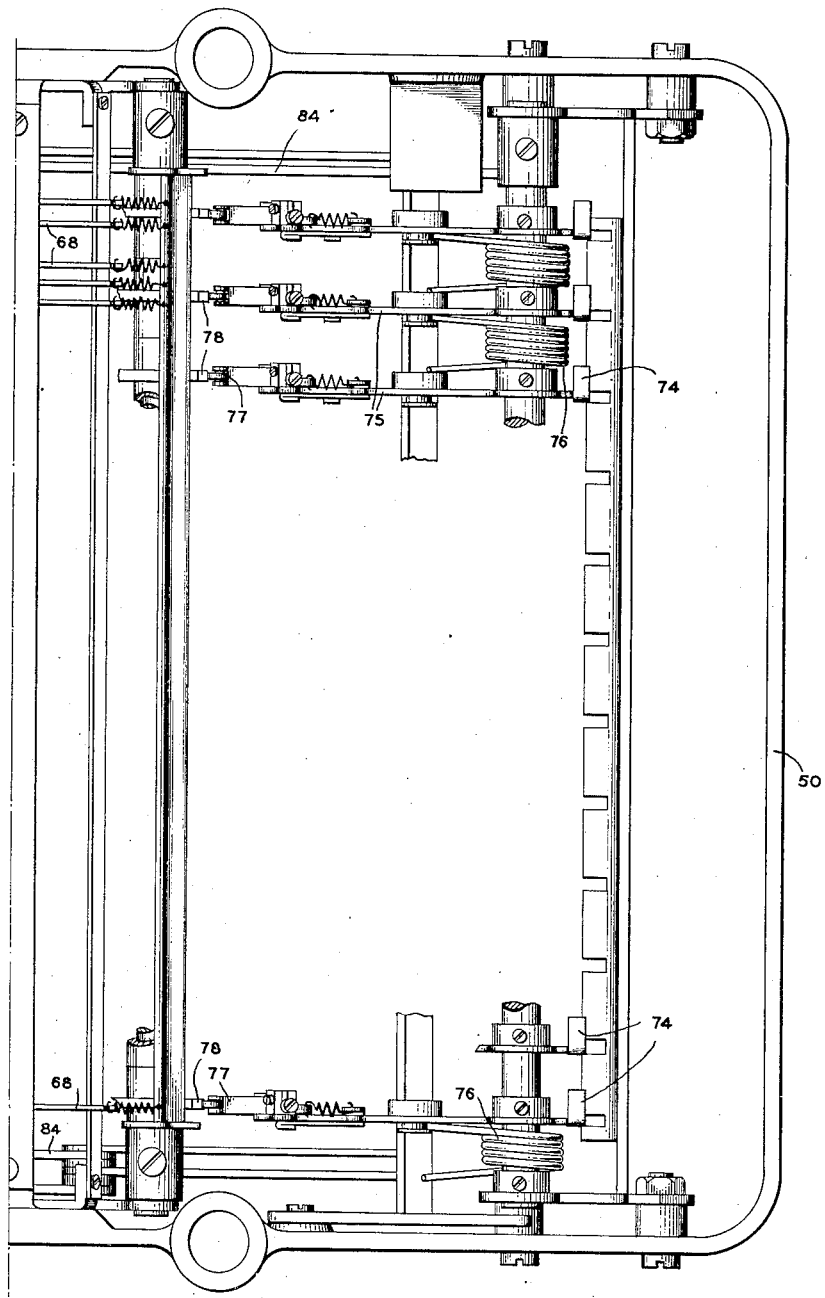
Figure 46:
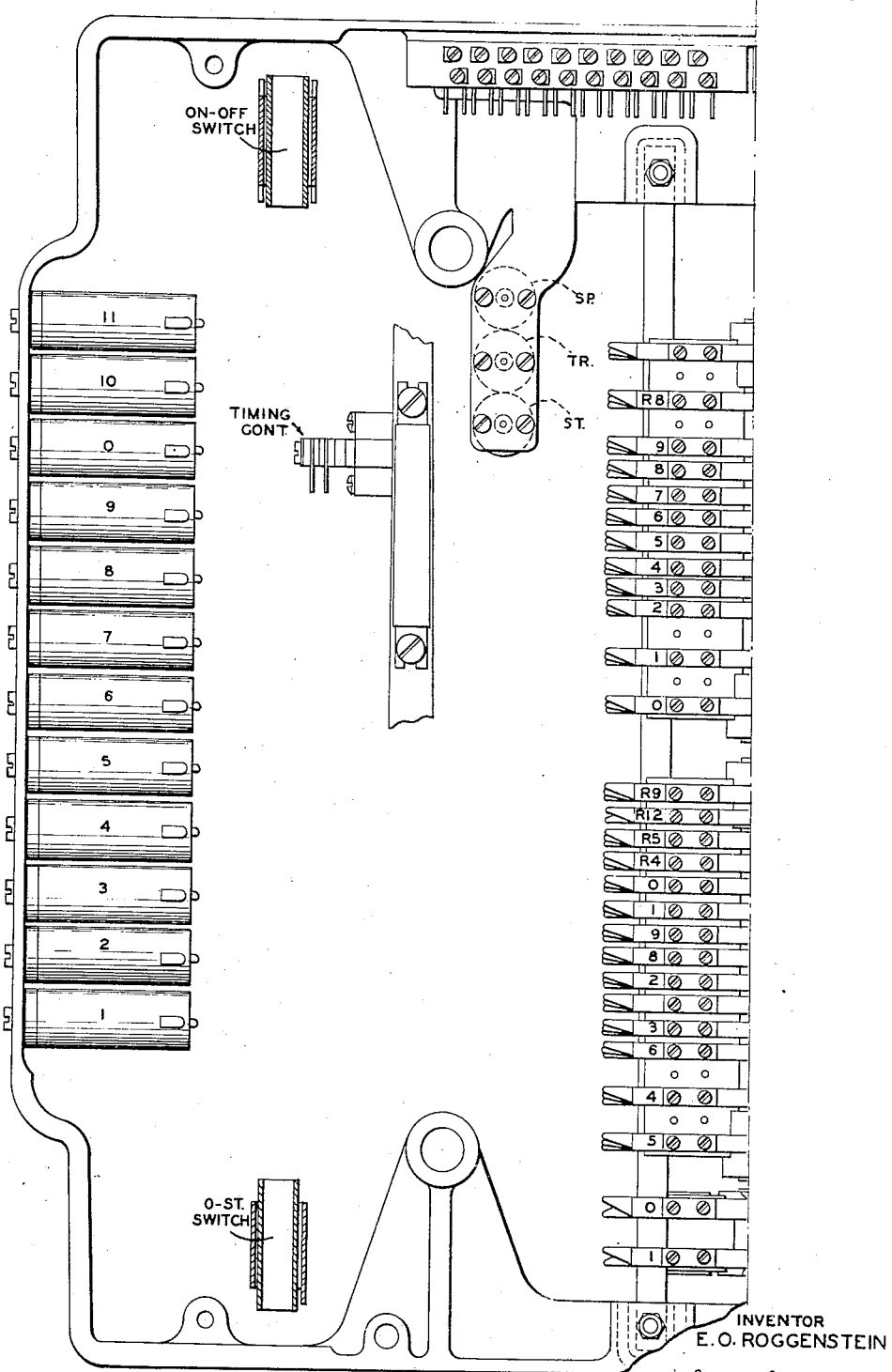
Figure 47:
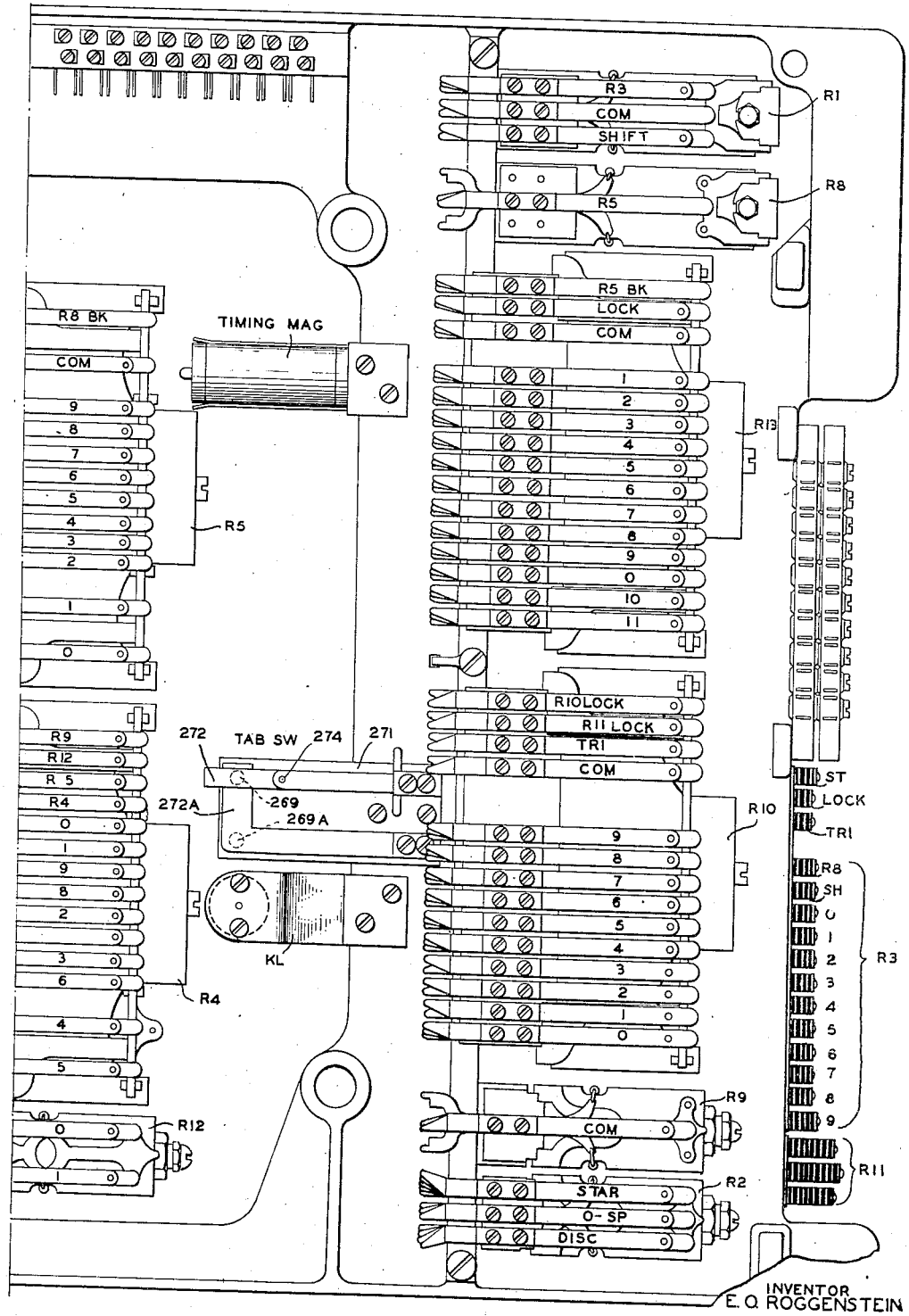

Figs. 18, 19, 20, and 21 are enlarged vertical sectional views of the control switches taken, respectively, on the lines 18—18, 19—19, 20—20, and 21—21 of Fig. 17;

Figs. 22 and 23 are, respectively, plan and end elevational views of a form of control cam which may be used for writing sub-totals;

Figs. 24 and 25 are, respectively, similar views of a form of control cam which may be used for writing totals;

Fig. 26 is a general left-hand view of the carriage shift mechanism, the reversing, and the credit balance mechanism of the machine;

Fig. 27 is a fragmentary illustration of a portion of the mechanism shown in Fig. 26;

Fig. 28 is a fragmentary front view of a portion of the carriage shift mechanism;

Figs. 29 and 30 are left-hand side elevations, partly in section, showing the shift and credit balance key mechanism in different operated positions;

Fig. 31 is a left-hand side elevation of the hand tabulator mechanism mounted on the rear power shaft;

Fig. 32 is a similar view of the automatic tabulator mechanism showing the tabulator switch;

Fig. 33 is a partial plan view of the hand and automatic tabulators on the rear power shaft as shown in Figs. 31 and 32;

Fig. 34 is a right-hand side elevation of the key lock magnet and associated mechanism located on the rear power shaft;

Fig. 35 is a somewhat diagrammatic right-hand side elevation of the usual fan cam mechanism operated by the numeral keys or magnets;

Fig. 36 is a schematic elevation of the mechanism employed for connecting the vertical actuator with the cross actuator and an actuator switch operated by the movement thereof;

Fig. 37 is an enlarged perspective view of the actuator switch and the operating arm therefor;

Fig. 38 is a perspective view of the carriage return switch and operating mechanism therefor, the contacts being shown in normal closed position;

Fig. 39 is a partial front elevation of the clear signal and disconnect mechanism;

Fig. 40 is a plan view of the same;

Fig. 41 is a partial vertical right-hand sectional view showing the interconnection between the star, triangle, and space magnets and the timing cam and snatch roll mechanism;

Figs. 42 and 43 taken together represent a complete plan view of the front and rear halves of the power base as seen when the typewriter frame is raised therefrom;

Figs. 44 and 45 taken together represent a complete inverted plan view, respectively, of the rear and front portion of the typewriter mechanism, adapted when lowered to normal position to cooperate with the mechanism shown in Figs. 42 and 43;

Figs. 46 and 47 taken together represent a complete inverted plan view, respectively, of the front and rear portion of the relay supporting frame disposed against the bottom of the power base shown in Figs. 42 and 43;

Figs. 48, 49, 50, and 51, when combined as indicated in Fig. 56 form the circuit of the machine when two cross totalizers are employed;

Figs. 52, 53, 54, and 55, when combined as indicated in Fig. 57 form the circuit of the machine when a single cross totalizer is employed;

Fig. 56 is a diagram of the relative circuit layout of Figs. 48, 49, 50, and 51; and Fig. 57 is a diagram of the relative circuit layout of Figs. 52, 53, 54, and 55.

POWER OPERATED GENERAL TYPEWRITER MECHANISM

In the drawings the invention is shown applied to an electrified Remington bookkeeping machine and in the illustration the machine is adapted to compute and print in terms of English money although many of the fundamental parts of the improvements are the same in the machine when equipped to compute and print in terms of American money. To change the machine for operation from English to American monetary system requires a few minor alterations and substitutions which will later be referred to more in detail. The ordinary Remington electrified bookkeeping machine is well known in the art and has been described in a series of patents, and only so much of the machine is shown in the present drawings as is necessary to an understanding of the invention and its application thereto. Said machine includes a Remington typewriter, fragments of the frame 50 of which are shown in Fig. 1 of the drawings.

The typewriter carriage 51 supports a platen frame 52 carrying a platen 53. The type bars 54 are operated by sub levers 55. The sub levers which operate alphabetical type bars are operated by levers 56 and those that operate numerical type bars are operated by levers 57, which, together with the alphabetic key levers 58 and numerical key levers 60 are all pivoted on an angle bar 61 at the rear of the machine. All of these type bars are operated by a power drive, located in a base section of the frame 62 on which the typewriter frame is mounted. This power drive includes three continuously rotating shafts, namely, a shaft 63 for operating the computing mechanism and the numerical type bars, a snatch roll 64 for operating the alphabetic and other character type bars, and a rear power shaft 65 which operates the tabulating mechanism, both hand and automatic, the case shift, key lock, and timing back space, and date mechanisms. These three shafts are driven counter-clockwise (see Fig. 1), by any suitable means such as a motor, as shown in patent to Dodge et al. 2,064,154, issued December 15, 1936.

Each of the alphabetic type bar operating levers 56 has a hook 66 pivoted thereto and hanging down in front of the snatch roll 64. Each of the alphabetic key levers 58 has a dependent arm 67, adapted to rock a bell-crank 68 carrying a hook 70 engaging the upper arm of the hook 66 in such fashion that, when the key lever is depressed, the hook 66 is swung into engagement with the snatch roll, which depresses the lever 56 and operates the type bar.

Figure 1:
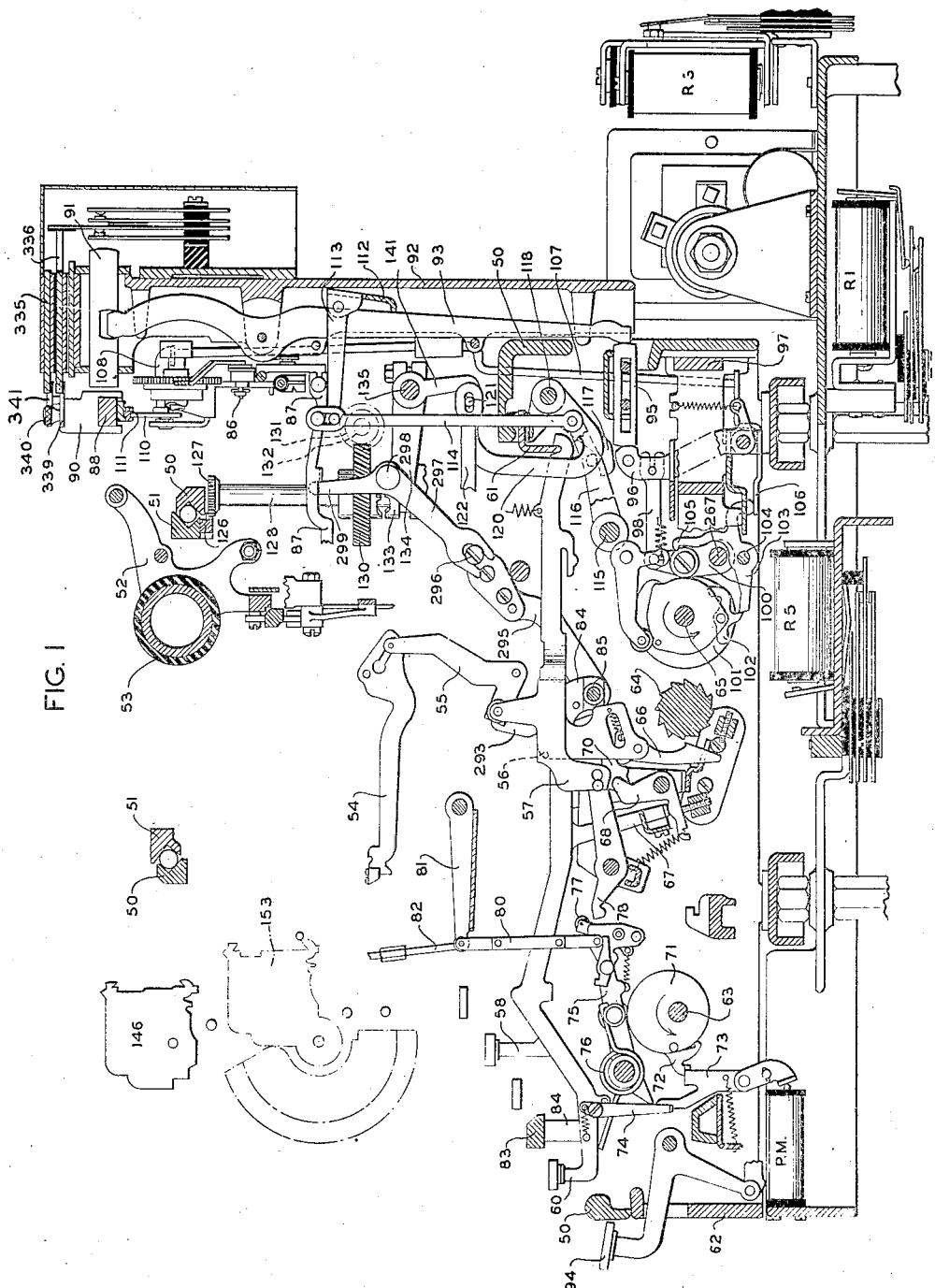

On the shaft 63 there is a series of cams 71, one for each numeral key, and said cams are loose on the shaft and each is controlled by a clutch, the dog 72 of which is shown in Fig. 1, said dog being adapted for engagement with a toothed wheel 71A (Fig. 42) fast on the shaft. This dog is controlled by a latch 73 adapted to be tripped by a pusher 74, pivoted to the associated key lever 60 with the result that the dog 72 engages the toothed wheel and drives the cam 71 for a single revolution at the end of which it is arrested by the dog 72 again striking the latch 73. Each cam 71 controls a follower lever 75 urged downward by a strong spring 76. The shape of the cam is such that, when it rotates, this lever first moves downward and then up to its normal position. The lever 75 carries a pivoted pawl member 77, which when the lever is at the bottom of its stroke, snaps in under the front end of the lever 78, which at its rear end is articulated by a pin and slot with one of the levers 57. On the upstroke of the lever 75, pawl 77 rocks the lever 78 which, in turn, rocks the lever 57 and operates the numeric type bars 54.

Each lever 75 has pivoted thereto a link 80, which is pivotally connected to a lever 81, which, in turn, has pivoted thereon a vertical link 82, which operates the computing mechanism. All of this mechanism is well known and disclosed and described in the above mentioned Roggenstein application S. N. 236,854.

The Remington machine also includes a space bar 83, whose bail arm 84 (Figs. 44 and 45) is loose on a shaft 85 and which is adapted to operate the dog rocker 86 of the typewriter escapement through a link 87 as described in the above application. Further detailed means for operating this dog rocker 86 by energization of certain magnets will be described later. The link 87 is also arranged to be operated by a universal bar which is actuated by the heel of each of the type bars 54.

TABULATING MECHANISM

The typewriter also includes a denominational tabulating mechanism. The column stop bar 88 at the rear of the typewriter carriage carries column stop 90 adapted to be arrested by denominational stops 91 mounted in a frame 92 at the rear of the typewriter. These stops 91 are operated by vertical levers 93, which, in the present machine, are or may be operated by power under control of the tabulator keys 94 at the front of the machine. The mechanism for operating most of the denominational stops is not shown herein, but the drawing does show the mechanism for operating one of the stops 91 automatically by the travel of the typewriter carriage. This particular stop is operated by one of the levers 93, which, like the other such levers, is operated by a slide 95, which, in turn, is operated by a vertical lever 96A (see Figs. 32 and 43) pivoted on the comb plate of a special tabulator frame 97. This mechanism is substantially the same as that described in the patent to Dodge et al., with particular reference to Figs. 1, 2, and 5 thereof. Lever 96A is secured to a cross rod 96B (Fig. 43) on which is secured a lever 96 operated by a link 98 pivoted on the follower lever 100 of a cam 101, which is loose on the drive shaft 65 and operated by a clutch comprising a toothed wheel fast on said shaft and engageable by a dog 102. This dog is normally held out of engagement by a compound latch 103 in the form of a three-armed lever pivoted at 104, the horizontal arm of this lever normally holding the cam in the position shown in Fig. 1. When this lever is rocked counter-clockwise to release the dog 102 a tooth or hook on the end of the upright arm 105 of the latch 103 moves into the path of the tail of the dog 102 and arrests the dog at about the end of a quarter-rotation of the cam, so that the cam stands in that position, until the compound latch is rocked back to normal position. When that occurs the dog is released from the latch arm 105 and is, at the end of its complete rotation, arrested in normal position by the latch 103. The outline of the cam 101 is such that, during the first 90° rotation thereof, it rocks the follower lever 100 toward the rear, moving the stop 91 into active position and holding it there until near the end of the complete rotation of the cam. More than half of the outline of this cam is a concentric high dwell so that the stop 91 is not withdrawn instantly upon the release of the dog arm 105, but remains in stopping position until near the end of the rotation of the cam, thus giving the carriage time to settle down from any vibration that may have been caused by its arrest.

The latch or detent 103, 105 is operated by a plate-like lever 106 rotatably mounted on the comb member for levers 96 and lying beneath the rearwardly extending third arm of the latch member 103, 105. This lever 106 is adapted to be rocked clockwise, in order to operate said latch lever, by a long rod 107 resting on its rear end and extending upwards to a point above the top plate of the typewriter, where its upper end rests under the end of an arm 108 of a device arranged to rock on a transverse horizontal pivotal axis and comprising an upstanding arm 110 adapted to cooperate with a cam bar 111 mounted on the under side of the column stop bar 88 in such manner that it can be set at any desired location lengthwise of said bar. All of the tabulator levers 93 cooperate with a universal bar 112 lying behind them and having an arm 113 extending horizontally forward therefrom, said arm connected by a link 114 with an arm fast on a rock-shaft 115 in the base of the typewriter. The construction is such that when any tabulator stop is operated, this universal bar 112 is rocked counter-clockwise and rocks the shaft 115 clockwise. This shaft has an arm 116 carrying a pin adapted to operate an arm 117 fast on a second rock-shaft 118 so as to rock the latter counter-clockwise. Said shaft 118 has fast thereon an arm 120, the upper end of which (Fig. 34) carries a cross piece or stud 121 which cooperates with a slot in a long link 122 to operate a certain lock, which in the Remington machine is called the ball lock (not shown) at the front of the machine, so as to lock all numeral keys whenever the tabulator and certain other devices, to be later described, are in operation.

Referring to Figs. 1, 31, 32, 33, and 43 it will be seen that the rear power shaft 65 has thereon the automatic tabulator cam 101 and associated parts described, supra. The arm 100 thereof is freely journaled on a shaft 267 and is moved independently of the rocking of said shaft. As the arm 100 is swung counter-clockwise (Fig. 32) an arm 268 secured thereto is swung down to depress a rod 269. This rod is guided in a sleeve 270 fixedly mounted on a plate 271. The lower end of this rod is adapted to bear against a spring metal switch plate 272 and to depress said plate. The depression of this plate opens contacts 273 and closes contacts 274. This switch is nominated as a tabulator switch and is shown as Tab. Bk. in the circuit diagram.

To the right of the automatic tabulator as viewed in Fig. 33, is a hand tabulator shown in detail in Fig. 31. This mechanism includes a cam 101a operated in a manner identical to the operation of cam 101 by the release of a latch member 103a corresponding to the latch member 103. However, in this case the latch member is released by the depression of one of the manual tabulator keys 94 in the manner clearly indicated in U. S. patent to Dodge et al., No. 2,064,154, issued December 15, 1936. In accordance with this disclosure the operation of a manual tabulator key raises a slide 275 and causes the operation of latch 103A and also the elevation of interponent 276. As cam 101A rotates it moves a roller on arm 100A, this arm having a bail 277 at its upper end adapted to engage and move forward any interponent 276 which may have been lifted into its path by the actuation of one of the manual tabulator keys. These interponents are respectively connected to rock-arms 278 adapted to engage the respective slides 279 to operate the respective tabulator levers 93 mentioned before. This hand tabulator follower arm 100a is fixed to shaft 267 which, as shown in Fig. 33, has an arm 268a fixed thereto. This arm 268A is adapted to depress rod 269a and through it an L-shaped spring metal plate 272a shown in Figs. 33 and 47. The outer end of the plate 272a overlies the end of the plate 272 as shown in Fig. 32. Therefore, it will be seen that the tabulator switch contacts 273 and 274 are adapted to be operated by the actuation of either the automatic tabulator shown in Fig. 32 or the hand tabulator shown in Fig. 31. The rod 269A is mounted exactly similar to the rod 269 on the fixed plate 271.

It is to be observed that whenever the machine is tabulated either by hand or automatically the key lock must be actuated. Therefore, the automatic and hand tabulating mechanisms are provided with identical auxiliary cams 280 which when moved elevate rollers 281 (Figs. 31 and 32) on arms 282 fixed on shaft 282B. The arm 282 associated with the automatic tabulator has a block 283 on the side thereof which is provided with a set screw 284 adapted to contact and elevate a flat plate 285. This plate 285 is mounted on an arm 286 pivoted on shaft 287, a rearward extension 288 of said arm 286 being forked to engage a stud 289 on the lever 120, supra, the movement of which operates the key lock device in the manner previously set forth.

The flat plate or lip 285 referred to in Fig. 32 will be seen in Fig. 44 as having considerable length and by reason of this is adapted to extend over a set screw 284A (Figs. 34 and 43) mounted on block 283A on arm 282A carrying roller 281A actuated by cam 280A. This cam is released by a mechanism similar to those releasing the hand and automatic tabulator but in this case the latch 103b is released by the energization of the key lock magnet KL also shown in Fig. 50. Therefore, it is observed that whenever the hand or automatic tabulator cams are released or the key lock magnet energized, the key lock link 122 is moved forward to lock the keys in the usual manner.

It is also to be noted from Figs. 1 and 34 that whenever the shaft 135 is actuated or rocked by the carriage return mechanism referred to above that a dependent arm 141 on shaft 135 will be swung clockwise to engage the stud 121 to also advance link 122 to lock the keys. Therefore, it will be seen that the key lock device will be actuated either by the energization of magnet KL, the hand or automatic tabulator or the carriage return mechanism.

CARRIAGE RETURN

The typewriting machine includes a power driven carriage return mechanism. A rack 126 (Fig. 1) is mounted on the under side of the rear rail of the carriage 51 and meshes with a pinion 127 on the upper end of a vertical shaft 128, on which a worm wheel 130 is loosely journaled. This worm wheel is driven by a worm 131 on a shaft 132 driven by a belt (not shown) at the right-hand side of the machine. Worm wheel 130 carries the driving element of a clutch, the driven element of which is a toothed sleeve 133 slidably splined on the shaft 128 and controlled by an arm 134 fast on rock-shaft 135 which at its left-hand end (Fig. 38) is controlled through an arm 136 by a mechanism not shown herein, but which is well known in the art. This mechanism may be so set that, at the end of a line of writing, the arm 136 is automatically moved upward by a spring (not shown) throwing the clutch member into engagement, and at the end of the return motion of the carriage, is automatically pulled down and latched down by means controlled by the carriage. This mechanism is not further described because it bears on the present invention only in respect that it opens a pair of contacts to break an electrical circuit during the time when the carriage is being returned. This circuit is the power circuit for all the magnets and relays in the machine, the opening of which prevents their operation during carriage return. These contacts 137 are shown in Fig. 38 in their closed position and are mounted respectively on two blades 138 and 140 fastened to the rear left-hand corner post of the typewriter and operated by an arm 139 dependent from and fixed to shaft 135. The shaft 135 has fast thereon a depending arm 141 (Fig. 34) which bears against the cross stud 121 to move it clockwise during the time when the carriage return mechanism is in operation. In the normal position of arm 139 the contacts 137 are closed, but they are opened whenever said arm is swung counter-clockwise (Fig. 38) during carriage return.

TOTALIZERS

Except as hereinafter described, the computing mechanism is of the sort that has long been used in the Remington machine and which is described in a line of patents, which in a way may be said to begin with that to Wahl 1,270,471, dated June 25, 1918.

The differential and control mechanism of this computer is mostly mounted on a casting 145 (Fig. 2), which casting is secured to the front top plate of the typewriter. Vertical totalizers or "dummies" 146 may be mounted at whatever points desired on a main truck 147, guided at the middle of the machine by rollers (not shown) and connected with the typewriter carriage 51 by means of certain arms 150 having pin and slot connections with brackets 151 at the ends of the truck. The machine also includes cross footing mechanism including a cross truck 152 carrying a cross totalizer 153 and controlled by the vertical totalizers 146, one after another through the intermediary of a pickup beam 154. At the end of each computing column computation, the cross truck 152 is freed from the vertical totalizer and is drawn back by a spring to its initial right-hand position.

The links 82 (Fig. 1) operate the usual fan segments and goose-neck cams (see Fig. 35) which rock a differential shaft 332 and operate the vertical master wheel (not shown) and a cross master wheel 156 (Fig. 3) to rotate the usual "carrier" gears of the vertical totalizer and the "carrier gear wheels" 158 of the cross totalizers 153. Motion of these gear wheels is transmitted by idler gears 160 to dials 161. The transfer mechanism, etc., are of a kind peculiar to the usual totalizers of the type designed to compute in English money. The vertical master wheel is reversible for subtraction by means of the usual hand lever not shown. The cross master wheel is reversible for subtraction by the usual means including a following roller 162 (Fig. 2) mounted on an arm 163 fast on a rock-shaft 164 and operating the usual reversing mechanism. The follower roller 162 is under the control of cams 165, one on each of the vertical totalizers 146, and each cam is settable to an upper position where it does not depress the roller but leaves the cross master wheel set for addition, as in the left-hand one of the four totalizers shown in Fig. 2, or to an intermediate position as in the third totalizer from the left, where it disconnects the cross master wheel, leaving it inoperative, or to a lowest position shown on the second and fourth totalizers where it depresses the roller 162 to its full extent and sets the cross master wheel to a subtracting position.

REVERSE MECHANISM

Both master wheels can be reversed simultaneously each irrespective of whether it was before set for addition or for subtraction by the mechanism used in this machine, and which includes (Fig. 26) a rod or bar 166 mounted in the rear of the actuator mechanism and normally occupying its left-hand position. When this rod is slid to its right-hand position, it reverses both master wheels. This can be done by a so-called correction key lever 167, which when depressed, pushes upward on a link 168, which operates the left-hand arm of a bell-crank 170, whose upper arm pushes the rod 166 to the right. The key lever 167 has at its rear end a pin that can play in a slot 171 in a vertical link 172, which can be pushed upward under the control of a key 173 which is usually called a credit balance key although that term is inept as applied to the present invention. In the present machine, the actual raising of this link 172 is effected by the case shift mechanism, which at the same time imparts an upward case shift movement to the platen 53 so as to print negative numbers with a distinctive form of type. Mechanism similar to that employed in the present machine has been in use on the Remington machine heretofore, but, as this mechanism has been modified somewhat for the purposes of the present invention, it will be described in some detail.

POWER OPERATED SHIFT AND REVERSE

The power-operated case shift mechanism (Figs. 26, 27, and 28) includes a rail 174 on which rides a roller or wheels 175 journaled on a stud from the lower cross bar 176 of the platen frame 52. This rail 174 is supported and operated in the manner shown in Fig. 7 of the patent to Hart No. 1,929,064, dated October 3, 1933, which patent describes a power-operated case shift, but not exactly like the one now employed. The rail 174 has several posts 177 by which it is supported, each of said posts being pivotally secured at 180 to a bell-crank 178. Each of these bell-cranks is pivoted to a stud 181 supported by the top plate of the typewriter and the downwardly extending arms of all the bell-cranks are connected by a long transverse link 182 in such a manner that by moving this link toward the left all of the bell-cranks will be rocked clockwise and will elevate the rail 174 and the platen frame. One of the bell-cranks 178 has pivoted thereto at 180 the upper end of a push link 183, which at its lower end is guided for vertical movement by suitable stationary guide plates. The lower end of this link is substantially directly above the power shaft 65 near the left-hand end thereof. Mounted loosely on the shaft 65 is an assembly comprising a cam 184, and a detent cam or disc 185. The latter has a concentric outline interrupted by two notches adapted to be engaged by a roller 186 mounted on a spring-pressed lever 187 so as to retain the disc and with it the cam 184 in either their normal position shown in Fig. 26 or in another position about 180° removed from normal. The cam 184 has pivoted thereto the usual clutch dog 188 adapted for cooperation with the usual toothed wheel 190 fast on the continuously rotating shaft 65. The parts are held in the normal position shown by a latch 191 pivoted on a stationary stud 192 and drawn upward by a spring 193 in position to arrest the dog 188 and force it out of engagement with the wheel 190. A second latch 194 above the cam assembly is adapted to arrest the dog 188 and the cam assembly after about a one-hundred and eighty degree rotation. This latch is in the form of a sort of floating lever having a downwardly and rearwardly extending part forked at its end to embrace a stationary stud 195 on which it can slide. The latch 194 is pivoted at 196 to a coupling member 197 guided for up and down motion by a stationary stud 198 passing through a slot in the coupling member. The lower end of this coupling member is forked to embrace a stud 200 projecting from the lower latch 191 in such fashion that, if the coupling member is pushed downward bringing the upper latch 194 into the path of the dog 188, it will push the lower latch out of engagement and permit the cam to make a one-hundred and eighty degree rotation. When the pressure on the coupling member is released, the parts are drawn by the spring 193 into their normal position as shown, releasing the dog 188 from the latch 194 and causing it to be arrested after a half-rotation at normal position by the latch 191. The coupling member 197 is connected with the lower latch 191 by a tension spring 201 so that, if the latch 191 is pulled downward, it tends to draw the latch 194 after it, but the spring can yield momentarily if the upper latch is held at the time.

The cam 184 is adapted to operate a follower roller 202 mounted on the end of an arm 203 pivoted on a stationary stud 204, said roller bearing on the top of the cam. At the right of the arm 203 is another arm 205 (see Fig. 27) substantially parallel therewith, and also pivoted on the stud 204. This arm 205 has a stud 206 on which the foot of the push link 183 rests and by which said link is pushed upward to effect the shift. The arms 203 and 205 are connected by a pair of strong springs 207 one at each side of the piece 205 and each is secured at its lower end to a post 208 projecting from each face of a depending branch of the arm 205 and at its upper end to a stud 210 projecting from the arm 203. Said stud is of such length as to project through a hole 209 in the arm 205 so as to support the two springs one on each side of 205. The hole 209 is larger than the stud 210, so that although the two arms 203 and 205 ordinarily rock together, the former can be forced a little higher when the stops arrest the upward shift of the platen, stretching the springs 207. Except for the spring 201, the case shift mechanism so far described is the same that has been in use in the Remington machine heretofore.

In the operation of the present invention, the case shift mechanism is brought into use when writing negative totals, by the latch 191 being drawn downward by a link 211 connected with an arm 212 of the armature 213 of an electromagnet R4 mounted on a stationary plate 215. When in entering items, it is desired to reverse the normal direction of the operation of the computing mechanism and to print an item in distinctive type, the case shift mechanism is brought into operation by means of the credit balance key 173. Without reversing the computing mechanism it can be brought into operation by means of the case shift key 216 or the shift lock key 217. To these ends a lever 218, pivoted at 220, has on its rear end an adjustable piece 221, which bears on the coupling member 197 so that a counter-clockwise rocking of the lever will depress that member and bring the case shift mechanism into operation. The lever 218 is rocked by a pin-and-slot connection 222 with the key lever 223 on which the case shift key or button is mounted. Said lever 223 has a restoring spring 224.

In the Remington machine the power driven case shift mechanism is also utilized to shift the reversing mechanism of the computer. To this end the usual shaft 225, which at its forward end is journaled in a frame plate 226 carries the arm 227 to which the link 172 is pivoted (see also Fig. 2) and has also at its forward end a small gear sector 228 meshing with another gear sector 230 on an additional shaft 231 lying parallel with the shaft 225 and, like it, journaled in frame plate 226 and in another frame plate 232. This shaft 231 has on its rear end an arm 233, which is connected by a link 234 (Fig. 28) with an arm or bracket 235 secured to the link 183 near the upper end of the latter. The construction is such that, when said link is shifted upward for upper case, it rocks the shaft 231 clockwise as in Fig. 28, in which figure the plate 232 is omitted for clearness. The clockwise rotation of the shaft 231 may be imparted to the sector 239, which will rotate the shaft 225 counter-clockwise and reverse the computing mechanism. Said shaft 225 also has at its rear end an arm 236 (Fig. 28) which operates a link 237, which extends to the bi-color ribbon mechanism of the machine and sets it for printing in red. The sector 239 is loose on the shaft 231, but is connectable with it by means of a clutch, one element of which consists of a notched hub 238 of said sector, and the driving element of which is a toothed sleeve 240 slidable on the shaft 231, but constrained to rotate with it by a pin-and-slot connection 241. In the Remington machine, as heretofore constructed, this sleeve 240 normally occupies a rear position out of engagement with the other member of the clutch so that a depression of the shift key 216 causes a case shift operation, but does not operate the shaft 225 and the computer reversing mechanism. A linkage is provided, however, of such sort that, if the credit balance key 173 is depressed, the clutch member 240 will be moved into engagement, and in that event the computing mechanism will be reversed, and the bi-color ribbon mechanism set for printing red. If this construction were used in the present machine, the R4 magnet would not reverse the computer. This standard Remington construction has, therefore, been modified so as to reverse the last mentioned mode of operation, that is to say, the clutch 240 is normally in engagement and remains in engagement if the credit balance key 173 is depressed, but is drawn out of engagement if the case shift key 216 is depressed with or without an operation of the shift lock key 217.

The clutch member 240 is controlled by means including an arm 242 pivoted on a stationary pivot 243 and lying in a peripheral groove on said clutch sleeve 240. This arm 242 is controlled by a toggle consisting of a link 244 pivoted to the arm 242 and pivoted at its other end to a link 245 which, in turn, is pivoted on a fixed stud 246. This toggle is normally straight or turned a shade upward beyond its dead center, but is adapted to be broken as shown in Fig. 30 by the depression of the shift key 216. The link 244 is preferably made of two layers by folding a long piece of sheet metal back upon itself, and the pivot 247 by which it is connected with the link 245 joins these two layers. Also straddling this pivot between said two layers is a lever 248 having a bifurcated end and a fixed pivot 250, this lever extending out in front of frame plate 226. The credit balance key 173 is pivoted at 251 on a bracket projecting frontward from the plate 226 and it is drawn upward by a fairly strong spring 252, its motion being limited by a heel 253 of the key lever coming against plate 226.

The shift lock key 217 is of the same construction as heretofore used in the Remington machine. It is pivoted at 254 to the key lever 223, its motion relative to said lever being limited by a stud 255 occupying a fork on the front end of lever 217. Said key is held in its upper position by a spring 256. This key lever has a short arm 257 which controls a locking dog 258 pivoted to the lever 223 at 260, and this lever has a stud 261 which is drawn up against the arm 257 by a spring 262, attached to said stud and to a stud on the lever 217. In the normal position of lever 217, the latch 258 is held in the position shown in Fig. 26, where it will not engage a sheet metal stop plate 263 projecting from the stationary framework. When, however, the lever 223 is depressed, by pressure of the finger on the key 217, the latter is rocked about its pivot 254, as shown in Fig. 30, depressing the lever 223 and allowing the locking dog 258 to snap in under the stop 263, so that, when pressure on the key is removed, the lever 223 will be held in its depressed position. The spring 256 tends to restore the lever 217, but is unable so to do on account of the frictional resistance on the dog 258 due to the pressure of said dog against the stop 263 by the superior spring 224. A tap of the finger on the key 216 will momentarily release this pressure and allow the key 217 to return to its normal relation to the lever 223 and allow the latter to return to normal position.

In order to release the clutch member 240 from the clutch member 238 when the case shift key 216 or shift lock key 217 is depressed, a bell-crank 264 is pivoted to the side of the credit balance key lever at 265 and its arm has a stud 266 lying beneath the front end of the lever 248. This bell-crank 264 extends alongside of the key lever 217 and it has an inclined slot embracing a stud 268 on the side of lever 217. The inclination of this slot is such that a depression of either of the keys 216 or 217 rocks the bell-crank 264 clockwise as in Fig. 30, rocking the lever 248 counter-clockwise and breaking the toggle 244, 245 and pulling the clutch member out of engagement. As shown in Fig. 30, in this operation the credit balance key remains in its upper position. By this means characters other than numerals can be printed in upper case without operating the change gear mechanism of the computers.

Depression of the credit balance key 173 moves the parts to the position shown in Fig. 29. In this operation bell-crank 264 acts as a push link on the stud 268 and first rocks shift lock key 217 about its pivot 254 and then rocks the lever 223 in the same way as if the shift lock key 217 itself had been directly operated. The result is that the locking dog 258 comes into operation and locks the lever 223 down. Means are provided whereby this also locks the credit balance key 173 down. In this operation the lower end of the bell-crank 264 passes over a stationary stop 270, consisting of a finger of sheet metal projecting inward from the stationary frame work. When the operator's finger is removed from the key 173, the spring 252 tends to restore said key, but in doing so it pulls upward on the bell-crank 264. It will be perceived that the depression of the key 173 in the manner described involves both a downward movement of the bell-crank 264 as a whole and also a counter-clockwise rotation of it about its pivot 265. The result is that the stud 266 is moved entirely away from the lever 248 and does not rock said lever. The clutch member, therefore, remains in engagement and when the platen frame is shifted, shaft 225 (Fig. 26) is rotated and the shift gear mechanism for the two master wheels is reversed in the manner and by the means well known in the Remington machine.

STAR, SPACE, AND TRIANGLE MAGNETS AND TIMING SWITCH

In Fig. 41 is shown a mechanism whereby the escapement mechanism is operated whenever the space lever is actuated either by hand or automatically and whereby the timing contact is actuated whenever either the space, star, or triangle magnets are energized. In this figure the space lever 84, operated by the space bar 83 (see Fig. 1), is pivoted loosely on shaft 85 and has a pin or stud 291 adapted to bear in one end of a slot 292 in an arm 293 fixed on a sleeve 294 which is rotatable around shaft 85. An arm 295 is fixed to sleeve 294 and has a pin 296 adapted to ride in a fork on an arm 297 (Fig. 1) pivoted on a shaft 298 and having an extension 299 projecting into a hole on the link 87 connected to the escapement rocker element 86. When lever 84 is operated by depression of the space bar 83, the arm 295 is rocked to effect operation of the escapement.

There are three magnets such as the Star, Triangle, and Space magnets shown in Figs. 41, 42, and 46. In Fig. 41, the view is taken in a plane to show the space magnet SP and its cooperating mechanism, but it is to be understood that the Triangle and Star magnets are disposed adjacent thereto as shown in Fig. 46 and having similar cooperating members except in minor details which will be hereinafter explained.

The space magnet SP when energized is adapted to thrust upward on a lip 300 of a pivoted arm 301 which has another lip 302 adapted to engage and lift the end of an arm 303 loosely pivoted on shaft 304. The rear end of arm 303 is connected by a link 305 to a bell-crank 68A which in operation is identical with previously described bell-crank 68 and adapted to swing a hook 66A into contact with the snatch roll 64, whereby the space operating lever 56 is depressed in the usual manner. The space lever 56 is provided with the usual upstanding lug 306, having a rollar 307 thereon, adapted to engage the upper end of arm 293 so that when the space lever 56 is depressed the arm 295 is swung by means of arm 293 as before disclosed to operate the escapement mechanism. When the Triangle and Star magnets, Tri. and St., are energized the same operation takes place except that the levers 56 connected therewith have no rollers 307 but their upstanding lugs 306 are connected to links 55 and type bars 54 which when operated effect the operation of the escapement through their heels in the usual manner.

It is to be observed, however, that whenever any one of these three magnets, Star, Space, and Triangle, is energized their respective hooks 66A are operated and when pulled down by the snatch roll their lower ends bear against and depress a universal plate 308 pivoted at 309. This plate 308 as shown in Fig. 43 extends beneath the hooks 66A and 66 of the Space, Triangle and Star magnets. A lower extension of this plate 308 is connected to a pull wire 309A, the other end of which is connected to a latch 310 pivoted at 311. This latch is adapted in the usual manner to engage a dog 312 related in the manner previously described to a clutch wheel 313 on shaft 65, said dog being mounted on a plate 312A. A roller 315 adapted to cooperate with cam 314 is mounted on arm 316 loosely pivoted on shaft 311. A lower finger 317 on arm 316 is adapted to engage a contact arm 318 to break its engagement with contact leaf 319 when the timing cam 314 lowers the arm 316. The cam latch 310 is also released by energization of the timing magnet TM which thrusts outwardly against the lower end of the latch 310 to effect the same result.

It is, therefore, apparent that the energization of any one of these three magnets above mentioned will cause the operation of the timing cam to open the timing switch; the printing of the star and triangle, and the spacing of the machine. This mechanism also permits the manual operation of the space bar in the usual manner. It is also apparent that the operation of the timing cam will hold the timing contact open during a full revolution of the cam and thus keep the circuit open until the moving parts of the machine during any operation have plenty of time to come to rest.

ACTUATOR CONTACT

In Figs. 35 to 37, inclusive, is shown another important feature of the invention designated as the actuator timing contact. This device is connected to the linkage which connects the vertical and horizontal or cross actuators. As shown in Fig. 35 the link 82 is adapted to rock the fan cam 320. This cam action results, as described in Wahl Patent No. 1,270,471, in the oscillation of rock-shaft 321. On this shaft is an arm 322 which engages with a full stroke arm 323 pivoted on shaft 324. Therefore, every time a numeral is printed the rock-shaft 321 is actuated which results in an actuation of the shaft 324. As shown in Fig. 36, the shaft 324 has thereon a collar 325 connected by arm 326 with link 327 which has connected to its lower arm an arm 328 pivoted on a stub shaft, 329. The link 327 has thereon a laterally projecting switch actuating arm 330 which when moved upward engages the insulated end of a spring switch member 331. This member 331 is related with several other contacts in the manner indicated in Fig. 37 and in the circuit diagrams is indicated as Actuator switch in Fig. 49. As seen, when a numeral cam is rotated the arm 330 of link 327 snaps up for an instant during which time it closes the T. M., R2, and R1 contacts and opens the common contact Com. Bk. Later in the description of the actuation of the machine as it is operated in working out a problem, the particular functions of these contacts and their timed opening and closing will be set forth more in detail. Also, shown in Figs. 35 and 36 are the upper and lower differential shafts 332 and 333 associated with upper and lower rocker shafts 321 and 334. These respective shafts are connected by suitable linkages in a manner well known in this art and are clearly shown in the Wahl patent supra (see Fig. 4 thereof).

CIRCUIT CONTROL CAMS

In order to control the electrical circuit by the typewriter carriage in a manner to be explained hereafter, the following devices are provided as shown in Figs. 1 and 15–25, inclusive. Slidably mounted on the top of the tabulator frame 92 are upper and lower slidable control plates 335 and 336, the rear ends of which are adapted to engage and move certain contacts and the front ends of which are provided with a double-sloped projection such as 337 adapted to be engaged by certain cams mounted on the carriage stop bar 88. In Figs. 15 and 17 it will be seen that disposed along the stop bar 88 is a series of spaced pairs of stop plates 90 from the upper edge of which project threaded studs 338. Lower cams 339 are provided with apertures to receive these studs and knurled nuts 340 are screwed on to hold the cam plates 339 in place on top of the pairs of stop plates 90. Fixed to the surface of the lower level cams 339 are one or more upper level cams 341 held in place by means of suitable spacing sleeves and rivets.

From Figs. 22 and 24 it will be seen that these upper and lower level cams are provided with a series of off-set steps, the detail function and operation of which is described later. However, it can be observed that the two cams have, aligned, first steps such as 342 and second steps 343. The lower cams are also provided with third steps 344. The corresponding steps of the respective cams are disposed as noted in the same plane of movement as the carriage. As will be explained later certain switches or contacts are selectively operated by the movement of these cams and the engagement of their various steps with the slide plates 335 and 336 which actuate the switches.

It will be observed from Fig. 17 that the front to rear positions of the cam plates 339 and 341 are disposed relative to the vertical totalizers 146 and as will be pointed out later the position of the cams and their steps are predetermined to produce definite results.

Fastened to the back of the tabulator frame 92 at the top thereof is a casing 345 in which is housed in any suitable manner a plurality of contacts which are operated by the upper and lower level slide plates 335 and 336 and are called, therefore, upper and lower level control slides. As shown in Figs. 17-21, inclusive, there are disposed within the casing 345 a series of four banks of switches. These switch banks are shown in the circuit diagrams. For example, the switch shown in Fig. 18 is an upper level switch and has contacts thereon corresponding precisely to those shown in Fig. 48 and designated as bank D. The switch shown in Fig. 19 is an upper level switch and has contacts thereon corresponding precisely to those shown in Fig. 48 and designated as bank C. The switch shown in Fig. 20 is a lower level control switch and has contacts thereon corresponding precisely to those shown in Fig. 48, and designated as bank B. The switch shown in Fig. 21 is a lower level control switch and has contacts thereon corresponding precisely to those shown in Fig. 48 and designated as bank A.

CROSS TOTALIZER AND SENSING DEVICE

Referring now to the cross totalizers and the mechanism whereby the totals thereon are sensed, and, through the circuits, are printed automatically, reference may be had to the mechanical disposition of these parts shown in Figs. 2-14, inclusive.

Figure 3:
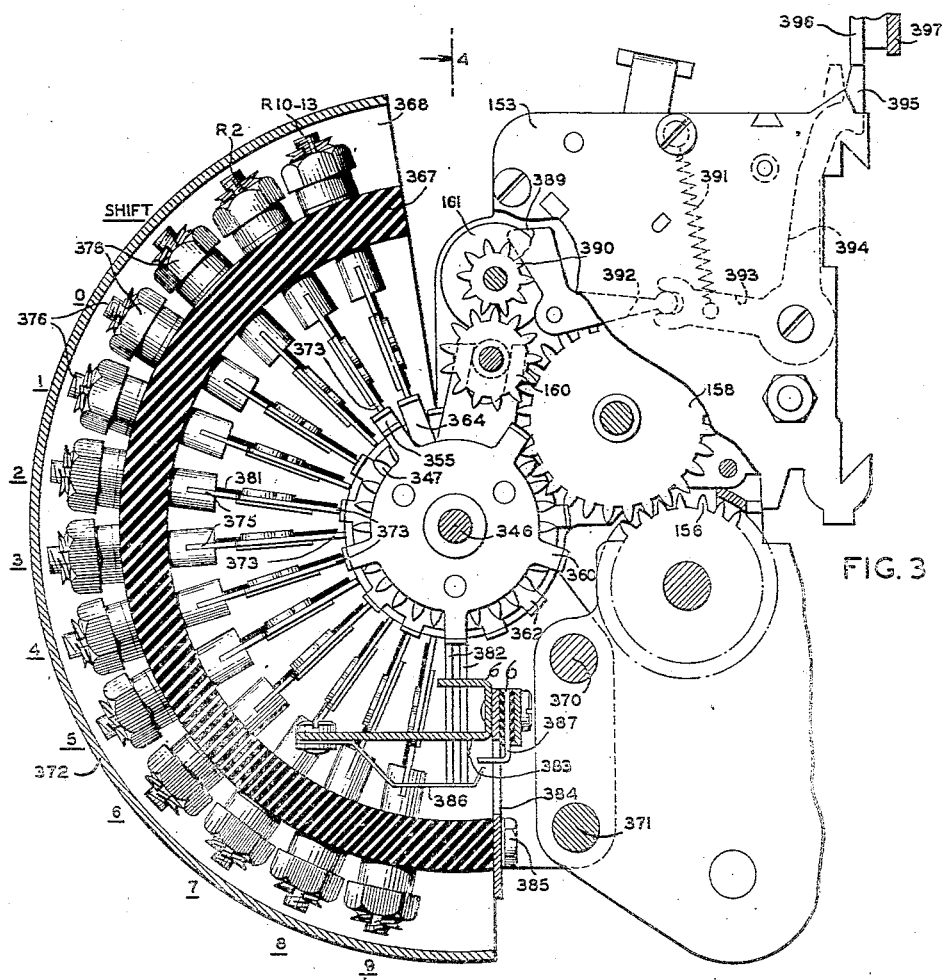
Fig. 3 is a right-hand view on an enlarged scale partly in section and showing the digit sensing mechanism.

As shown in Fig. 3 the cross totalizer 153 is provided with an extra shaft 346 having journaled thereon a set of toothed wheels such as 347 having thirty teeth. In these figures the construction illustrated is one which is adapted for computing and printing in terms of English or sterling currency. To this end the totalizer is provided with a plurality of pounds wheels, two shillings wheels and one pence wheel. In the form shown in Fig. 4 five pound wheels are shown, although it is to be understood that more may be used if desired. Shaft 346 of the cross totalizer is mounted between side plates 348 and 349. At the left end of the shaft is mounted a gear 347 to which is attached a shift sensing disc 350, also shown in Fig. 8, having sensing teeth 351 angularly spaced apart a distance equal to two teeth of gear 347. This gear and disc unit is not connected to a register dial but is, in a well known manner, adapted to contact a sensing finger 373 to be later described. This disc has only two positions, one when the total is positive and the sensing finger does not engage any of the teeth 351 and another when the total is negative and the sensing finger does contact with one of the teeth 351 to operate the shift circuit as later described.

Figure 6:
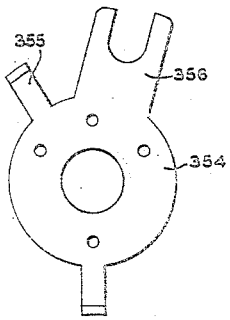
Fig. 6 is a side elevational view of the decimal space senser wheel of the totalizer.
Figure 7:
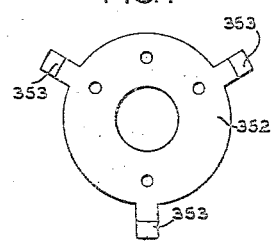
Fig. 7 is a similar view of the pounds and units of shillings senser wheel of the totalizer.

Next in order on the shaft 346 are five pound gears 347 to each of which is connected pound sensing discs 352 of the form shown in Fig. 7 with teeth 353 disposed thereon so that when one is in position to contact a zero sensing finger another is disposed in a line vertically below the shaft 346 as shown. Next in line is a blank disc to which is attached a sensing disc 354 having a tooth 355 (Fig. 6) adapted to engage the R2 sensing finger 373. This disc is held in fixed angular position by having an arm 356 forked to embrace the shaft on which the idler gears 160 are mounted. Next in line on shaft 346 is a gear 347 with an attached tens of shillings disc exactly like the shift disc 350 having teeth 351 supra. Next in line is another gear 347 with an attached units of shillings disc exactly like disc 352 (Fig. 7) with teeth 353 thereon.

The remainder of the shaft 346 is now taken up with the pence sensing discs and associated discs and is illustrated particularly in Figs. 9-14 to which reference may be had. In this structure the first gear starting from the left thereof on shaft 346 is a pence gear 347 fixed to a hub 357 journaled for rotation on shaft 346. At the right-hand end of hub 357 is a blank disc 358 to which is fastened a pence sensing disc 359 shown in Fig. 10 and having spaced sensing fingers 360. Disposed next to the right of pence gear 347 is an odd and even disc 361 shown in Fig. 14, having teeth 362 displaced the same angular distance as on the shift disc 359. This disc is connected to an odd and even gear 347 which is rotatable on hub 357. This disc 361 is adapted through its teeth 362 to contact with the shift sensing finger when the disc is in the odd position in order to energize relay R—11. At the same time, since the shift finger is one space to the left of the other fingers, the R10—13 sensing finger is engaged by the R10—13 disc 363 shown in Fig. 12 and provided with a tooth 364 for such engagement. This disc 363 is attached to a blank disc 365 and has a forked arm 366 embracing the shaft of the idler gears 160 in the same manner as does the decimal R2 disc shown in Fig. 6.

Figure 2:
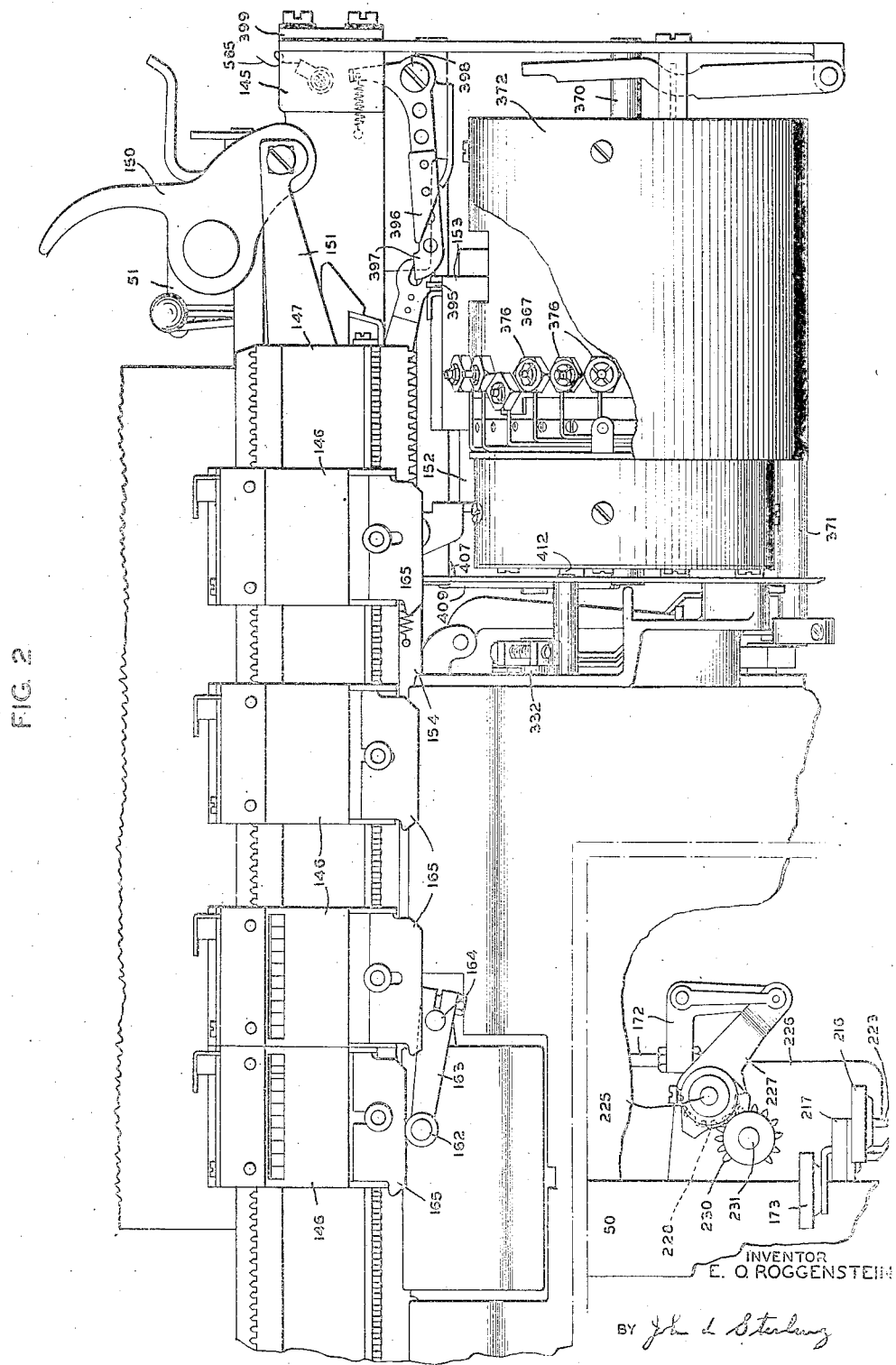
Fig. 2 is a partial front elevation of the machine, showing the vertical totalizers and the sensing unit.
Figure 4:
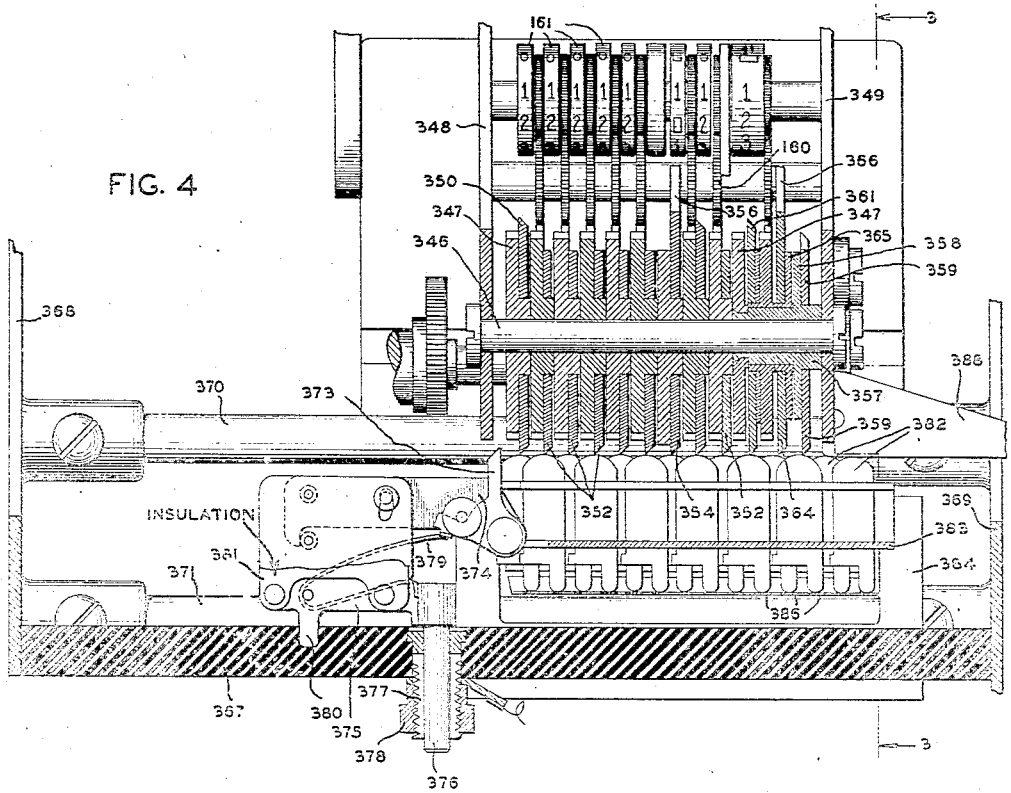
Fig. 4 is a vertical lateral section through the cross totalizer and the add-one mechanism showing the parts in the position they occupy before the totalizer wheels are sensed.
Figure 5:
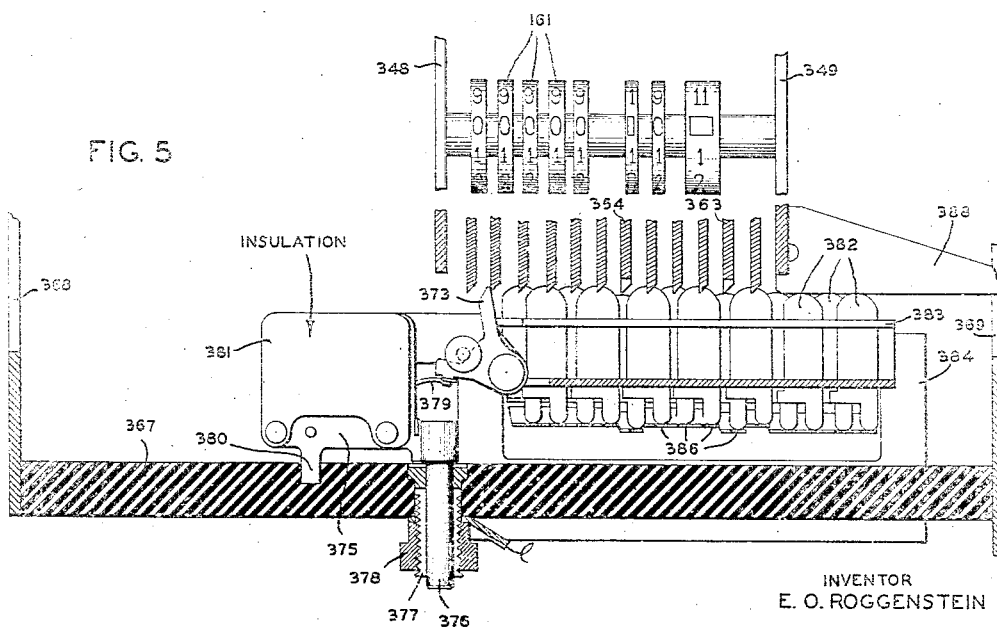
Fig. 5 is a similar view showing the parts in the position assumed in the first printing position.
Figure 9:
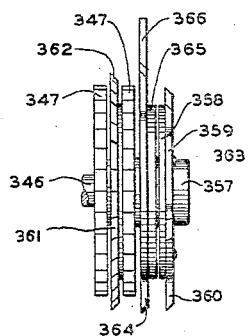
Fig. 9 is a front elevational view of the sensing wheels of the cross totalizer which relate to the pence wheels.
Figure 10:
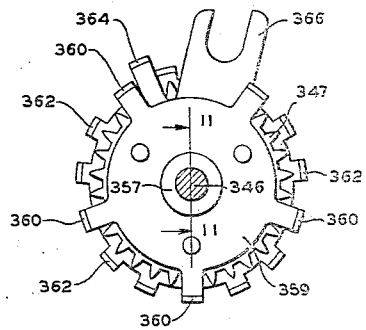
Fig. 10 is a side elevational view of the same showing the pence disc in elevation.
Figure 11:
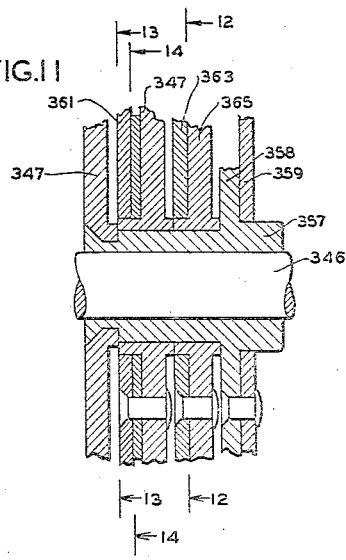
Fig. 11 is an enlarged partial cross section through the unit shown in Fig. 10 taken on the line 11—11 of Fig. 10.
Figure 12:
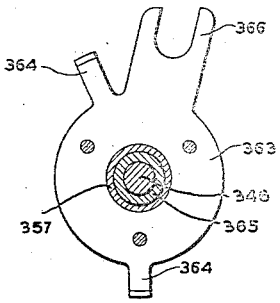
Fig. 12 is a side elevation of the R—10—13 sensing disc taken on the line 12—12 of Fig. 11.
Figure 13:
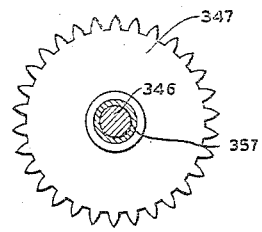
Fig. 13 is a side elevation of the pence gear taken on the line 13—13 of Fig. 11.
Figure 14:
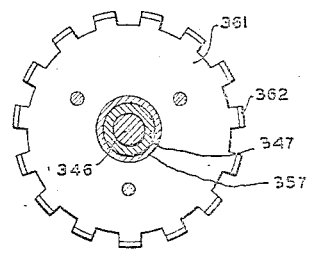
Fig. 14 is a side elevation of the over and under disc taken on the line 14—14 of Fig. 11.

Reference may now be had to the sensing fingers which cooperate with the sensing device on the cross totalizer to selectively actuate certain circuits. This construction is shown in Figs. 2, 3, 4, and 5. There is provided an arcuate plate of insulation such as 367 which at its ends is suitably anchored to end plates 368 and 369 (Fig. 4) which, in turn, are supported on rods 370 and 371 extending from the frame of the actuator in a manner quite similar to that shown in my copending application 236, 854 (Figs. 2, 3, and 6). A cover plate 372 is suitably disposed over and spaced from the insulating plate 367 as shown in Fig. 3. On this arcuate insulating support 367 is disposed a series of sensing fingers the center of the arc being the center of shaft 346. As shown in Figs. 4 and 5, particularly, each finger 373 is pivoted on the outer end of plate 374 which, in turn, is pivoted to a metal plate 375 with suitable stops shown for plate 374 and finger 373. The plate 375 is fastened to a stud shaft 376 which by any suitable means such as threaded sleeve 377 and nuts 378 may be disposed in an aperture in the insulating support 367. A spring 379 is mounted on plate 375 to engage a portion of finger 373 and tends to hold it in a normal position as shown in Fig. 4. A dependent ear 380 on plate 375 fits a hole in support 367 to hold the plate 375 and associated parts in proper alignment. The plate 375 is provided with insulating sheets 381 on each or one side thereof to insulate each sensing finger unit from the adjacent ones. This construction is similar to the corresponding unit shown in my application, S. N. 236,854, supra. It will be seen that finger 373 can swing counter-clockwise on plate 374 and that plate 374 will swing clockwise when the teeth on the totalizer are returning to normal. In Fig. 3 and in the circuit drawings it will be seen that there is a plurality of these sensing finger units disposed in a plane on the support 367 substantially in line with the master wheel of the cross actuator. As shown the top finger is the "R10—13," the second one the "R2," the third one the "Shift" finger and the remaining ones the "0—9" fingers in order. The R—2 sensing finger such as 373 shown in Fig. 5, is bent to the left to permit sensing of the tooth 355 of the decimal sensing disc 354 to take place after the tens of shillings wheel has been sensed so that the relay R—2 will not be operated if there is a zero in the tens of shillings position but will be operated immediately thereafter so that a zero occurring in the units of shillings position will be printed as a zero. The "shift" finger unit is disposed to the left of the others as shown in Fig. 2 so as to hit its sensing disc at about the same time as the numeral fingers are hitting the disc of the highest wheel connected to a dial. As shown in Fig. 4 the parts are in a normal position before the discs on the totalizer have started to act on the sensing fingers. In Fig. 5 the parts are shown in the first printing position after the shift tooth has passed the shift finger and a significant wheel in now actuating its sensing finger through its sensing disc.

In the English money form of the machine herein shown the add-one mechanism is different from the selector plate hitherto used with American money machines, due to the fact that the tens of shillings and even and odd, as well as the pence wheel, project between the #1 and #9 positions so that, if an add-one in the pounds, tens, or units of shillings occurs, the above described wheels would still contact the former type of selector plate and, therefore, the adding of the fugitive one would not take place. The improved form of add-one sensing unit is shown in Figs. 3, 4, and 5 and comprises a series of depressible flat plungers 382 arranged in staggered relation in slots on a supporting bar 383. This bar is supported from a plate 384 attached by adjusting screws 385 to the end face of supporting plate 367 (see Fig. 3). The lower ends of these plungers 382 are adapted to bear against a comb spring 386 which is fastened at one end to the bar 383 and at the other end is adapted to contact with a common bar 387 insulated from but supported by bar 384. When the plungers are not depressed the springs 386 contact with bar 387 but when all the plungers are depressed the contact between bar 387 and springs 386 is broken, thus affecting the circuit to relay R—8 and R—9 in a manner which will be described later. The plungers are adapted to be disposed vertically below the axis of shaft 346 and to be engaged by teeth on the various sensing discs when said discs are disposed in normal or zero position. When all of the sensing discs over the plungers are at zero the plungers will all be depressed and thus break connection between the springs 386 and the contact bars 387. The springs through the plungers, and the sensing discs, etc., are connected to ground and the contact bar is connected to the circuits related to relays R8 and R9 in a manner and for purposes to be described. Fastened to the right-hand side plate 349 of the cross totalizer (see Figs. 4 and 5) is a tongue 388 having a smooth straight bottom edge adapted to pass over and successively depress the plungers 382 as the totalizer is moved to the left. It will thus be seen that as the last significant digit other than zero moves to printing position (Fig. 5) the remaining discs in the totalizer will be at zero and their lower teeth will be depressing the plungers in addition to those depressed by the tongue 388 whereby said above mentioned circuit is broken and the R5 tens complement relay is allowed to become energized in a manner later to be described. It will also be noted that the decimal disc 354 as well as the R10—13 disc 363 (Figs. 4 and 5) are both provided with a vertically dependent tooth to assist in this add-1 operation when all the numeral sensing discs are at zero position.

Figure 53:
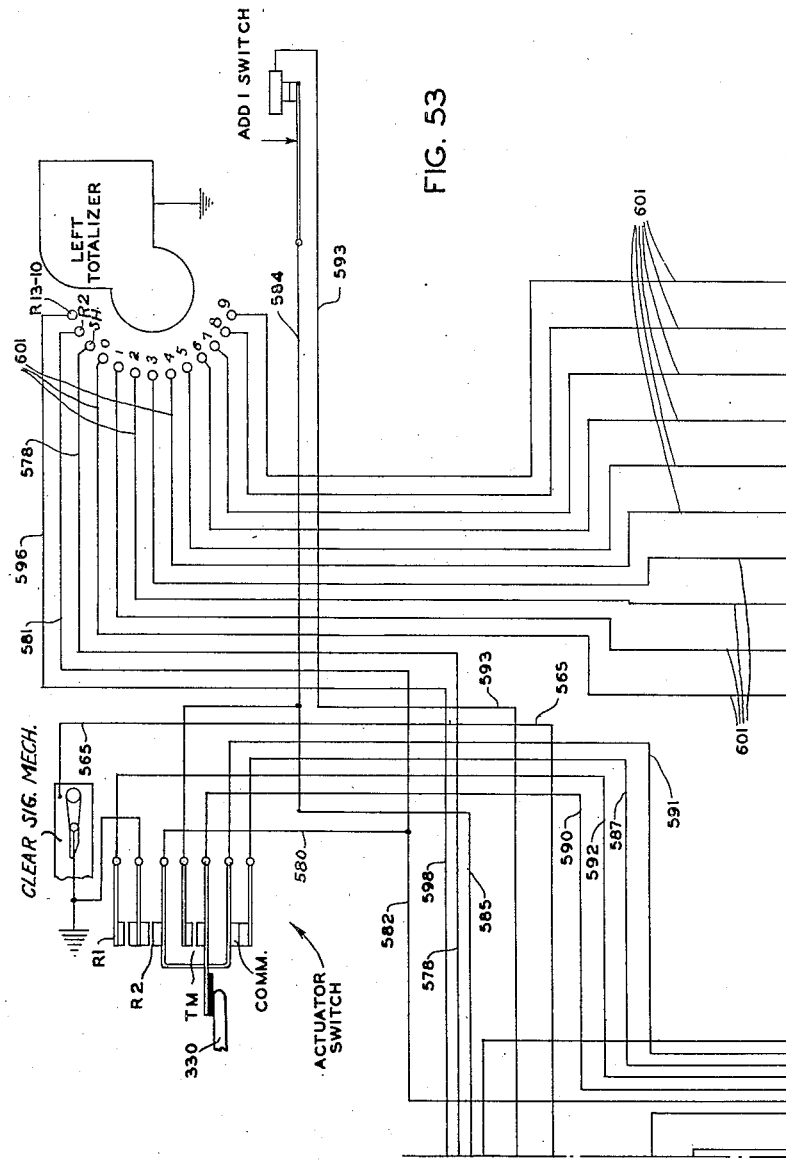
Figure 54:
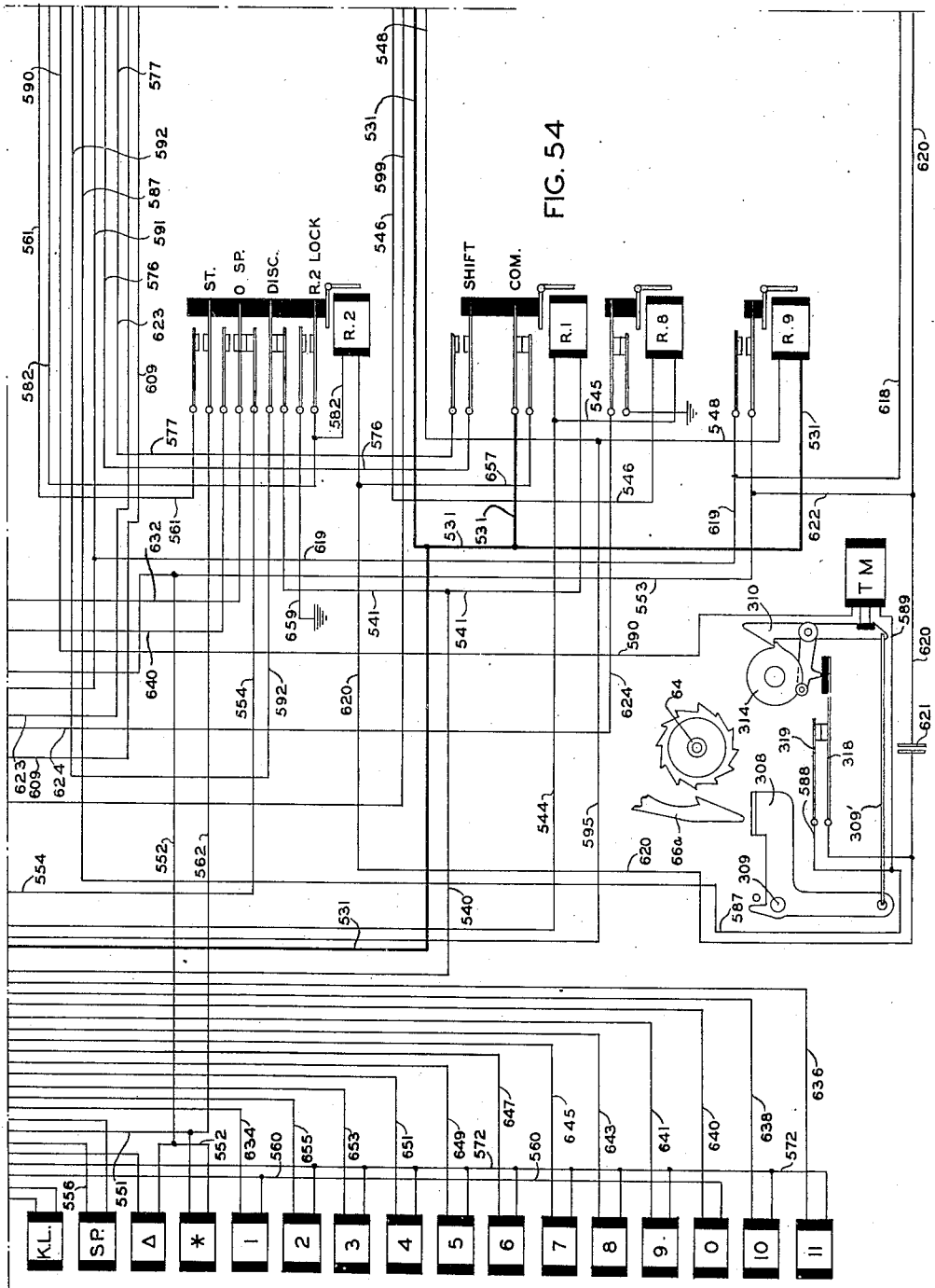
Figure 55:
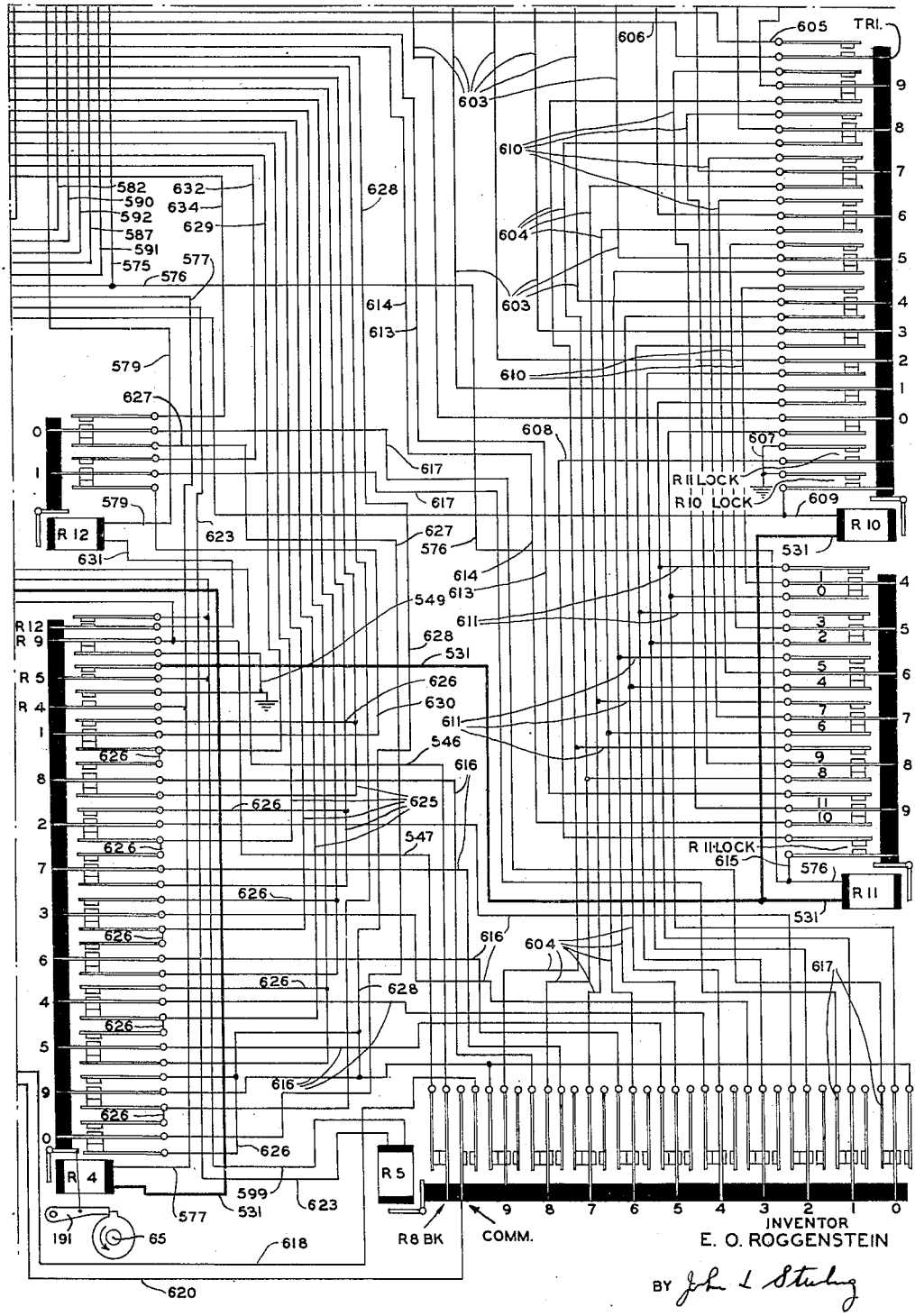

Referring to Figs. 2, 3, 39, and 40, a clear signal mechanism is mechanically illustrated which is diagrammatically shown in the circuit drawings for example in Fig. 53. This clear signal mechanism includes the usual feeler 389 (Fig. 3) resting on the teeth of the dial pinions and, when the last totalizer wheel comes to zero position, they are permitted by the aligned foreshortened pinion teeth 390, to assume the position as shown under the pressure of a spring 391 acting through the articulated bell-cranks 392 and 393. When any pinion is turned to a position other than zero, its full length teeth swing the feeler clockwise and the bell-cranks 393, 394 counter-clockwise, moving the projecting finger 395 thereon from its clear-signifying position shown in full lines to its non-clear position indicated by dotted lines. When the totalizer 153 is cleared, it returns to the right end or normal position, and finger 395 runs under and lifts the usual cam 396 (Figs. 2 and 39) which is secured to a lever 397 pivoted at 398 to a frame plate 399 and acted on by a spring 400. When the totalizer is not cleared the finger 395 does not touch cam 396. In the present machine the finger 395 and the cam 396 constitute contacts to close a clear-sign printing circuit and the plate 399 is therefore, insulated by sheets, washers, and sleeves 401 of insulating material separating the plate 399 from the casting 145 and from the securing screws 402. A wire 565 (see Fig. 53), for example, is secured to plate 399 and forms part of the circuit. When, therefore, the totalizer is cleared the finger 395 will on the return movement of the totalizer raise the cam 396 and cause lever 397 to contact frame plate 399 to which the circuit wire 565 is connected, thus actuating the star magnet in the manner before noted. The totalizer is grounded, of course, through the machine as usual. Also, in connection with this mechanism is a simple device whereby the Star and Triangle keys may be locked when the register is not cleared. To this end is provided a bell-crank 403 pivoted at 404 on casting 145. One end 405 (Fig. 40) of this bell-crank is slotted to embrace a lateral extension 406 on the end of lever 397. The other end of bell-crank 403 has a dependent arm 407 (Fig. 39) which is adapted to have its bent end 408 pass through a slot in a frame plate 409 and to lie abutting the upper end of an arm 410 which is pivoted to said frame plate 409 at 411. The other end of the arm 410 is bent at 412 and extends rearwardly to engage a link or bail member 413 which is connected in any suitable manner to the Star and Triangle key mechanism. As shown in Figs. 39 and 40 the parts are in the position when the totalizer is cleared and is lifting cam 396. Thus, finger 408 is withdrawn and the star and triangle keys may be depressed manually. However, it is obvious that when the cam 396 is not elevated the finger 408 is projected into the path of the upper end of arm 410 to prevent its movement and, therefore, prevent the movement of the two manual keys.

OPERATING CIRCUITS

The electric circuits for operating the mechanism for printing totals from the totalizers (see Figs. 48–55, inclusive) will now be described.

The totalizers as described above are adapted to actuate contact fingers which close circuits controlled by relays for actuating the necessary printing magnets. Four control switch banks A, B, C, and D are actuated by cam plates 339 and 341 mounted on and controlled by the carriage as described under "Circuit control cams."

Current for actuating the electrical apparatus is provided from a rectifier Rect.

Figure 48:
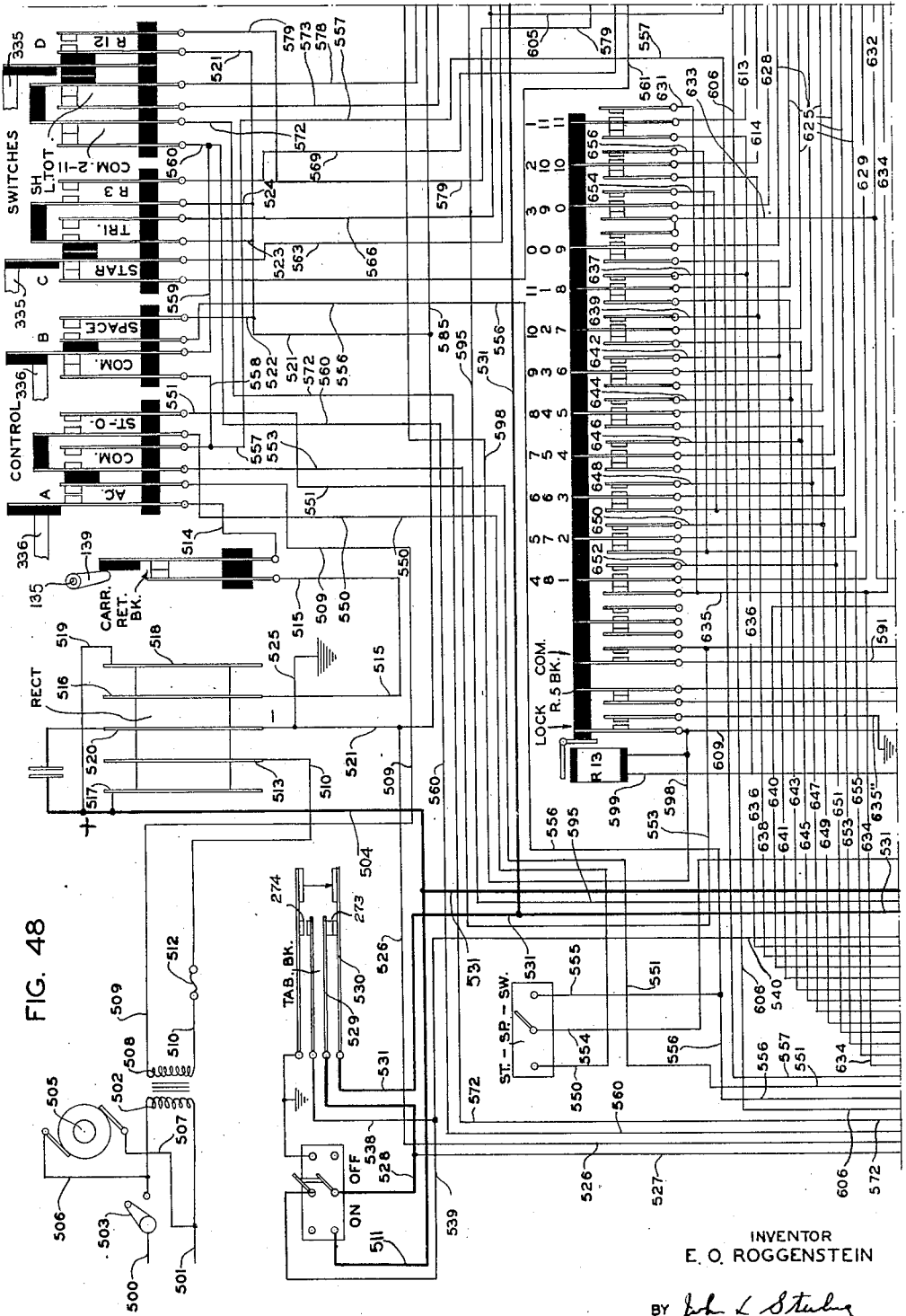
Figure 50:
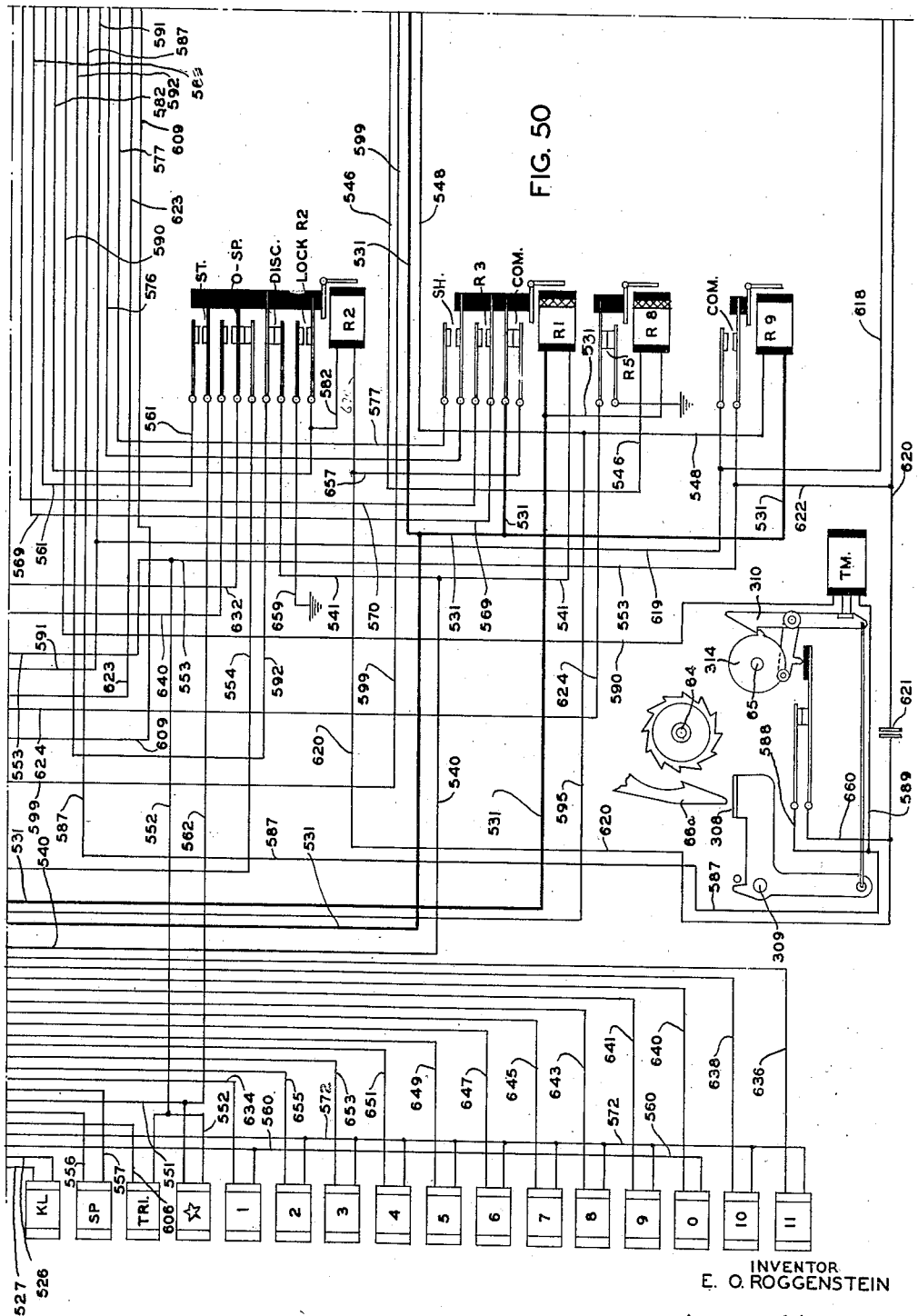
Figure 51:
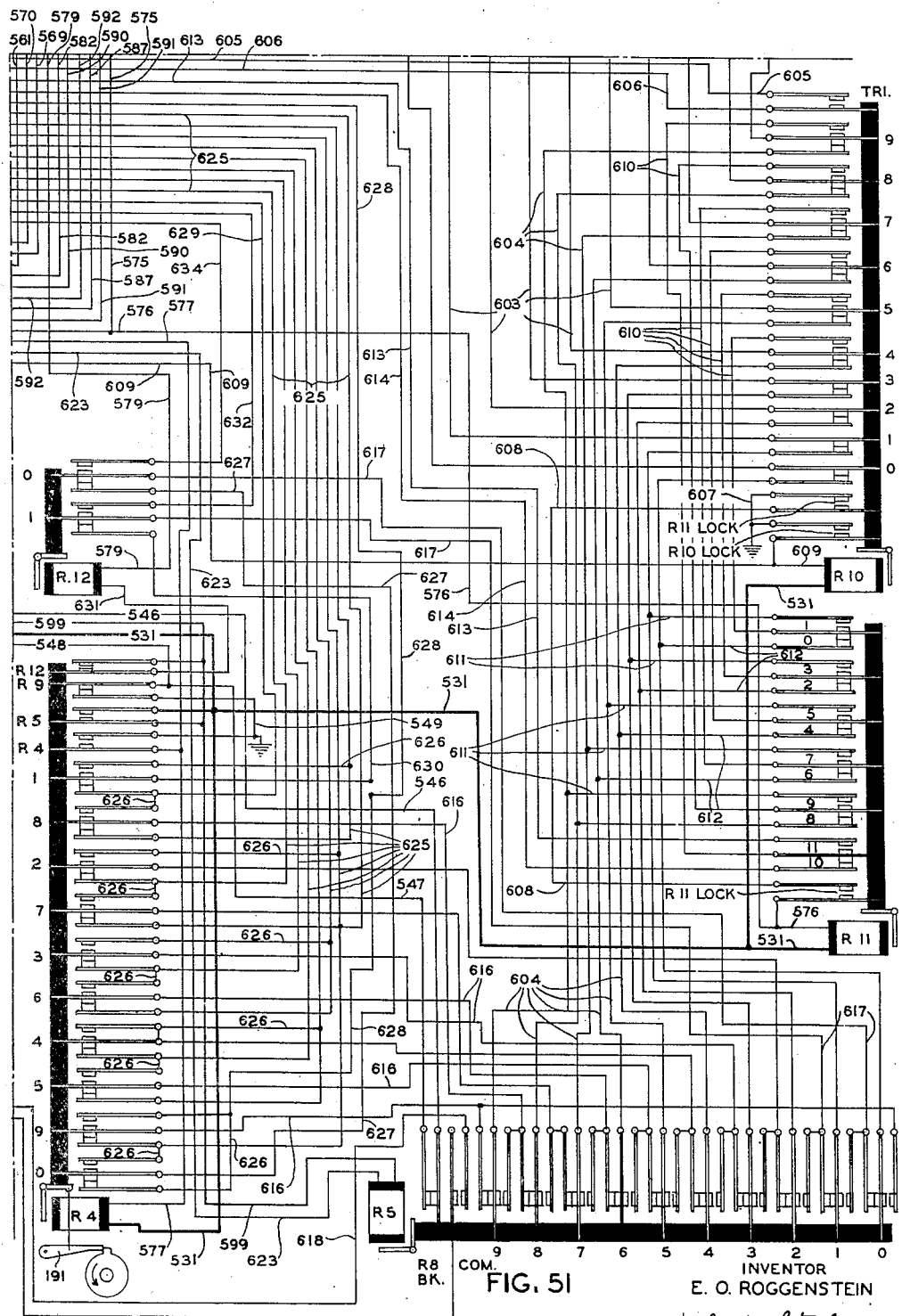

The various relays and switches have rather definite functions and operative relations which are hereinafter briefly and generally set forth:

Start relay R1 (Fig. 50) has a common contact Com. between source and the common return circuit; a contact R—3 for controlling relay R3 (Fig. 49); and a contact SH for controlling relay R4 (Fig. 51). This relay R1 is actuated from ground through upper contact of the tabulator switch Tab. Bk. when the carriage reaches printing position. When energized the contact Com. is opened to prevent printing, and the contacts SH and R3 close to permit relay R4 to energize and lock when there is a negative total and relay R3 to shift the control of the printing to the right totalizer under direction of contact R3 of the control bank C (Fig. 48). It will be noted that in printing a sub total even if the SH contact on the totalizer is closed, there will be no shift action due to the fact that contact SH on relay R1 is open at this time. As soon as the tabulator switch Tab. Bk. (Fig. 48) is released relay R1 is deenergized, but being a slow release relay (as indicated by the black cap) gives relays R3 and R4 a chance to energize and lock up over their locking circuits. When relay R1 releases, it closes the contact Com. permitting printing.

This contact Com. also closes the return circuit to relay R2. Relay R1 is also connected to ground through the upper midpost of the On-off switch when this switch is in "off" position. This permits the energization of relay R1 and the breaking of contact Com. when the carriage is moved manually to a tabulating position. The input circuit of relay R1 is connected through the contact Disc on relay R2 so as to energize relay R1 when the disconnect lever is operated, thus opening the common return circuit. However, the contact Disc is opened by the operation of relay R2 as soon as a numeral has been printed to prevent the rebound of the actuator switch (Fig. 49) from energizing relay R1.

Control relay R2 (Fig. 50) is operated when relay R1 is normal through the contact Com. of relay R—1 and is controlled either by the R2 contact on the Actuator switch or by the R2 decimal senser finger on either totalizer. When actuated it breaks its 0—Sp. contact and shifts the circuit to the "zero" magnet to print zeros as zeros after the decimal point or the first digit, instead of spacing as ordinarily. When actuated, it also opens its contact Disc to prevent operation of relay R1 on the mere normal rebound of the Actuator switch on printing of any numeral other than zero. When operated it locks up under control of contact Com. of relay R1. It also closes the star circuit to print a star under control of the Clear signal through the left totalizer after total therein is printed.

Transfer relay R3 (Fig. 49) is operated when the lower contact of the tabulator switch Tab. Bk. is closed at the end of the automatic tabulating movement and/or release of the tabulator key. It locks up through the R3 contact on relay R1, and R3 contact of control switch bank C to ground. Since relay R1 is operated only when the carriage arrives at a total-writing column position, relay R3 will not be energized except during or at the end of this period and just before relay R1 (slow release) releases.

Figure 49:
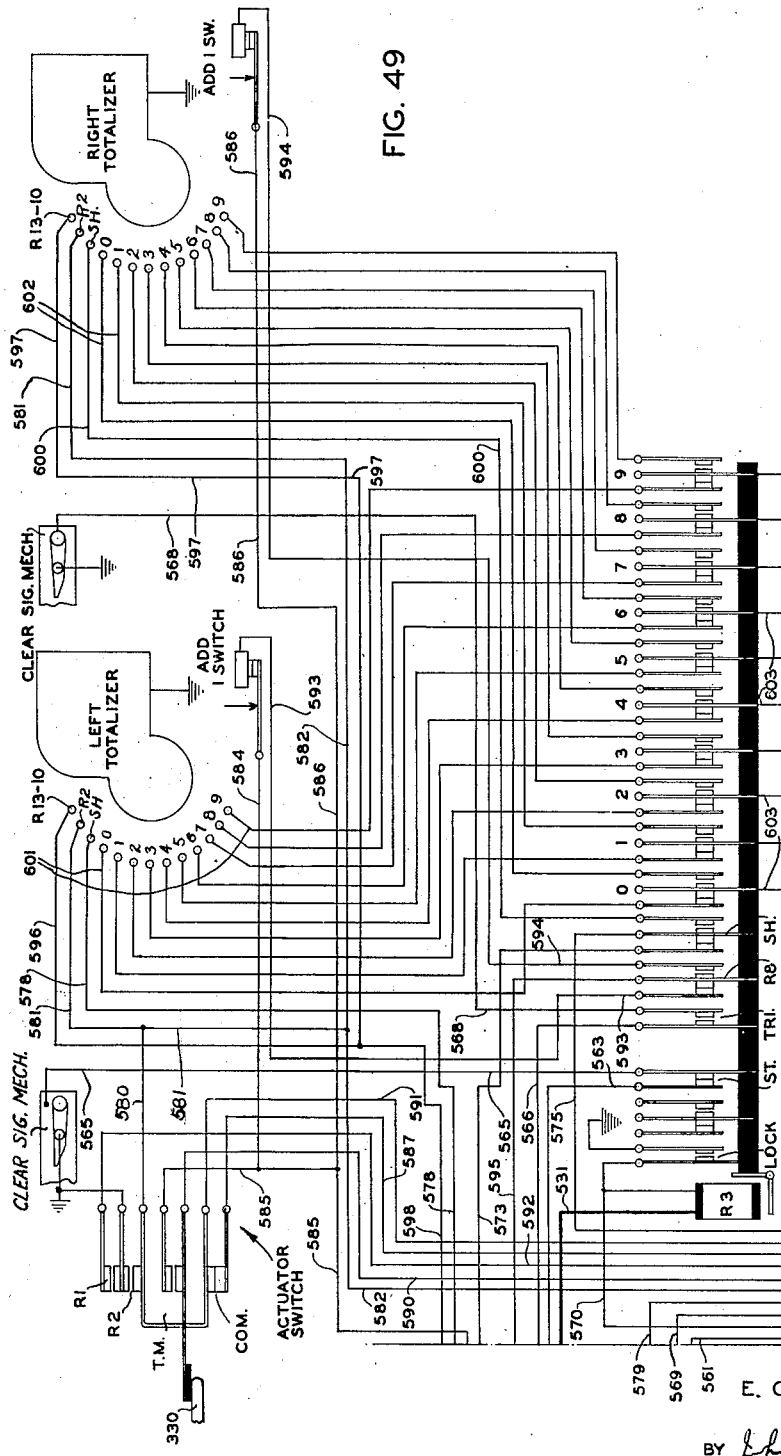

*Return circuit.*—It will be noted that wire 531 in Figs. 48, 49, and 50 is shown heavier than the remaining wires. This wire is the return wire for relays R3, R4, R9, R10, and R11, which leads from the positive plate 517 of the rectifier Rect. through the on-off switch through the lower contact of the tabulator switch Tab. Bk. and thence to the relays. It also extends directly from the relay R1 to the positive plate 517 of the rectifier. It is shown in this form to simplify the tracing of relay circuits.

Figure 52:
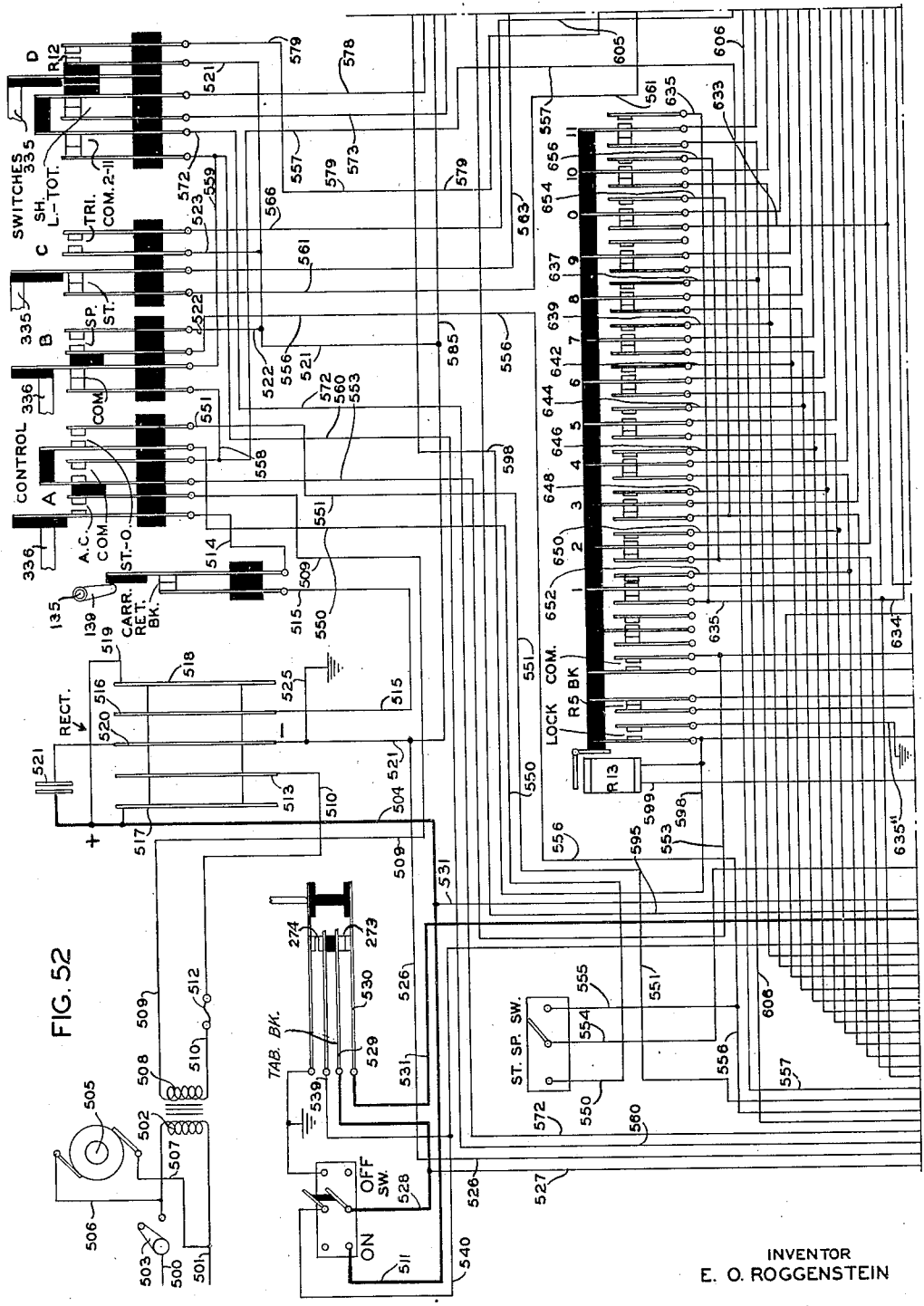

Upper and lower level control switches are shown in Figs. 48 and 52 and are operated by a series of control cams 339 and 341 as shown in detail in Figs. 17 and 22–25. These cams are mounted on the carriage stop bar 88 and are arranged in lower and upper levels. The faces of the cams are provided with off-set steps and when disposed opposite the various switch banks operate slide plates 335 and 336 in accordance with the selective arrangement of steps on the various cams. Thus, generally the operation of the switch banks takes place in three steps, the lower cam being provided with three steps and the upper cams provided with two steps. Usually the first and second steps of the lower and upper cams are disposed in the same plane as shown. The third step of the lower cam projects beyond the other steps as shown. There are two sets of cams one set for use with a left totalizer (Fig. 17) and the other set for a right totalizer (Figs. 22–25). Each of these switch banks contains a plurality of contacts. The detail operation and relation of these cams and switches will be discussed fully in the problem example to be set forth hereinafter. At this point the function of the several contacts is listed as follows:

Switch bank A (lower level)

Contact AC controls the current supply to the rectifier for the various control magnets. This contact is closed by the first step on the control cam.

Contact Com. controls the common circuit for the control relays and is closed by the second step of the cam.

Contact St.—0 controls the circuit for the Star and Zero magnets, and is closed by the second step of the cam.

Switch bank B (lower level)

Contact Com. controls the common circuit between banks A and D and is opened by the third step on the cam.

Contact Space controls the circuit for the space magnet and is closed by the third step on the cam.

Switch bank C (upper level)

Contact Star controls the circuit for the star magnet and is opened by the first step.

Contact Tri. controls the circuit for the triangle magnet and is closed by the second step.

Contact R3 controls the operation of the relay R3 and is closed by the first step.

Switch bank D (upper level)

Contact Com. 2—11 controls the common circuit for the 2—11 magnets and is opened by the second step.

Contact Shift L. Tot. controls the shift circuit of the left-hand totalizer and is opened by the second step.

Contact R12 controls the operation of the relay R12 and is closed by the second step.

Tabulator breaker switch (Fig. 48) is operated either by the operation of the manual or automatic tabulating mechanism to close the upper contacts and open the lower during tabulation and to maintain this condition until the tabulator key is released or automatic tabulation is finished. In hand tabulation this switch will not be restored to normal until the hand is removed from the key. This switch prepares a circuit for relay R—1 through its upper contact which is completed to the rectifier only after the AC contact on bank A is closed upon the arrival in total writing position. The lower contact is open to break the return circuit to the other control relays.

On and off switch (Fig. 48).—In "off" position it connects a ground to relay R1 to operate that relay as soon as the carriage gets to total writing column position.

In "on" position, it places the key lock magnet KL directly in circuit with the rectifier to be actuated as soon as the AC contact in bank A is closed. It also places the lower tabulator contact in the return circuit to the rectifier and controls the following relays, R3, R4, R9, R10, and R11, and the relays R12 and R13 through contact R5 of relay R4.

Timing Magnet and Switch

The timing magnet and switch functions under the control of the actuator breaker switch on printing of any numeral, to trip the timing cam and open the common return circuit during a full revolution of the timing cam so as to give the carriage and associated parts time to act and settle before the next printing operation. This timing cam is also tripped by a pull wire operated through the intermediary of the Space, Star, and Triangle magnets to also open said common circuit when spacing or printing a star or a triangle. This cam breaks not only the common circuit but also the circuit for the timing magnet itself.

Shift relay R4 (Fig. 51) (nines complement) is operated from the sensing finger SH of the left totalizer through contact Shift. L. Tot. of the switch bank D contacts SH of relays R1 and R3 through relay R—4 to the return circuit. It becomes effective during the writing of negative totals and trips the clutch latch 188 through member 191 on the shift mechanism to cause the italic type to be presented to the printing line as described under Power operated shift and reverse.

When relay R3 is energized, this circuit is transferred to senser finger SH on the right totalizer. This relay is actuated while relay R1 is energized and before relay R1 releases to close the common circuit for the printing magnets. It also prepares a circuit for relay R—5 when the Add 1 switch is effective on negative totals to obtain tens complements. The operation of relay R4 opens the circuit for relay R9 and places the control of that relay under the Add 1 switch and also prepares a circuit for relay R12.

Tens complement relay R5 (Fig. 51) is actuated under control of relay R4 and is energized over a circuit from ground, through contact R5 of relay R8, contact R5 Bk. of relay R13, through relay R5, contact R5 of relay R4 to the return circuit. The contact R5 of relay R8 is held open, however, until the relay R8 is released by opening of either of the add-1 devices on the totalizers. When relay R13 is energized the add-1 function of relay R5 is taken from it and taken over by relay R13 for a negative balance in the pence. Contact Com. of this relay is so adjusted that it cannot make until all the nines complement contacts are opened. This contact Com. parallels the contact Com. on relay R9.

Add-1 relay R8 (Fig. 50) is energized over a circuit from ground on the add-1 unit of either register when in negative position, thence through contact R8 on relay R3, contact R8 Bk. of relay R5, through relay R8 to the return circuit. In the positive position of the totalizer relay R8 is actuated from ground on contact R9 of relay R4. When relay R8 is deenergized by the opening of its circuit at the add-1 units, its contact R5 is closed energizing relay R5 to complete the tens complements circuits for the pounds and shillings positions. Relay R8 is made slow to release so that the carriage can come to rest before relay R5 is energized to release relay R8 and establish a shunt around the contact Com. of relay R9 to allow printing.

Common breaker relay R9 (Fig. 50) is operated from ground through contact R9 of relay R4 when relay R4 is normal, under control of the lower contact of Tabulator switch Tab. Bk. when it is closed at the completion of tabulation.

Pence relay R10 (Fig. 51).—This relay controls the circuit for printing of pence in order to permit the use of the same sensing unit for pounds and pence. It is actuated by the R10—13 sensing fingers on the totalizers. It locks up under control of its contact R10 lock.

This relay by its operation disconnects the 0–3, inclusive, printing circuits at its "0–3" contacts and makes the printing circuits for the zero to eleven numerals effective through the "4–9" sensing contacts under control of the odd and even wheel which, in turn, controls the odd and even relay R11. Relay R11 is operated only upon sensing an odd digit. For example, if two pence is registered, the pence wheel contacts the "5" sensing contact and, since the "two" to be printed is an even digit, relay R11 will not be operated. Thus, the printing circuit extends from ground on the totalizer through the "5" sensing contact upper contact 5 of relay R10 contact 2 of relays R11 and R5, and thence to the circuit for the printing magnet 2. If three pence had been registered, the odd and even wheel would have operated the relay R11 and the circuit would then extend from the "5" sensing contact, upper contact 5 of relay 10 and thence through contact 3 of relay R11 to contact 3 of relay R5. Relay R10 also controls the locking circuit for relay R11 and the circuit to the triangle printing magnet Tri.

Odd and even relay R11 (Fig. 51) is actuated by either sensing finger SH on the totalizers engaged by the odd and even wheel, which is located to the left of the pence wheel to permit sensing odd and even digits in the pence order. This relay may be operated by the SH contact being engaged by the shift wheel, but the relay will have no effect unless relay R10 is also actuated. This relay locks up under control of contact R11 Lock on relay R10 and, therefore, will never remain operated except when relay R10 is operated. This relay R10 determines whether an odd or even digit is to be printed as described under relay R10.

Tens of shillings relay R12 (Fig. 51) operates when printing in the tens of shillings position on negative totals. It is operated from ground through contact R12 in control switch bank D and its return circuit extends through contact R12 of relay R4, contact R5 of relay R4 to the rectifier and, therefore, operates only when R4 is operated which occurs only when a negative total is to be printed. The switch bank D closes just before the tens of shillings position while the carriage is spacing over the decimal position from pounds and prints either a "zero" or a "one" for the tens of shillings. When operated on negative totals it causes the printing of a "zero" when a "one" is sensed and a "one" when a "zero" is sensed, and not the nines complement as is usual. The contact R12 of bank D opens as the carriage moves to units of shillings position.

Pence complements relay R13 is actuated over a circuit from ground through the R10—13 sensing fingers of either totalizer, and thence through the R5 contact of relay R4 when relay R4 is operated on negative totals. Relay 13 is locked up through its contact lock and remains energized until released by the opening of its circuit at the A. C. contact. The R10—13 sensing finger is effective only in the pence position. The operation of relay R13 releases relay R5 to prevent the printing of tens complements. It is to be noted that there are three sets of numerals above the contacts of relay R13. The bottom row indicates the printing magnets which are actuated through the individual contacts when relay R13 is normal. The middle row indicates the nines complements of the bottom row of numbers. The top row indicates the printing magnets which are actuated when relay R—13 is actuated on negative totals which numerals are the twelves complement of the pence. The operation of relay R13 switches the common circuit from the control of R—5 to the control of its contact Com. This contact Com. is so adjusted that it will not close until the break contacts are fully open.

The actuator switch (Fig. 49) is actuated whenever any numeral is printed by the rocking of the cross totalizer shaft 321. This switch controls the timing magnet, the common supply circuit, and the operation of the relay R2. The contact R1 is only used to operate relay R1 if the actuator is in a disconnect position before Tabulating to a total printing column. Upon reaching a total printing column the contact Com. Bk. is opened and the contact R1 closed, which is similar to the operation of the On-off switch in the "off" position, thereby effecting a carriage shift on negative total.

EXAMPLE OF OPERATION

The circuits for this machine are shown in Figs. 48 to 55, inclusive, of which Figs. 48 to 51, inclusive, are related as shown in Fig. 56 and represent the circuit as arranged for dual cross totalizer operation, and Figs. 52 to 55, inclusive, are related as shown in Fig. 57 and represent the circuit as arranged for single cross totalizer operation.

In the practical operation of the machine, it is thought desirable to follow through one operation using the dual form of machine as an example. Since the form of machine shown is one in which the printing and computing elements are power-driven, it is necessary for the operator to turn on switch 503 (Fig. 48) to start the drive motor 505 so that she can manually operate the keys in order to print the usual entries and withdrawals on the work or other sheet. It is also usual, when the automatic total writing capacity of the machine is to be utilized, for the operator at the beginning of the procedure to place the "On and off" switch in the "on" position. There is a transformer secondary 508 from which an upper wire 509 and a lower wire 510 extend. A fuse 512 is disposed in wire 510. The wire 510 leads to an A. C. plate 513 of a rectifier Rect. The wire 509 extends to the A. C. contact of control switch bank A, thence over normally closed carriage return contact Carr. Ret. Bk. which is operated to open on return of the carriage by an arm 139 on shaft 135 (see Fig. 38). This circuit continues over wire 515 to the A. C. plate 516 of the rectifier Rect.

The two outside positive plates 517 and 518 of the rectifier are connected by a wire 519 and the positive plate 517 and the negative plate 520 are shunted by a condenser. This circuit now provides direct current for the operation of the several relays and is under control of the carriage by means of the A. C. and Carr. Ret. Bk. contacts. The "Star-space" switch St.—Sp. is also set in the desired position depending upon whether it is desired to space before the first significant digit or write stars instead. If set to the right, spacing is effected and if to the left a star is printed.

Figure 8:
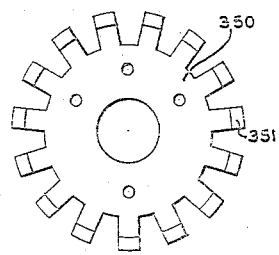
Fig. 8 is a similar view of the credit balance or shift senser wheel of the totalizer, and the tens of shilling gear.

As the machine is operated by the depression of the digit keys, the entries are printed and computed in the manner usual to bookkeeping power driven computing typewriters as indicated in the above mentioned patents and applications. Ultimately the first automatic tabulating lug 111 on the bottom of stop bar 88 will shift lever 110 depressing rod 107 to release the automatic tabulating latch 103 as shown in Figs. 1 and 32, which tabulates the carriage to the position for reading out and printing the first column of the total. As soon as the tabulating mechanism is operated the tabulating switch Tab. Bk. (Fig. 48) is actuated and places a ground on relay R1 over a circuit from ground through the contact 274 of the tabulator breaker Tab. Bk. over wires 538, 540, and 541 through the winding of relay R1 over wires 531, 504 to the plate 517 of the rectifier. As soon as the carriage moves to a position one-half space to the right of the first printing position, the first cam 339 (Fig. 17) is positioned so that its first step 342 closes the A. C. contact and operates relay R1, which opens its contact Com. and closes its contacts R3 and SH. The closure of contact R3 prepares a circuit from ground at the rectifier wires 525, 521, and 524 open contact R3 of the control switch bank C wire 569 through contact R3 of relay R1, thence over wire 570 through the winding of relay R3, thence over supply wire 531 to the rectifier. This circuit is not effective until the contact R3 of the control switch is closed by the carriage and it is desired to take totals from the right totalizer. The contact SH of the relay R1 prepares a circuit for relay R4 from ground on either totalizer through the shift sensing finger SH over two circuits to the contacts SH of relay R3. The circuit from the right totalizer extends over wire 600 through the right-hand contact SH of relay R3. The circuit from the left-hand totalizer extends over wire 578 through contact Shift L. Tot. of control switch bank D, over wire 573 to the left-hand contact SH of relay R3. A common wire 575 from these contacts extends over wire 576 through contact SH of relay R1, over wire 577 through the winding of relay R4, thence over supply wire 531 to the rectifier. Since relay R1 is a slow release relay, it will not release for an appreciable instant of time to allow the mechanism to come to rest and to allow relay R4 to energize and lock up from ground through its locking contact Lock R4 providing there is a negative total in the totalizer in which case the sensing contact finger SH of the left totalizer is energized by teeth on shift disc 350 (Fig. 8). If this energization of R4 takes place the type case is shifted by mechanism shown in Fig. 26 and the totalizer drives are reversed as described above. Simultaneously, with the closing of the A. C. contacts, the key lock magnet KL is energized so that the keys are locked and any spacing of the machine thereafter is automatic and not under control of the operator. The magnet KL is energized over a circuit from ground over wires 525, 521, and 526 winding of magnet KL, thence over wires 527 and 528 through On-off switch in the "on" position, wires 511 and 504 to the rectifier.

The carriage under automatic tabulation comes to rest in the first printing column, which, as indicated in Fig. 5, and previously described, brings the shift sensing finger and the first numerical sensing finger into engagement with the teeth on the totalizer at the same instant. However, since relay R1 is energized it opens the common printing circuit and this circuit is also opened at the contacts of relay R9 until the tabulation ceases. At the end of tabulation the tabulator switch Tab. Bk. returns to normal completing a circuit for relay R9 from ground (Fig. 51) wire 549 through the normal contact R9 of relay R4, thence over wire 548 through the winding of relay R9 to the supply wire 531 to rectifier, thus operating the relay R9. When this occurs the contacts of relay R9 are closed, but contacts Com. of relay R1 are not closed until the carriage comes to rest, due to the slow release of relay R1 which allows time for operation of either or both relays R3 and R4. Relay R3, however, does not energize in this position unless there is an upper level control cam 341 here disposed to close contact R3 of control switch bank C by the first step of the upper level cams.

It will be observed that as soon as tabulation ceases the tabulator switch contacts 274 are opened, thus breaking the circuit for relay R1 and power is made available through closed contacts 273 to relays R9, R3, R4, R10, and R11 over a supply wire 531.

Assuming that the total is positive and referring to Fig. 17, the lower control slide 336 is now operated because its point 337 is riding on the first column position on the second step of lower level cam 339. In this position the A. C., Com. and St.-0 contacts of control switch bank A are closed. The totalizer having passed the shift wheel, there are now five pounds wheels to sense (Fig. 4). Assuming that the first four wheels are zero, the first zero finger will be sensed, for a single cross totalizer, as per Fig. 17, and the circuit will be traced from ground over zero sensing finger, wire 601, "0" contact of relay R3, wire 603, "0" contact terminal of relay R10, "0" contact of relay R5, wire 617, "0" contact of relay R12, wire 627, "0" contact of relay R4, wires 628 and 629, "0" contact of relay R13, wires 633, and 632, "0-Sp." contact of relay R2, wire 554, to center arm of star space switch St.-Sp. Here the circuit for the zero finger may be traced two ways depending upon the position of this switch. Assuming it is moved to the left to print stars before the first significant number the circuit proceeds over wire 550, through St.-0 contact of control switch bank A, which is now closed, wire 551, to the star magnet, thence over wires 552 and 553, closed contact Com. of relay R9, wires 619 and 591, through the closed contacts Com. on the actuator switch, wires 587 and 588, through the contact on the timing switch, wires 660, 620, and 657 through the closed contacts Com. on relay R1, thence over supply wire 531, to source.

Now when the star magnet is energized, it will as previously mentioned, operate through the mechanism shown in Fig. 41, to actuate the escapement mechanism and space the carriage, and at the same time, will pull on wire 309A to release the timing cam to open the Timing contact which opens the common return for the Star, Triangle, Space, Timing, and Printing magnets. The opening of this contact will prevent any spark which might otherwise occur at the sensing fingers of the totalizer. This spacing action will bring the next sensing tooth on the totalizer into position and, since we have assumed that the first four pounds wheels are in zero position, this action will be repeated to print stars instead of merely spacing.

However, going back and assuming that the St.-Sp. switch was moved to the right-hand position, which is the spacing position, it will be seen that the circuit would then be traced as follows: Wires 555 and 556, through the winding of the spacing magnet Sp., wire 557, to the closed contact Com. of control switch bank A, wire 553 through contacts Com. on relay R9 to source as described above. If the carriage is to be spaced four places instead of printing stars, this will continue until the fifth pounds wheel presents its tooth to the sensing fingers. When the spacing magnet is thus energized it spaces the machine and opens the timing cam switch as shown and described with respect to the mechanism shown in Fig. 41.

Let us say the fifth pounds wheel is set at the digit 5, then it will sense the "5" finger and close a circuit which may be traced as follows: Ground, through "5" sensing finger, wire 601, left-hand normal contact 5 of relay R3, wire 603, lower normal contact 5 of relay R10, wire 604 to left-hand normal contact 5 of relay R5, wire 616 to normal contact 5 of relay R4, wire 625, normal contact 5 of relay R13, wire 649 through the winding of the 5 printing magnet, thence over wire 572, to the closed contact Com. 2—11 of the control switch bank D, wires 560 and 559, to closed contact Com. of control switch bank B, wire 558 to the now closed contact Com. of control switch bank A, wire 553, closed contact of relay R9, wire 619 back to source through the actuator and timing switches as traced above. At this time, however, it will be noted that a magnet of a significant digit has been energized, in this case the "five" magnet. This will cause the actuation of the actuator switch according to Figs. 35, 36, and 37, and description thereof. This actuation will, as clearly seen in Fig. 49, result in the closing of the timing contact which will energize the timing magnet which will release the timing cam and operate the timing switch for the reasons mentioned before; and will open the common contacts to prevent sparking at the sensing fingers; and on its immediate upstroke will close its contact R2 to energize relay R2. It is, of course, obvious that this contact R2 can be so disposed as to close on the down stroke if desired. However, when the contact R2 is closed on the upstroke of the actuator switch, it is so arranged as to close before the contact R1 is made. When the switch is moved to the disconnect position by the operation of the disconnect handle in the usual manner, a ground is placed on the R1 relay. The energization of the timing magnet is effected by this switch over the following circuit: From ground at the rectifier, wires 525, 521, and 585, contact Timing of the actuator switch, wire 590, through the winding of the timing magnet, thence over wire 589, contact 318 of timing switch, wires 660, 620, and 657, common contact Com. of relay R1, wire 531 to source as before traced. The relay R2 is energized over the following circuit when the actuator switch is operated: From ground at the clear signal mechanism through contact R2 of the actuator switch, wires 580, 581, and 582, through the winding of relay R2, wires 620 and 657, common contact Com. of relay R1, wire 531 to source as before. The contacts R1 when closed by the actuator switch close a circuit as follows: From ground over circuit described above at actuator switch, wire 592, to contact Disc on relay R2, closed only when relay R2 is deenergized (which is always before a numeral has been printed), wire 541 through the winding of relay R1, wire 531, to source as above traced. It will be seen, therefore, that when relay R2 is once energized, the contacts R1 of the actuator switch if momentarily closed, will not energize relay R1 since its circuit runs through contact Disc on relay R2. However, when the disconnect handle is moved the contact R1 is closed at the actuator switch which will result in the energization of relay R1, close the contacts R3 and SH to operate relay R3 to cause the selection of the proper totalizer and to shift the carriage for a negative balance and by opening its contacts Com. prevents the repeated operation of the timing magnet TM. The actuation of the disconnect handle also opens the contact Com. Bk. on the actuator switch to prevent printing after tabulating to the balance column.

Returning now to the moment when the actuation of the "five" printing magnet operated the actuator switch and resulted in the energization of relay R2. As relay R2 is operated it locks up through contacts Lock R2 thereon over wire 659 from ground. As above mentioned it will open the circuit to the contact R1 on the actuator switch for the reasons mentioned. It will shift the contact 0-SP so as to connect the "zero" sensing finger to the "zero" magnet instead of to the ST.-SP. switch as above traced. From these contacts when relay R2 is operated this modified circuit can be traced as follows: From ground on either totalizer through the "zero" sensing finger as traced above through the 0-SP contact of relay R2, wire 640 through the winding of the "zero" printing magnet, over wire 560, wire 559 through contact Com. of control switch bank B, wire 558, through contact Com. of control switch bank A, wire 553 through contact Com. of relay R9, wire 619 as before through actuator switch and timing switch to source. Thus, with relay R2 operated, "zero" will be printed as "zeros" instead of printing "stars" or merely spacing the machine as above mentioned.

Relay R2 when operated also closes a contact ST. which establishes a circuit for the "Star" magnet as follows: From ground on the clear signal unit, wire 565, through contact ST of relay R3, wire 563 through contact Star of control switch, bank C wire 561, through contact St. on relay R2, wire 562 through the winding of star magnet "*," wires 552 and 553 to contact Com. of relay R9, wire 619 to source as above traced. This contact ST. of relay R2 is to prepare a "star" circuit after the first significant digit has been printed.

Of course, as the "five" printing magnet is operated it will in the usual manner print a "five" and also space the carriage which will then move to the sixth position which in this English money totalizer shown in Fig. 4 is what is called the decimal position. There is in this position the sensing disc 354 shown in Fig. 6 and having a tooth 355 positioned to engage the R2 sensing finger shown in Fig. 49. As this contact is made the relay R2, if not already energized, will be energized so that thereafter any zeros will be printed as zeros.

Referring to Fig. 17, it will be seen that the first upper level cam 341 on the first cam 339 will have operated the upper slide 335 to move the upper level control switch bank C to open the contact Star, and to close the contact R3 of this bank. The operation of this bank takes place in the last pounds position of the totalizer. The contact Tri. of this bank is not made except by the second step on the upper level cam. As the carriage is spaced to the decimal position a third step 344 of one space width is encountered on the lower cam 339. This actuates the lower level control switch bank B and opens the contact Com. which controls the printing circuits and closes the contact Space to a circuit for the space magnet as follows: Ground at rectifier wires 525, 521, and 522 through contact Space of control switch bank B now closed, wire 556 through the winding of space magnet Sp., wire 557, through closed contact Com. of control switch, bank A, wire 553, contact of relay R9, wire 619 to source as above traced. This energizes the space magnet Sp. which spaces the carriage and opens the timing switch as before noted. The slide 336 drops off this third step 344 after one space and opens the contact Space and closes the contact Com. of control bank B.

Referring to Fig. 17, it will be seen that at the time the lower cam third step 344 is effective the upper cam 341 has a second step 343 which becomes effective to operate control bank D to break contact Com. 2—11, to break contact Shift L. Tot. and make contact R12 up to and through the tens of shillings position. However, at this point in the travel of the carriage the only effect of the above is the opening of the contact Com. 2—11 which breaks the return circuit for the "2—11" printing magnets since under control of the tens of shilling wheel 350 only a "one" is printed when odd numbers are sensed, or a zero when even numbers are sensed. It will be noted that between the last pounds wheel and the tens of shillings wheel there is a space. In the ordinary machine for printing in terms of U. S. money, this space would represent the decimal point. In such a U. S. machine, it is always customary to print a zero after a decimal point. However, in the machine shown herein, in which the accounting is in terms of English money, there is no decimal position. When the totalizer is passed from the pounds position to the tens of shillings column, it is not desired to print a zero if it occurs in the tens of shillings position, but it is then desired to space the machine over the zero. Consider Fig. 4 and assume that the sensing finger 373 shown is the R—2 sensing finger and occupies the normal position shown therein, then it is obvious that it will contact its sensing disc before the tens of shillings sensing disc and finger have met and, consequently, would operate relay R—2 to shift the 0-space contacts thereon, so that the zero would be printed and spacing over the zero would not take place. Therefore, it becomes necessary to take this particular finger 373 and bend it to the left of the normal position shown in Fig. 4, so that the tens of shillings disc has a chance to contact its sensing finger just a fraction of an instant before the R—2 finger connects, so that, if the tens of shillings position is represented by a zero, this zero will, in the usual manner, cause a spacing action instead of the printing of the zero. This bending referred to is so simple a matter and merely requires the finger 373 for that particular position to be bent to the left the distance of just one position, that it is thought to be obvious without any particular showing of it. Referring to Figs. 48 to 51, inclusive, when there is a zero in the tens of shillings position, the circuit may be traced as follows: From the zero sensing finger on the left totalizer, over wire 601 to the zero switch on relay R—3, over wire 603 to the zero switch on relay R—10, over wire 604 to the zero switch on relay R—5, over wire 617 to the zero switch on relay R—12, over wire 627 to the zero switch on relay R—4, thence by wire 628 to the zero switch of relay R—13, over wires 633 and 632 to the zero-space switch on relay R—2, over wire 554 to the star-space switch, and when this switch is set for spacing, over wire 556 to the spacing Relay Sp., thence over wire 557 to the common switch on bank A which is closed, over wire 553 through the common contact on relay R—9, wire 619 to the right on wire 591 on the common contact on the actuator switch, wire 587, wire 588 through the contact controlled by the timing cam 314, wires 669, and 629, wire 657, through the common contact on relay R—1, wire 531 through contact 273 on tab. breaker switch, wire 528 to on-off switch, wire 511 to the rectifier.

When there is a "one" in the tens of shillings position the circuit may be traced as follows: From the "one" sensing finger on the left totalizer over wire 601 through the "one" switch on relay R—3, over wire 603 to the "one" switch on relay R—10, wire 604 to the "one" switch on relay R—5, over wire 617 to the "one" switch on relay R—12, over wire 630 to the "one" switch on relay R—4, over wire 629 to the "one" switch on relay R—13, over wires 635 and 634 to the "one" printing magnet, over wire 560, wire 559 through common contact on bank B, wire 558 through the common contact on bank A wire 553 and back to the rectifier as just above traced. These circuits for the tens of shillings position when in a negative total condition will be traced later under discussion of that condition. When sensed, the carriage is spaced to the next or units of shillings position in which position the high or second step of upper cam 341 becomes ineffective and the contact Com. 2—11 is again closed. However, while this high point is effective to operate the above switch banks, it is well to note the following on this position:

(1) Contact Shift L. Tot. is open to prevent operation of the transfer relay R3, (2) Contact R12 is closed but does not effect energization of relay R12 at this time as it can only operate when relay R4 is energized in this position for a negative total, (3) Also note that contact Tri. of switch bank C is closed but is not effective since it is controlled by contact Tri. on relay R10 which is not operated until after the printing of units of shillings.

If the units of shillings wheel, for example, is in the "four" position then the circuit can be traced as follows: From the "4" sensing finger on the left totalizer, over wire 601 to the "4" switch on relay R—3, wire 603, to the "4" switch on relay R—10, wire 604 to the "4" switch on relay R—5, wire 617 to the "4" switch on relay R—4, wire 625 to the "4" switch on relay R—13, wire 651 to the "4" printing magnet, and then to rectifier over the return circuit above traced. The circuit for negative totals in this order will be later described.

The units of shillings wheel 352 is then sensed and the carriage moved one space to the left. As shown on the first set of cams in Fig. 17, this will again bring the control switch banks under the influence of the first step of the second upper cam 341 and a double width third step of lower cam 339. As before stated, this opens the contact Star and closes the contact R3 in control switch bank C and opens the contact Com. and closes the contact Space in control switch bank B. Since the third step is of double width the machine will space twice and thus be spaced to the pence position.

In the pence position the lower level third step is ineffective thus closing the contact Com. and opening the contact Space of bank B but the contacts of bank C are still positioned as before. Since the pence position is reached reference should be had to Figs. 4 and 9–14, inclusive. It is here to be noted that in moving from the units of shillings position to the pence sensing position, there are three spacing movements. The first occurs in moving from the units of shillings position to the point where the double width step of lower cam 344 is brought into play. The second occurs in moving from the first position on this step to the second position. At this point the odd and even disc 361 is in line with the sensing finger SH and the R10—13 disc 363 is in contact with the sensing finger R10—13. The R10—13 disc causes energization of relay R10 and the odd and even disc effects energization of relay R11 if the pence wheel is set at odd but does not effect it if the wheel is at even. The R10—13 disc also energizes relay R13 dependent upon relay R4 being operated for a negative balance in which case it will print negative pence complements. The relays R10, R11, and R13 having been set as the circumstances require the third spacing movement will advance the carriage to the pence position as above noted. The relay R10 is energized over the following circuit. From ground through the R10—13 sensing finger, wires 596, 598, and 609, winding of relay R10, wire 531 to source. This energization of relay R10 will, as seen in Fig. 51, lock itself up and provide a lock circuit for relay R11; and will break the circuits from the 0, 1, 2, and 3 sensing fingers and will connect the 4–9 sensing fingers with corresponding contacts on relay R11. In the normal position of relay R11 these 4–9, inclusive, contacts are connected to even numbered magnets 0, 2, 4, 6, 8, and 10. This is the position of the contacts of relay R11 when the odd and even disc 361 is in the even position. When said disc is in the odd position, it contacts the sensing finger SH and energizes relay R11 over the following circuit: Ground through the shift sensing finger SH, wire 578, contact Shift L. Tot. of control bank D, wire 573, and through contact SH of relay R3, wires 575 and 576 through the winding of relay R11, wire 531, to source as previously noted. In the normal position of relay R11, therefore, even numbered pence values are printed. However, when the odd and even wheel 361 is in the odd position, contact is made over the above mentioned circuit which energizes relay R11 and, therefore, connects the 4–9 contacts thereof to the odd numbered printing magnets 1, 3, 5, 7, 9, and 11. Consequently, in the pence position the relay R10 operates to cut out sensing fingers 0–3, inclusive, and transfer control of the printing magnets 0–11, inclusive, to the sensing fingers 4–9, inclusive. The pence wheel and disc are so constructed and the teeth thereon so disposed that for the sensing of values from 0–11 they are selectively related only with the sensing fingers 4–9, inclusive.

If the pence sensing disc 360 is set to represent digit "4," with relay R—10 energized the circuit can be traced as follows: From sensing finger "6" on left totalizer, to the "6" switch on relay R—3, wire 603, to the "6" switch on relay R—10 which is up, wire 610 to the "6" switch on relay R—11, which is down, wire 604 to the "4" switch on relay R—5, wire 617 to the "4" switch on relay R—4, wire 625 to the "4" switch on relay R—13, wire 651 to the "4" printing magnet, etc. If the number sensed was a "5" the circuit would be the same down to the relay R—11 but since "5" is an odd number the relay R—11 would then be up and the circuit thence would go out on wire 604 to "5" switch on relay R—5 and then in a similar manner as above described to the printing magnet "5." The operation of these circuits for negative totals will be later described.

After the pence are printed the carriage advances to the next of the control cams 339 and 341 shown at the lower end of Fig. 22.

In this case these cams are disposed and designed to print a sub-total, which requires that a triangle be printed after the amount to indicate such a total. Because it is a sub-total which is being taken, it will be noted that the totalizer is not cleared and this is effected by having the cams 165 (Fig. 2) on the bottom of this totalizer 146 (Figs. 2 and 17) disposed at the intermediate level above mentioned so that no actuation of the totalizer wheels takes place in printing this sub-total. After leaving the pence position (refer to Fig. 22) the upper control slide 335 contacts upper level cam 341 which has a second step to open contact Star and close the contact Tri. of control bank C to print a triangle. When this happens a circuit is closed as follows: Ground at rectifier, wires 525, 521, and 523, triangle contact Tri. of control switch bank C, wires 566 and 605, through contact Tri. of relay R10, wire 606, winding of triangle magnet Tri., wires 552 and 553, contact Com. of relay R9, wire 619 to source as above noted. At this same time the lower level cam 339 has reached the first level or step at which time the contacts Com. and St.—0 of control switch band A are opened although the contact AC thereon is still closed. When the triangle magnet Tri. operates to print the triangle the same mechanism as shown in Fig. 41 and previously described will operate to space the carriage and to open the timing cam switch. This spacing having occurred the sub-total control cam shown in Fig. 17 passes on and the automatic tabulating mechanism takes over to pass the carriage to the next set of control cams disposed (Figs. 17 and 24) opposite the next totalizer which is for the purpose of printing a regular total. In this case, of course, the cams 165 (Fig. 2) on the bottom of the totalizer next in line will be at their full depth to automatically reverse the cross totalizer and clear it as the total is printed. The control cams upper and lower for this operation are shown in Figs. 17 and 24 and are the same as for the sub-total operation except that the last upper cam 341 for printing the triangle is omitted. The operation, therefore, of printing the regular total is a complete repetition of what has been thus far described until at the very end of the cam movement the symbol of a star is to be printed. The absence of the upper level cam 341 in this last position will cause the contact Star of bank C to remain closed and the triangle contact Tri. of bank C to remain opened, whereby the star is printed instead of the triangle over the circuit described heretofore. Having described printing of a total found in the left totalizer the automatic tabulating mechanism will move the carriage to a point where the total of the right totalizer may be sensed and printed. In order to achieve this the transfer relay R3 must be energized to shift the circuit connections from the left to the right totalizer. It has been noted that the contacts R3 of control switch bank C close on the first step of an upper control cam 341. It is also to be noted that relay R—3 cannot be energized except when the R3 contacts on relay R1 are closed. We know that they are closed only for an instant at the end of a tabulating movement of the carriage as soon as the relay R1 is energized. Therefore, it is obvious that any upper level cam 341 in order to operate relay R3 must be disposed at the very front portion of a lower cam 339 (see Figs. 22–25) and, of course, this must be a cam for the right register. When the cams for the right register come into cooperation with the control switch banks, the first level of the lower cam 339 will close the contacts A. C. and the first level of the upper cam 341 will open the contacts Star and close the contacts R3 of control switch bank C. The operation of relay R1 closes its contacts R3, establishing a circuit as follows: Ground at rectifier, wires 525, 521, and 524, contact R3, control switch bank C, wire 569, contact R3 on relay R1, wire 570 through winding of relay R3, wire 531 to source. When operated relay R3 locks up from ground through its contact Lock. When it is operated relay R3 opens its star contact St., closes its triangle contact Tri. It also shifts the numeral printing circuits from the left to right totalizer.

RÉSUMÉ OF EXAMPLE FOR NEGATIVE TOTAL

When a negative total is in the machine and it approaches the total writing column assuming it to be a total and not a sub-total, for the sake of brevity and to avoid needless repetition, the tabulator switch Tab. Bk. functions to open the common circuit to the relays and operates relay R1 which also opens its common contact Com. and closes its shift contact SH. The relays R4 and R8 immediately energize, the relay R4 through the intermediary of the upper contacts of tabulator switch Tab. Bk. and the relay R8 through the intermediary of the add-1-unit which is normally closed. As relay R4 operates it makes power available to relay R5 through its contact R5, but this circuit is not completed until it is finally closed at the contacts R5 of relay R8 and these are not closed until relay R8 is deenergized by the opening of the add-1 switch which does not occur until the last significant digit is sensed. The regular add-1 switch controls in all positions because any complements called for by a negative total are either nines or tens complements and the operation of relay R5 will accomplish this in the usual manner in combination with the operation of relay R4. However, in the tens of shillings position any total will either have a zero or a one in this position since 19 is the largest number which can be entered in the shillings position without a carry since 20 shillings make a pound. In the tens of shillings position, however, if a positive total exists, the designation will either be a one or a zero and for a negative total the nines complement of this will be a zero or a one. To this end, therefore, when there is a negative total, the relay R4 having already been operated, the relay R12 will be operated through the contact R12 of relay R4 and the contact R12 of switch bank D, which is operated by upper level control cam 343 in this position and which will provide the ground for relay R12. This operation will reverse the connections of the zero and the one as shown and described. When the last significant digit occurs in the tens of shillings position, the add-1 mechanism operates to deenergize R8 which causes R5 to pull up and this reverses the 0 and 1 connections. It is to be remembered that in the tens of shillings position the nines complement of 0 and 1 will be a one or a zero but the tens complements of a zero or a one in this position will be a zero or a one, respectively.

Going back to the moment when the shift contact SH of relay R1 is closed then this contact closes a circuit as follows: Ground through the finger SH, wire 578, contact Shift L. Tot. of switch bank D, wires 573, contact SH of relay R3, wires 575 and 576, shift contact SH on relay R1, wire 577, through the winding of relay R4, wire 531 to source as noted, and locks up in the usual manner, preparing the circuits for regular nines complements. Now, it will be noted that all the pounds sensing discs, the decimal disc, the two shillings discs, the odd and even disc, the R10—13 disc and the pence disc, have teeth which, when these discs are in the zero position, will lie vertically below shaft 346 (Fig. 3) and, therefore, directly over the add-1 plungers 382 (Fig. 5). These teeth in combination with the tongue or cam 388 will, therefore, depress all the plungers to the right of the last significant digit on the totalizer just as it reaches printing position, no matter where this digit occurs. This depression will open the add-1 circuit as above noted and cause the deenergization of relay R8 which results in the energization of relay R5 to provide the usual tens complement circuits.

For negative totals when the tens of shillings is to be printed and there is a "1" in the totalizer, not the last significant digit, the circuit will be as above mentioned down to the relay R—12 which, as previously stated, is now up, and the "one" wire from relay R—5 will now be connected at relay R—12 with wire 632 leading to the zero-spaced contact on relay R—2, which if up will be connected with wire 640 leading to the zero printing magnet. Therefore, a "1" in the totalizer will be printed as a "0" on the sheet.

In the units of shillings position for negative totals, if there is a "4" in the totalizer, not a last significant digit, the circuit will be as previously described down to relay R—4 which is now up and, therefore, wire 617, coming from the "4" switch on relay R—5, will be connected with wire 626 leading from the "4" switch on relay R—4, thence to wire 625 leading to the "5" switch on relay R—13, thence by wire to the "5" printing magnet.

In the pence position with a negative total, if there is a "4" in the totalizer, not a last significant digit, the circuit will be as previously traced down to relay R—4, which is now up, and the wire leading from the "4" on relay R—5, with wire 626 leading from the "4" switch on relay R—4, thence to the "5" switch on relay R—13 which is now energized, thence over wire 643 to printing magnet for the number "8" which is the complement of four pence on a negative total.

Assuming, therefore, that the last significant digit in the negative total occurs in the pounds section of the totalizer, when the pounds sensing disc reaches the position to print as shown in Fig. 5 the depression of the plungers 382 by the aligned teeth of the discs will open the add-one circuit with the following result: Relays R8 and R9 will be deenergized. The deenergization of relay R9 opens its contact Com. and relay R9 being fast to release insures that no printing will take place. The deenergization of relay R8 closes the circuit for relay R5 through its contact R5 and when this occurs relay R5 operates, breaking the circuit for relay R8 and closing its contact Com. so that printing may then proceed. However, it is to be noted that relay R8 is a slow release relay and that the timing cam has had time to operate and the parts have come to rest before relay R8 releases and relay R5 energizes to print the tens complement for the negative total.

Since the operation of the relay R12 for negative totals has been described we will pass to the consideration of the operation of the mechanism in the pence position when a negative total is in the totalizer. As previously noted just before the pence sensing disc is sensed the R10—13 sensing finger contacts the R10—13 sensing disc and operates relay R10. When relay R4 is operated relay R13 is operated over the following circuit: From ground, R10—13 sensing finger, wires 596 and 598, winding of relay R13, wire 599, contact R5 of relay R4 to 531 to source. This operates relay R13 which closes its common contact Com. and locks relay R13 up through its contact Lock from ground over wire 635" and breaks the circuit of relay R5 at the contact R5 Bk. When relay R5 releases it opens its contacts R8 Bk. and Com. thus preventing the operation of relay R8. With relay R13 operated, if the last significant digit occurs in the pence position, it will be seen that, if it is a "five," for instance, its circuit can be traced as follows: From ground through the senser finger 6, wire 601, contact 6 of relay R3, wire 603 to contact 6 of relay R10 which is operated, wire 610, to contact 6 of relay R11 which is operated (since "five" is an odd number), wires 611 and 604, to contact 5 of relay R5 which is deenergized, wire 616 to contact 5 of relay R4 which is operated, wires 626 and 625 to contact 4 of relay R13 which is operated, wires 646 and 645 through the winding of the printing magnet 7 over wire 531 to source as described above. This "seven" is the complement of a "five," since this is the last significant digit in the pence position of the totalizer for a negative total.

When considering the operation of the machine in which a single totalizer is used it is obvious that the main difference (as shown in Figs. 52–55) is the omission of relay R3, the contact R3 of control switch bank C, and the R3 contacts of relay R1.

It will be noted by reference to Figs. 52–55 that the omission of relay R3 permits the connection of leads from the totalizer direct to relays R10, R11, R4, and R5 and associated parts. Although no direct reference has been made to these figures, like reference characters have been used to designate like circuits.

This machine may be used for decimal or American money by merely changing the total cam and registers making a slight change in the circuit to cause relay R—10 to be energized so that a subtotal symbol from the left or right register, and the total symbol from the right register, which is indicated by a triangle, can be printed. The remainder of the structure and operation is fundamentally the same for either kind of money.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a machine of the class described, a continuously moving snatch roll, a pawl adapted to engage with and be moved by said roll, a trip element in the path of movement of the end of the pawl and adapted to be moved thereby, a timing cam, means for rotating said cam, latch means to hold said cam in a normal position, a connection between said latch and said trip element whereby the movement of the trip will release the latch, a switch controlled by said cam and operated by the movement of the cam.

2. In a machine of the class described, a continuously moving snatch roll, a pawl adapted to engage with and be moved by said roll, a trip element in the path of movement of the end of the pawl and adapted to be moved thereby, a timing cam, means for rotating said cam, latch means to hold said cam in a normal position, a connection between said latch and said trip element whereby the movement of the trip will release the latch, a switch, and means cooperating with the cam and engaging the switch to hold said switch in a definite position until the cam has moved a predetermined distance.

3. In a machine of the class described having a totalizer and an actuator therefor, a timing cam, means for moving said cam, a switch controlled by said cam, a latch to hold the cam in a normal position, and means actuated by the movement of the actuator to release said latch.

4. In a machine of the class described having a totalizer and an actuator therefor, a timing cam, means for moving said cam, a switch, a latch to hold the cam in a normal position, means actuated by the movement of the actuator to release said latch, and means cooperating with said cam and engaging said switch to hold said switch in a definite position until the cam has moved a predetermined distance.

5. In a machine of the class described having a totalizer and an actuator therefor, a timing cam, means for moving said cam, a normally closed switch controlled by said cam, a latch for said cam, a magnet for operating said latch, a switch operated by said actuator having a normally open contact, said two switches and magnet being in a series circuit, said magnet releasing the cam when the actuator switch is closed to open the switch controlled by the cam, the operation of the actuator causing its switch to be opened immediately after the other switch is opened.

6. In a machine of the class described having a totalizer and an actuator therefor, a timing cam, means for moving said cam, a normally closed switch, a latch for said cam, a magnet for operating said latch, a switch operated by said actuator having a normally open contact, said two switches and magnet being in a series circuit, said manget releasing the cam when the actuator switch is closed to open the normally closed switch, the operation of the actuator causing its switch to open immediately after the other switch is opened, and means cooperating with said cam and engaging its switch to hold its switch in a definite position until the cam has moved a predetermined distance.

7. A computing typewriter having a movable carriage, and an English money totalizer movable with the carriage and having groups of wheels registering pounds, shillings, and pence, a series of printing magnets representing numbers from 0–11, the combination of a carriage controlled contact adapted to be opened when the totalizer moves to the tens of shillings position to break the common return circuit of the magnets numbered from 2–11, a shift relay, means operated when a negative total is in the totalizer to energize said shift relay, a tens of shillings relay, means operated when said shift relay is energized to make power available to said tens of shillings relay, means operated by said tens of shillings relay when energized, reversing the circuit connections of the 0 and 1 printing magnets, and a second carriage controlled contact adapted to be closed to energize the circuit of said tens of shillings relay when the totalizer moves to the tens of shillings position.

8. A total writing typewriter computer which includes a series of printing magnets having a common return circuit, an actuator switch operated when certain of said magnets representing numerals are energized to momentarily open said common circuit, a timing magnet energized by the operation of said actuator switch, a timing switch in the common circuit, means operated when said magnet is energized to open said timing switch and cyclically operated means to hold said timing switch open for a predetermined interval of time.

9. A machine of the class described, which includes a series of magnets such as star, triangle, and spacing magnets, a timing switch in the common return circuit of said magnets, power means to operate and open said switch, a latch to control said power means, mechanical means operated by any one of said magnets, when energized, to release said latch, and means also operated by the power means to hold the switch open a predetermined interval of time when the latch is released.

10. An automatic total writing typewriter which includes a series of printing magnets having a common return circuit, a pair of relays controlling contacts in said return circuit, one of said relays being a slow release relay, a movable carriage, means for tabulating said carriage to a total writing column, a tabulator switch operable during tabulation to close contacts in the circuit of the slow release relay and to open contacts in the circuit of the other relay, and switching means controlled by the carriage to apply power to both of said relays, the tabulator switch at the end of the tabulating movement returning its contacts to normal position, the common contacts controlled by the slow release relay being opened when it is energized, the common contacts controlled by the other relay being closed when it is energized.

11. An automatic total writing typewriter, which includes a series of printing magnets having a common return circuit, a movable carriage, means for tabulating said carriage to a total writing column, a slow-release start relay and a second relay adapted to operate contacts in said return circuit, means controlled by the carriage when moving to a total writing column to keep open the circuit of said second relay until the end of tabulation and means also controlled by the carriage when so moving to energize said start relay just before the total writing position is reached.

12. An automatic total writing typewriter which incldues a series of printing magnets having a common return circuit, a movable carriage, means for tabulating said carriage to a total writing column, a pair of control relays R1 and R9 adapted to operate contacts in said return circuit, means controlled by the carriage when moving to a total writing column to keep open the operating circuit of relay R9 until the end of tabulation and means also controlled by the carriage when so moving to energize relay R1 just before the total writing position is reached, relay R1 being a slow release relay, the common contacts controlled by relay R1 adapted to be opened when it is energized and the common contacts controlled by relay R9 adapted to be closed when it is energized.

13. An automatic total writing typewriter which includes a series of printing magnets having a common return circuit, a movable carriage, means for tabulating said carriage to a total writing column, a pair of relays R1 and R9 controlling contacts in said return circuit, R1 being a slow release relay, a tabulator switch operable during tabulation to close contacts in the operating circuit of relay R1 and open contacts in the operating circuit of relay R9, switching means controlled by the carriage to apply power to relay R1 just before the end of tabulation, said switching means also applying power to relay R9 when the end of the tabulating movement is reached, the tabulating switch at the end of the tabulating movement adapted to open the contacts in the circuit of relay R1 and close the contacts in the circuit of the R9 relay, the common contacts controlled by relay R1 adapted to be opened when relay R1 is energized and the common contacts controlled by relay R9 adapted to be closed when relay R9 is energized.

14. A computing and recording machine having a series of printing magnets having a common return circuit, a shift relay R4 and a transfer relay R3, the combination of a slow release start relay R1 controlling a contact in said common circuit, a contact in circuit with relay R3, and a contact in circuit with relay R4, a movable carriage, means for tabulating said carriage to a total writing column, means operated during tabulation to close at one point the operating circuit to relay R1, and means controlled by the carriage to energize the circuit for relay R1 just before the end of the tabulating movement, the energization of relay R1 adapted to open its common contact and close its R4 and R3 contacts.

15. A computing and recording machine having a series of printing magnets having a common return circuit, a shift relay R4 and a transfer relay R3, the combination of a slow release start relay R1 controlling a contact in said common circuit, a contact in circuit with relay R3, and a contact in circuit with relay R4, a movable carriage, means for tabulating said carriage to a total writing column, a tabulating switch operated during tabulation to close one point in the operating circuit to relay R1, and means controlled by the carriage to energize the operating circuit for relay R1 just before the end of the tabulating movement, the energization of relay R1 adapted to open its common contact and close its R4 and R3 contacts, and means for returning the tabulating switch to normal whereby it opens its R1 contacts at the end of the tabulating movement.

16. A total writing bookkeeping typewriter which includes a movable carriage, means for tabulating the carriage, a tabulator switch controlled by the movement of the carriage during tabulation, a slow release control relay R1, a contact on the tabulating switch in circuit with relay R1 and adapted to be closed during tabulation, means controlled by the carriage to energize the operating circuit of relay R1 just before the end of tabulation, said contact on the tabulating switch being opened at the end of tabulation, a transfer relay R3, a switch in circuit with relay R3 controlled by the movement of the carriage to close the operating circuit for relay R3, and an R3 contact also in circuit with the relay R3 closed by relay R1 when said relay R1 is energized.

17. A computing and recording machine which includes a frame and a movable carriage thereon, a totalizer movable therewith, a plurality of movable discs on the totalizer, a plurality of normally closed add-1 contacts disposed on said frame adjacent said discs, and means operated by said discs to open all of said contacts when the totalizer is moved to a definite position and said discs are in zero position.

18. A computing and recording machine which includes a frame and a movable carriage thereon, a totalizer movable therewith, a plurality of movable discs on the totalizer, a plurality of sensing fingers disposed adjacent the totalizer and adapted to sense said discs one by one, an add-1 switch comprising a plurality of contacts in normally closed position disposed on said frame below said discs, and means operated by the totalizer discs to depress said contacts and open them when the remaining discs after the one last sensed are in zero position.

19. A computing and recording machine which includes a frame and a movable carriage thereon, a totalizer movable therewith, a series of discs on the totalizer, a normally closed add-1 switch disposed on the frame adjacent said discs, means operated by the totalizer discs to open said switch when the last significant digit on the totalizer has been sensed and the remaining discs are in zero position, means for tabulating the carriage to a total writing column, a control relay R8 in circuit with the add-1 switch, means for energizing relay R8 when the carriage is so tabulated, a tens complement relay R5, and contacts controlled by relay R8 and opened when relay R8 is energized and adapted to close when the add-1 switch is opened, said contacts being in circuit with relay R5 and adapted to complete the circuit for relay R5 when closed to adjust the machine for the printing of tens complements.

20. A computing and recording machine which includes a frame and a movable carriage thereon, a totalizer movable therewith, a series of discs on the totalizer, a normally closed add-1 switch disposed on the frame adjacent said discs, means operated by the totalizer discs to open said switch when the last significant digit in the totalizer has been sensed and the remaining discs are in zero position, means for tabulating the carriage to a total writing column, means operated when the carriage reaches total column position to close the add-1 switch circuit, means for changing the circuits to print tens complements, and means controlled by the next to the last mentioned means and actuated when the circuit of the add-1 switch is broken to effect the change in the circuit whereby a tens complement is printed.

21. A machine of the class described which includes a star, a space, and a triangle magnet, a timing switch, a cam for operating said switch, a continuously moving shaft, a dog to connect said shaft and cam, a latch to hold said dog in released position, a link connected to said latch, a lever connected to said link, pawls connected to and operated by said magnets, a snatch roll continuously operating and engaging said pawls to move them when the pawls are operated by the magnets, said lever positioned to be engaged by any pawl when said pawl is moved by the snatch roll to pull on the link and release the latch whereby the dog connects the cam with the shaft and the switch is opened, said cam holding said switch open during one revolution of said cam.

22. A total writing bookkeeping typewriter which includes a series of numeral printing magnets, a control relay R1, common contacts controlled by relay R1 and in circuit with the printing magnets, a movable carriage, means operated by the carriage to apply power to said relay when the carriage is tabulated to a total column, an actuator switch operated each time a numeral magnet is energized, a disconnect contact on said actuator switch and in circuit with relay R1 and adapted to be closed when the switch is moved to disconnect position, a ground connected to said contact, and manual means for moving said switch to the disconnect position whereby the relay R1 is energized to open its common contacts.

23. A total writing bookkeeping typewriter which includes a series of numeral printing magnets, a control relay R1, common contacts controlled by relay R1 and in circuit with the printing magnets, a movable carriage, means operated by the carriage to apply power to said relay when the carriage is tabulated to a total column, an actuator switch operated each time a numeral magnet is energized, a disconnect contact on said actuator switch and in circuit with relay R1 and adapted to be closed when the switch is moved to disconnect position, a ground connected to said contact, manual means for moving said switch to the disconnect position whereby the relay R1 is energized to open its common contacts, a relay R2, a contact in circuit with relay R2 and controlled by the actuator switch, said relay being energized by the closing of said contact when the first significant digit is printed, a contact on said relay R2 normally closed and in circuit between relay R1 and the actuator switch contact, said contact being opened as relay R2 is energized to prevent the operation of the actuator switch energizing relay R1 thereafter.

24. A machine for computing and recording which includes a movable totalizer having a plurality of discs adapted to be moved to various numerical positions, a frame, a plurality of plungers mounted on the frame, means on the discs when they are in zero position to depress the plungers, and add-1 switch elements engaging the plungers and operated when the plungers are depressed.

25. A machine for computing and recording which includes a movable totalizer having a plurality of discs adapted to be moved to various numerical positions, a frame, a plurality of plungers mounted on the frame, teeth on the discs when they are in zero position to depress the plungers as the totalizer is moved across the frame, normally closed add-1 switch elements engaging the plungers and operated to be opened as the respective plungers are depressed, and a cam on the totalizer to maintain the plungers depressed as the last totalizer disc passes beyond them.

26. A total writing bookkeeping typewriter, having a movable carriage, and a totalizer moved therewith, a plurality of discs on said totalizer comprising in order as follows: a shift disc, a plurality of pounds sensing discs, a decimal space disc, a tens of shillings sensing disc, a units of shillings disc, a pence gear, an odd and even sensing disc, an R10—13 disc, and a pence sensing disc, the pence sensing disc being connected to and movable with the pence gear.

27. A total writing bookkeeping typewriter which includes a plurality of odd and even number printing magnets, a movable carriage, a totalizer moved thereby, a plurality of discs on the totalizer, a plurality of sensing fingers adapted to sense said discs as the totalizer is moved step-by-step past them, a pair of relays having contacts controlling circuits between the printing magnets and the sensing fingers, one of said discs engaged by one of said sensing fingers upon the movement of the totalizer to a definite position to cause the energization of one of said relays whereby circuits to certain of said sensing fingers are broken, and another of said discs engaged by another of said sensing fingers upon the movement of the totalizer to the same position to cause the energization of the other relay whereby the circuits between the remaining sensing fingers and the printing magnets are selectively changed dependent upon the position of a disc on the totalizer.

28. A total writing bookkeeping typewriter which includes a plurality of printing magnets from 0-11, a movable carriage, a totalizer moved thereby, a plurality of discs on the totalizer including discs adapted to be set to represent values from 0-9, a plurality of sensing fingers adapted to sense said discs as the totalizer is moved step-by-step past them, a pair of relays having contacts controlling circuits between the printing magnets and the sensing fingers, one of the discs on the totalizer adapted to contact one of the sensing fingers when the totalizer is moved to a definite position to cause the energization of one of said relays to open the contacts connected to the 0–3 sensing fingers, the second relay having contacts which in one position thereof connect to even numbered printing magnets, and in another position connect with odd numbered printing magnets and another of said discs on the totalizer adapted to engage another of the sensing fingers to cause the energization of said second relay when the disc is set to represent an odd number.

29. A total writing bookkeeping typewriter which includes a plurality of printing magnets, a common return circuit for said magnets, means operated by certain of said magnets when energized to momentarily break the common return circuit, and means operated by the energization of any of said magnets to break said circuit and hold it open for a predetermined interval of time.

30. A machine of the class described which includes a plurality of printing magnets, a movable carriage, a totalizer moved thereby, said magnets having a common return circuit, means for tabulating said carriage to a total writing column, means operated by the tabulating means to hold the return circuit open during tabulation, and means also operated by the tabulating means to hold the return circuit open for a predetermined interval after the completion of the tabulating movement.

31. A total writing bookkeeping typewriter which includes a movable carriage, means for tabulating the carriage, a tabulator switch controlled by the movement of the carriage during tabulation, a slow release control relay R1, a contact on the tabulating switch in circuit with relay R1 and adapted to be closed during tabulation, means controlled by the carriage to energize the operating circuit for relay R1 just before the end of tabulation, said contact on the tabulating switch being opened at the end of tabulation, a shift relay, a totalizer having a shift disc, a sensing finger in circuit with the shift relay and adapted to contact with the shift disc at the beginning of the total column position when the shift disc is set by a negative total in the totalizer, and a shift contact on relay R1 also in circuit with the shift relay and closed when relay R1 is energized to close the circuit of the shift relay.

32. A machine of the class described which includes a zero printing magnet and a space magnet, a movable carriage, a totalizer moved thereby and having a disc adapted to be disposed in a zero position, a sensing finger adapted to contact with said disc when the disc is in the zero position, a circuit which includes the sensing finger and the disc, a relay R2, means to energize the relay R2 at predetermined times in the operation of the machine, a contact controlled by relay R2 and disposed in the circuit with the sensing finger, and means connected to relay R2 to associate said contact with the space magnet when relay R2 is deenergized and to associate said contact with the printing magnet when relay R2 is energized.

33. A machine of the class described, which includes a zero printing magnet and a space magnet, a movable carriage, a totalizer moved thereby and having a disc adapted to be disposed in a zero position, a sensing finger adapted to contact with said disc when the disc in in zero position, a circuit which includes the sensing finger and the disc, a relay R2, means to energize the relay R2 at predetermined times in the operation of the machine, a contact controlled by relay R2 and disposed in the circuit with the sensing finger, means connected to relay R2 to associate said contact with the space magnet when relay R2 is deenergized and to associate said contact with the printing magnet when relay R2 is energized, an actuator switch, and means for operating said actuator switch whenever a numeral is printed, and a contact on said actuator switch and in circuit with relay R2 and closed when said actuator switch is operated to energize said relay R2.

34. A total writing bookkeeping typewriter which includes a plurality of printing magnets, a movable carriage, a totalizer having wheels and moved by the carriage, discs on the totalizer engaging said wheels and settable in accordance with the position of said wheels, a plurality of fingers to sense said discs, said fingers being connected in circuit with said printing magnets, a relay R—4 adapted, when energized, to shift the circuit connections for the printing of nines complements, one of said sensing discs engaging one of said fingers to cause the energization of said relay R4 when the wheels of the totalizer represent a negative total, a relay R13 adapted, when energized, to shift the circuit connections for printing tens complements when the carriage is disposed in position to print the pence values, the engagement of another finger and disc at a definite point in the movement of the carriage causing the energization of said relay R13 when the relay R4 is energized.

35. A total writing bookkeeping typewriter which includes a plurality of printing magnets, a movable carriage, a totalizer having wheels and moved by the carriage, discs on the totalizer and engaging said wheels and settable in accordance with the position of said wheels, a plurality of fingers to sense said discs, said fingers being connected in circuit with said printing magnets, a relay R4 adapted, when energized, to shift the circuit connections for the printing of nines complements, one of said discs engaging one of said fingers to cause the energization of said relay R4 when the wheels of the totalizer represent a negative total, a relay R12 adapted, when energized, to shift the circuit connections for printing tens complements when the carriage is disposed in position to print tens of shilling values, and means operated by the carriage when it reaches a definite position to cause the energization of said relay R12 when said shift relay R4 is energized.

36. A machine of the class described which includes a source of power, a plurality of printing magnets connected to said source, a movable carriage, a totalizer mover thereby, said magnets having a common return circuit, a shift relay and a transfer relay connected to said source, means for tabulating the carriage to a total writing column, contacts opened by the tabulating means during tabulation to hold the return circuit open during tabulation, a slow release relay connected to said source, contacts closed by the tabulating means during tabulation to energize said relay, and contacts in circuit with said magnets to be opened when said slow release relay is energized, and other contacts controlled by said slow release relay and in circuit respectively with the shift and transfer relays to energize said relays when the slow release relay is energized, the slow release of said slow release relay permitting the energization of the shift and transfer relays during the time it is releasing.

37. A machine of the class described, which includes a movable carriage, a totalizer having wheels and moved by the carriage, discs on the totalizer and engaging said wheels and settable in accordance with the position of said wheels, a plurality of fingers to sense said discs, a source of power, said fingers being in circuit with said source, an add-1 mechanism operable when the totalizer shows a negative total and in circuit with certain of said fingers to effect the printing of tens complements when certain of said discs are sensed, and additional add-1 devices also operable when the totalizer shows a negative total and also in circuit with certain other fingers to effect printing of tens complements when certain other discs are sensed.

38. A machine of the class described which includes a movable carriage, an English money totalizer having wheels and moved by the carriage, discs on the totalizer and engaging said wheels and settable in accordance with the position of said wheels, said discs representing pounds, shillings, and pence, a plurality of fingers to sense said discs, a source of power, said fingers being in circuit with said source, an add-1 mechanism operable when the totalizer shows a negative total and in circuit with the fingers sensing the pounds and units of shillings discs and adapted to effect the printing of tens complements when these discs are being sensed for a negative total, additional add-1 mechanisms also operable when the totalizer shows a negative total and in circuit with certain other of said fingers to control printing of tens complements when sensing the tens of shillings discs for a negative total and further add-1 mechanism also operable when the totalizer shows a negative total and also in circuit with another finger to effect printing of a tens complement when the pence disc is being sensed for a negative total.

39. In a machine of the class described, a snatch roll, a timing cam, a continuously rotating power shaft, a switch controlled by said cam, means adapted, when released, to connect the shaft and the cam, means engaging said connecting means to hold it normally from its connecting position, a pawl adapted to engage with and be moved by said roll, and means connected to said holding means and disposed in the path of movement of the free end of the pawl to be moved thereby and operate said holding means to release said connecting means.

40. In a machine of the class described, a snatch roll, a timing cam, a continuously rotating power shaft, a normally closed switch, means adapted, when released, to connect the shaft and the cam, means engaging said connecting means to hold it normally from its connecting position, a pawl adapted to engage with and be moved by said roll, means connected to said holding means and disposed in the path of movement of the free end of the pawl to be moved thereby and operate said holding means to release said connecting means, and means cooperating with the cam to hold said switch in the open position until the cam has moved a predetermined distance.

41. In a machine of the class described, a snatch roll, a timing cam, a continuously rotating power shaft, a latch adapted to connect the cam and the shaft, a switch controlled by said cam, means for holding the latch in a disconnected position, a pawl adapted to engage with and be moved by said roll, and means connected to said holding means and disposed in the path of movement of the free end of the pawl to be moved thereby to operate said holding means to release said latch and permit it to move to connecting position.

42. In a machine of the class described, a snatch roll, a timing cam, a continuously rotating power shaft, a normally closed switch, a latch on the cam and adapted to connect it with the power shaft, means for holding said latch in a disconnected position, a pawl adapted to engage with and be moved by said roll, means connected to said holding means and disposed in the path of movement of the free end of the pawl to be moved thereby to operate said holding means to release said latch and permit it to move to connecting position, and means cooperating with the cam to hold said switch in the open position until the cam has moved a predetermined distance.

43. In a machine of the class described, a movable carriage, a totalizer movable with the carriage and having a series of groups of register wheels, a spacing magnet, a plurality of printing and other magnets, a device for sensing the position of the totalizer wheels, a cam on the carriage disposed in position relative to the totalizer wheel groups, a slide plate operated by the cam as the carriage is moved to engage the cam, a switching device operated by the plate as the sensing device passes from one group of wheels to another group, a common circuit for the printing and other magnets normally closed by the switching device, a circuit for the spacing magnet normally opened at the switching device, and means on the cam and acting through the plate to open the common circuit and close the space magnet circuit for a predetermined length of carriage travel whereby the carriage is automatically spaced and the common circuit is held open during such spacing.

44. In a machine of the class described, a continuously moving snatch roll, a pawl adapted to engage with and be moved by said roll, a pivoted trip plate having a portion disposed in the line of movement of the free end of the pawl and adapted to be moved thereby, a timing cam, a continuously rotating shaft, a dog on the cam and tending to connect the cam with the shaft, a latch member holding said dog normally in a disconnected position, a link connecting the latch and the trip plate whereby the movement of the plate will move the latch to allow the dog to move to connected position.

45. A machine for computing and recording which includes a plurality of banks of switches disposed in group arrangement for controlling the various circuits of the machine, and a switch-operating element for each group operable to actuate said switches, a movable carriage, a cam plate of irregular outline adjustably mounted on said carriage and associated with one of said operating elements for intermittently actuating said element predetermined varying distances to selectively actuate the switches of one of said groups, and a second cam plate of irregular outline mounted on said first mentioned cam plate and movable therewith for actuating said other element to selectively actuate the switches of the other group whereby the various circuits are opened or closed in predetermined sequence in accordance with the step by step movement of the carriage.

46. A machine for computing and recording which includes a plurality of banks of circuit control switches disposed in group arrangement for selective operation, and switch-operating slides each operable to actuate certain associated groups of said banks, a step by step movable carriage, a stop bar mounted on said carriage, a plurality of stop plates adjustably mounted on said bar, and means including a plurality of operating cams of irregular outline each removably carried by a pair of said stop plates, each of said slides having a part for engagement with an associated operating cam for selective and intermittent operation of the corresponding banks of said switches during the travel of said carriage whereby the various circuits are opened or closed in predetermined sequence in accordance with the step by step movement of the carriage.

EDWIN O. ROGGENSTEIN.